US011711182B2

(12) United States Patent
Noh et al.

(10) Patent No.: US 11,711,182 B2
(45) Date of Patent: **\*Jul. 25, 2023**

(54) METHOD, APPARATUS, AND SYSTEM FOR CHANNEL ACCESS IN UNLICENSED BAND

(71) Applicant: WILUS INSTITUTE OF STANDARDS AND TECHNOLOGY INC., Gyeonggi-do (KR)

(72) Inventors: Minseok Noh, Seoul (KR); Jinsam Kwak, Gyeonggi-do (KR); Juhyung Son, Gyeonggi-do (KR)

(73) Assignee: WILUS INSTITUTE OF STANDARDS AND TECHNOLOGY INC., Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/681,703

(22) Filed: Feb. 25, 2022

(65) Prior Publication Data

US 2022/0183036 A1 Jun. 9, 2022

Related U.S. Application Data

(63) Continuation of application No. 16/904,556, filed on Jun. 18, 2020, now Pat. No. 11,297,636, which is a
(Continued)

(30) Foreign Application Priority Data

Jul. 23, 2016 (KR) .................. 10-2016-0093810
Jul. 26, 2016 (KR) .................. 10-2016-0095076
(Continued)

(51) Int. Cl.
*H04L 5/00* (2006.01)
*H04L 27/26* (2006.01)
(Continued)

(52) U.S. Cl.
CPC .............. *H04L 5/0032* (2013.01); *H04L 5/00* (2013.01); *H04L 5/14* (2013.01); *H04L 27/26* (2013.01);
(Continued)

(58) Field of Classification Search
CPC ............ H04L 12/28; H04L 5/00; H04L 12/50
(Continued)

(56) References Cited

U.S. PATENT DOCUMENTS 11,412,422 B2 * 8/2022 Rastegardoost ...... H04W 36/08
2013/0107116 A1 5/2013 Charbit et al.
(Continued)

FOREIGN PATENT DOCUMENTS

CN 102356658 2/2012
CN 104919883 9/2015
(Continued)

OTHER PUBLICATIONS

Office Action dated Jul. 28, 2022 for Korean Patent Application No. 10-2021-7036421 and its English translation provided by Applicant's foreign counsel.
(Continued)

*Primary Examiner* — Dang T Ton
(74) *Attorney, Agent, or Firm* — Ladas & Parry, LLP

(57) ABSTRACT

Disclosed are a method, an apparatus, and a system for performing channel access. In detail, provided are a method including: receiving uplink scheduling information; and when the user equipment has stopped an uplink transmission during the uplink transmission being performed according to the uplink scheduling information, to resume the uplink transmission, performing a second type channel access when a channel sensed by the user equipment is continuously idle after the uplink transmission has been stopped, and performing a first type channel access when the channel sensed by
(Continued)

the user equipment is not continuously idle after the uplink transmission has been stopped, wherein the first type channel access comprises performing a random backoff after a channel sensing, and the second type channel access only comprises performing a channel sensing and an apparatus and a system therefor.

9 Claims, 23 Drawing Sheets

Related U.S. Application Data continuation of application No. 16/255,187, filed on Jan. 23, 2019, now Pat. No. 10,728,919, which is a continuation of application No. PCT/KR2017/007967, filed on Jul. 24, 2017.

(30) Foreign Application Priority Data

Aug. 25, 2016 (KR) .................. 10-2016-0108045
Aug. 26, 2016 (KR) .................. 10-2016-0109403

(51) Int. Cl.
| | | |
|---|---|---|
| H04L 5/14 | (2006.01) | |
| H04W 84/12 | (2009.01) | |
| H04W 16/14 | (2009.01) | |
| H04W 72/0446 | (2023.01) | |
| H04W 72/1268 | (2023.01) | |
| H04W 74/08 | (2009.01) | |
| H04W 88/06 | (2009.01) | |

(52) U.S. Cl.
CPC ....... *H04W 16/14* (2013.01); *H04W 72/0446* (2013.01); *H04W 72/1268* (2013.01); *H04W 74/0808* (2013.01); *H04W 84/12* (2013.01); *H04W 88/06* (2013.01); *H04L 27/2602* (2013.01); *H04W 74/0816* (2013.01)

(58) Field of Classification Search
USPC ........................................ 370/329, 401, 395
See application file for complete search history.

(56) References Cited

U.S. PATENT DOCUMENTS

| | | | |
|---|---|---|---|
| 2014/0044000 | A1 | 2/2014 | Charbit et al. |
| 2015/0085797 | A1 | 3/2015 | Ji et al. |
| 2016/0037352 | A1 | 2/2016 | Wei et al. |
| 2016/0073344 | A1 | 3/2016 | Vutukuri et al. |
| 2017/0280475 | A1 | 9/2017 | Yerramalli et al. |
| 2017/0280476 | A1 | 9/2017 | Yerramalli et al. |
| 2017/0332245 | A1 | 11/2017 | Huang et al. |
| 2019/0246412 | A1 | 8/2019 | Noh et al. |
| 2020/0322974 | A1 | 10/2020 | Noh et al. |
| 2021/0168770 | A1 | 6/2021 | Oh et al. |

FOREIGN PATENT DOCUMENTS

| | | |
|---|---|---|
| CN | 105247914 | 1/2016 |
| CN | 105409138 | 3/2016 |
| CN | 105722234 | 6/2016 |
| KR | 10-2008-0028090 | 3/2008 |
| KR | 10-2010-0008322 | 1/2010 |
| KR | 10-2012-0130100 | 11/2012 |
| KR | 10-2013-0084261 | 7/2013 |
| KR | 10-2014-0034290 | 3/2014 |
| KR | 10-2015-0028227 | 3/2015 |
| KR | 10-2016-0029014 | 3/2016 |
| KR | 10-2016-0034182 | 3/2016 |
| KR | 10-2016-0045840 | 4/2016 |
| KR | 10-2016-0052420 | 5/2016 |
| KR | 10-2018-0039501 | 4/2018 |
| KR | 10-2018-0098667 | 9/2018 |
| KR | 10-2019-0017588 | 2/2019 |
| KR | 10-2094287 | 3/2020 |
| KR | 10-2307319 | 10/2021 |
| KR | 10-2021-0134357 | 11/2021 |
| WO | 2012/033665 | 3/2012 |
| WO | 2016/048222 | 3/2016 |
| WO | 2017/074638 | 5/2017 |
| WO | 2018/021783 | 2/2018 |

OTHER PUBLICATIONS

Notice of Allowance dated Aug. 11, 2022 for Chinese Patent Application No. 201780057852.6 and its English translation provided by Applicant's foreign counsel.
Notice of Allowance dated Sep. 16, 2022 for Korean Patent Application No. 10-2021-7024472 and its English translation provided by Applicant's foreign counsel.
Office Action dated Mar. 16, 2022 for Chinese Patent Application No. 201780057852.6 and its English translation provided by Applicant's foreign counsel.
Huawei, HiSilicon: "Further details on UL LBT to enable UE multiplexing of uplink transmissions", 3GPP TSG RAN WG1 Meeting #84bis, R1-162102, Busan, Korea, Apr. 11-15, 2016, pp. 1-7.
Yuan Naihua et al.: "Discussion on E-DCH SPS Initial Link Adaptation Technology of TD-SCDMA HSPA + CPC", Beijing, China, Jun. 2, 2010, pp. 108-111.
International Search Report for PCT/KR2017/007967 dated Nov. 16, 2017 and its English translation from WIPO (now published as WO 2018/021783 A1).
Written Opinion of the International Searching Authority for PCT/KR2017/007967 dated Nov. 16, 2017 and its English translation by WIPO (now published as WO 2018/021783 A1).
Huawei Hisilicon, "Analysis on LBT with Category 2 and 4 for eLAA". R1-160297, 3GPP TSG RAN WG1 Meeting #84, St. Julian's, Malta, Feb. 6, 2016 See sections 1, 2. 1, 3.
CATT, "Uplink Channel Access Scheme for LAA Scell", R1-160359, 3GPP TSG RAN WG1 Meeting #84, St Julian's, Malta, Feb. 5, 2016 See sections 1, 2.2.
International Preliminary Report on Patentability (Chapter I) dated Jan. 29, 2019 for PCT/KR2017/007967 and its English translation from WIPO.
Extended European Search Report dated Sep. 17, 2019 for EP Patent Application No. 17770689.2.
LG Electronics: "LBT schemes in LAA UL", 3GPP TSG RAN WG1 MEETING #84, St Julian's, Malta, Feb. 15-19, 2016; Draft: R1-160630; 3rd Generation Partnership Project (3GPP), Mobile Competence Centre; 650, Route des Lucioles; F-06921 Sophia-Antipolis Cedes, France; Feb. 6, 2016, XP051064267, Agenda Item: 7.3.1.5, pp. 1-10.
ZTE: "UL framework for LAA". 3GPP TSG RAN WG1 Meeting #83, Anaheim, USA, Nov. 15-22, 2015; Document for: Discussion and Decision; Draft: R1-156994 UL; 3rd Generation Partnership Project (3GPP), Mobile Competence Centre; 650. Route des Lucioles; F-06921 Sophia-Antipolis Cedes, France; Nov. 7, 2015, XP051022611, Agenda Item: 6.2.3.1, pp. 1-6.
Mediatek Inc: "Uplink channel access in LAA", 3GPP TSG RAN WG1 Meeting #84, St Julian's, Malta, Feb. 15-19, 2016; Draft: R1-160976; 3rd Generation Partnership Project (3GPP), Mobile Competence Centre; 650. Route des Lucioles; F-06921 Sophia-Antipolis Cedes, France; Feb. 24, 2016, XP051079075, Agenda Item: 7.3.1.5, pp. 1-11.
LG Electronics: "PUSCH transmission in LAA", 3GPP TSG RAN WG1 MEETING #84, St Julian's, Malta, Feb. 15-19, 2016; Draft: R1-160625 LAA PUSCH; 3rd Generation Partnership Project (3GPP), Mobile Competence Centre; 650, Route des Lucioles; F-06921 Sophia-Antipolis Cedes; France; Feb. 14, 2016, XP051053954, Agenda Item: 7.3.1.1, pp.1-5.
Non-Final Office Action dated Jan. 16, 2020 for U.S. Appl. No. 16/138,936.

(56) References Cited

OTHER PUBLICATIONS

Notice of Allowance dated May 29, 2020 for U.S. Appl. No. 16/138,936.
Notice of Allowance dated Mar. 11, 2020 for U.S. Appl. No. 16/255,187 (now published as US 2019/0246412).
Non-Final Office Action dated Feb. 7, 2020 for U.S. Appl. No. 16/255,187 (now published as US 2019/0246412).
Office Action dated Sep. 9, 2021 for Korean Patent Application No. 10-2021-7024472 and its English translation provided by Applicant's foreign counsel.
Ericsson, "On Coordinated UL Channel Access Enhanced LAA", 3GPP TSG RAN WG1 Meeting #84, R1-161000, St. Julian's, Malta, Feb. 15-19, 2016, pp. 1-3.
Notice of Allowance dated Oct. 28, 2021 for Chinese Patent Application No. 201780030922.9 and its English translation provided by the Applicant's foreign counsel.
Notice of Allowance dated Aug. 9, 2021 for Korean Patent Application No. 10-2021-7021069 and its English translation provided by Applicant's foreign counsel.
Office Action for Indian Patent Application No. 201827040249 dated Nov. 4, 2020.
Office Action for Korean Patent Application No. 10-2019-7005270 dated May 11, 2021 and its English translation provided by Applicant's foreign counsel.
Office Action for Chinese Patent Application No. 201780030922.9 dated Apr. 30, 2021 and its English translation provided by Applicant's foreign counsel.
Office Action for Korean Patent Application No. 10-2018-7027545 dated Jun. 8, 2021 and its English translation provided by Applicant's foreign counsel.
Notice of Allowance for Korean Patent Application No. 10-2019-7005270 dated Jun. 8, 2021 and its English translation provided by Applicant's foreign counsel.
WILUS Inc.: "Consideration on UL LBT Type Switching for eLAA", R1-165252, 3GPP TSG RAN WG1 Meeting #85, Nanjing, China, May 23-27, 2016, pp. 1-4.
Samsung: "Discussion on UL power control for UL LAA", R1-162662, 3GPP TSG RAN WG1 Meeting #84bis, Busan, Korea, Apr. 11-15, 2016, pp. 1-3.
Lenovo: "LBT schemes for LAA DL and UL transmission", R1-154508, 3GPP TSG RAN WG1 Meeting #82, Beijing, China, Aug. 24-28, 2015, pp. 1-4.
Ericsson, [ZTE], [MediaTek], [WILUS]: "WF on MCOT limit Signaling and Modifying LBT type", R1-165716, 3GPP TSG RAN WG1 #85, Nanjing, China, May 23-27, 2016, pp. 1-5.
Notice of Allowance dated Dec. 2, 2021 for U.S. Appl. No. 16/904,556 (now published as US 2020/0322974).
Notice of Allowance dated Oct. 27, 2022 for Korean Patent Application No. 10-2021-7036421 and its English translation provided by Applicant's foreign counsel.
Office Action dated Nov. 4, 2022 for European Patent Application No. 17 770 689.2.
Notice of Allowance dated Feb. 20, 2023 for Korean Patent Application No. 10-2023-7002653 and its English translation provided by Applicant's foreign counsel.

* cited by examiner (a)

(b)

(a) LAA DL transmission burst starting with a regular subframe (b) LAA DL transmission burst starting with a partial subframe (a) LAA DL transmission burst ending with a regular subframe (b) LAA DL transmission burst ending with a partial subframe <frame structure of UL radio frame, UL subframe, UL shot in a subframe>

(a) Cat. 4 LBT signaling is received by signaling of UL grant (b) Cat. 4 LBT signaling is received by signaling of UL grant, and signaling related to change of LBT type is received through recent DL

METHOD, APPARATUS, AND SYSTEM FOR CHANNEL ACCESS IN UNLICENSED BAND

CROSS-REFERENCE TO RELATED APPLICATIONS

This application is a continuation of U.S. patent application Ser. No. 16/904,556 filed on Jun. 18, 2020, which is a continuation of U.S. patent application Ser. No. 16/255,187 filed on Jan. 23, 2019, now issues as U.S. Pat. No. 10,728,919 dated Jul. 28, 2020, which is a continuation of International Patent Application No. PCT/KR2017/007967 filed on Jul. 24, 2017, which claims the priority to Korean Patent Application No. 10-2016-0093810 filed in the Korean Intellectual Property Office on Jul. 23, 2016, Korean Patent Application No. 10-2016-0095076 filed in the Korean Intellectual Property Office on Jul. 26, 2016, Korean Patent Application No. 10-2016-0108045 filed in the Korean Intellectual Property Office on Aug. 25, 2016, and Korean Patent Application No. 10-2016-0109403 filed in the Korean Intellectual Property Office on Aug. 26, 2016, the entire contents of which are incorporated herein by reference.

TECHNICAL FIELD

The present invention relates to a wireless communication system. Particularly, the present invention relates to a method, an apparatus, and a system for performing channel access in an unlicensed band.

BACKGROUND ART

In recent years, with an explosive increase of mobile traffic due to the spread of smart devices, it has been difficult to cope with data usage which increases for providing a cellular communication service only by a conventional licensed frequency spectrum or LTE-licensed frequency band.

In such a situation, a scheme that uses an unlicensed (alternatively, unauthorized, non-licensed, or license unnecessary) frequency spectrum or LTE-Unlicensed frequency band (e.g., 2.4 GHz band, 5 GHz band, or the like) for providing the cellular communication service has been devised as a solution for a spectrum shortage problem.

However, unlike the licensed band in which a communication service provider secures an exclusive frequency use right through a procedure such as auction, or the like, in the unlicensed band, multiple communication facilities can be used simultaneously without limit when only a predetermined level of adjacent band protection regulation is observed. As a result, when the unlicensed band is used in the cellular communication service, it is difficult to guarantee communication quality at a level provided in the licensed band and an interference problem with a conventional wireless communication device (e.g., wireless LAN device) using the unlicensed band may occur.

Therefore, a research into a coexistence scheme with the conventional unlicensed band device and a scheme for efficiently sharing a radio channel needs to be preferentially made in order to settle an LTE technology in the unlicensed band. That is, a robust coexistence mechanism (RCM) needs to be developed in order to prevent a device using the LTE technology in the unlicensed band from influencing the conventional unlicensed band device.

DISCLOSURE

Technical Problem

The present invention has been made in an effort to provide a method for efficiently transmitting a signal in a wireless communication system, in particular, a cellular wireless communication system and an apparatus therefor. Further, the present invention has been made in an effort to provide a method for efficiently transmitting a signal in a specific frequency band (e.g., unlicensed band) and an apparatus therefor.

Technical objects desired to be achieved in the present invention are not limited to the aforementioned objects, and other technical objects not described above will be apparently understood by those skilled in the art from the following disclosure.

Technical Solution

The first embodiment of the present invention provides a method for performing uplink transmission in a specific cell by a user equipment in a wireless communication system including: receiving uplink scheduling information; and when the user equipment has stopped an uplink transmission during the uplink transmission being performed according to the uplink scheduling information, to resume the uplink transmission, performing a second type channel access when a channel sensed by the user equipment is continuously idle after the uplink transmission has been stopped, and performing a first type channel access when the channel sensed by the user equipment is not continuously idle after the uplink transmission has been stopped, wherein the first type channel access includes performing a random backoff after a channel sensing, and the second type channel access only includes performing a channel sensing.

The second embodiment of the present invention provides a user equipment used in a wireless communication system including: a wireless communication module; and a processor, wherein the processor receives uplink scheduling information, and when the user equipment has stopped an uplink transmission during the uplink transmission being performed according to the uplink scheduling information, to resume the uplink transmission, performs a second type channel access when a channel sensed by the user equipment is continuously idle after the uplink transmission has been stopped, and performs a first type channel access when the channel sensed by the user equipment is not continuously idle after the uplink transmission has been stopped, wherein the first type channel access comprises performing a random backoff after a channel sensing, and the second type channel access only comprises performing a channel sensing.

In the first and the second embodiment, the uplink transmission may include a transmission on a plurality of subframes, and stopping, by the user equipment, the uplink transmission during the uplink transmission being performed may include dropping the uplink transmission in a subframe other than a last subframe on the plurality of subframes.

In the first and the second embodiment, the wireless communication system may include a 3rd generation partnership project (3GPP)-based wireless communication system, and the first type channel access may include a category-4 listen-before-talk (LBT) and the second type channel access may include a category-2 LBT.

In the first and the second embodiment, the first type channel access may include performing the random backoff using a variable size contention window (CW), and the second type channel access may include performing the channel sensing for a duration of 25 us without a random backoff.

In the first and the second embodiment, the specific cell may be an unlicensed cell.

The third embodiment of the present invention provides a method for performing uplink transmission in multiple carriers by a user equipment in a wireless communication system including: receiving uplink scheduling information indicating a first type channel access for a carrier of a first group; receiving uplink scheduling information indicating a second type channel access for a carrier of a second group; performing a first type channel access only for a specific carrier among carriers of the first group and performing a second type channel access for remaining carriers; and performing a second type channel access indicated by the uplink scheduling information for a carrier of a second group, wherein when the first type channel access fails in the specific carrier, an uplink transmission is dropped only in a carrier of the first group among carriers in which the second type channel access is performed.

The fourth embodiment of the present invention provides a method for performing uplink transmission in multiple carriers by a user equipment in a wireless communication system including: receiving uplink scheduling information indicating a first type channel access for a carrier of a first group; performing a first type channel access only for a specific carrier among carriers of the first group and performing a second type channel access for remaining carriers; and adjusting a contention window size (CWS) for each carrier, wherein reception response information for uplink transmission on the specific carrier transmitted by performing the first type channel access is reflected in a CWS adjustment in the user equipment while reception response information for uplink transmission on remaining carriers in which the first type channel access is not performed among carriers of the first group is not reflected in the CWS adjustment in the user equipment.

Advantageous Effects

According to exemplary embodiments of the present invention, provided are a method for efficiently transmitting a signal in a wireless communication system, in particular, a cellular wireless communication system and an apparatus therefor. Further, provided are a method for efficiently transmitting a signal in a specific frequency band (e.g., unlicensed band) and an apparatus therefor.

Effects to be acquired in the present invention are not limited to the aforementioned effects, and other effects not described above will be apparently understood by those skilled in the art from the following disclosure.

DESCRIPTION OF DRAWINGS

In order to help understand the present invention, the accompanying drawings which are included as a part of the Detailed Description provide embodiments of the present invention and describe the technical matters of the present invention together with the Detailed Description.

DETAILED DESCRIPTION OF THE INVENTION

Terms used in the specification adopt general terms which are currently widely used as possible by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it intends to be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "equal to or more than" or "equal to or less than" based on a specific threshold may be appropriately substituted with "more than" or "less than", respectively in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-TDMA (SC-FDMA), and the like. The CDMA may be implemented by a radio technology such as universal terrestrial radio access (UTRA) or CDMA2000. The TDMA may be implemented by a radio technology such as global system for mobile communications (GSM)/general packet radio service (GPRS)/enhanced data rates for GSM evolution (EDGE). The OFDMA may be implemented by a radio technology such as IEEE 802.11 (Wi-Fi), IEEE 802.16 (WiMAX), IEEE 802-20, evolved UTRA (E-UTRA), and the like. The UTRA is a part of a universal mobile telecommunication system (UMTS). $3^{rd}$ generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP LTE/LTE-A is primarily described for clear description, but technical spirit of the present invention is not limited thereto.

Figure 1:
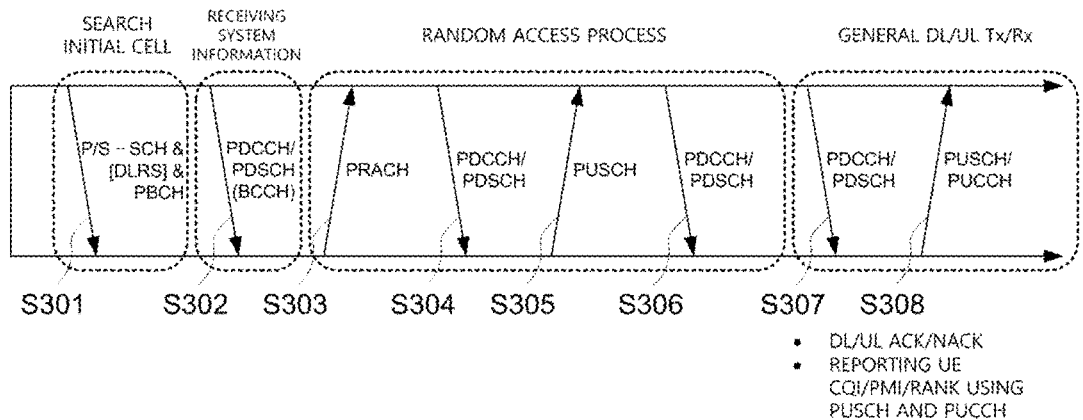
FIG. 1 illustrates physical channels used in a 3rd generation partnership project (3GPP) system and a general signal transmitting method using the physical channels.

FIG. 1 illustrates physical channels used in a 3GPP system and a general signal transmitting method using the physical channels. A user equipment receives information from a base station through downlink (DL) and the user equipment transmits information through uplink (UL) to the base station. The information transmitted/received between the base station and the user equipment includes data and various control information and various physical channels exist according to a type/purpose of the information transmitted/received between the base station and the user equipment.

When a power of the user equipment is turned on or the user equipment newly enters a cell, the user equipment performs an initial cell search operation including synchronization with the base station, and the like (S301). To this end, the user equipment receives a primary synchronization channel (P-SCH) and a secondary synchronization channel (S-SCH) from the base station to synchronize with the base station and obtain information including a cell ID, and the like. Thereafter, the user equipment receives a physical broadcast channel from the base station to obtain intra-cell broadcast information. The user equipment receives a downlink reference signal (DL RS) in an initial cell search step to verify a downlink channel state.

The user equipment that completes initial cell search receives a physical downlink control channel (PDCCH) and a physical downlink shared channel (PDSCH) depending on information loaded on the PDCCH to obtain more detailed system information (S302).

When there is no radio resource for initially accessing the base station or signal transmission, the user equipment may perform a random access procedure (RACH procedure) to the base station (S303 to S306). To this end, the user equipment may transmit a preamble through a physical random access channel (PRACH) (S303) and receive a response message to the preamble through the PDCCH and the PDSCH corresponding thereto (S304). In the case of a contention based RACH, a contention resolution procedure may be additionally performed.

Thereafter, the user equipment may receive the PDCCH/PDSCH (S307) and transmit a physical uplink shared channel (PUSCH)/physical uplink control channel (PUCCH) (S308) as a general procedure. The user equipment receives downlink control information (DCI) through the PDCCH. The DCI includes control information such as resource allocation information to the user equipment and a format varies depending on a use purpose. The control information which the user equipment transmits to the base station is designated as uplink control information (UCI). The UCI includes an acknowledgement/negative acknowledgement (ACK/NACK), a channel quality indicator (CQI), a precoding matrix index (PMI), a rank indicator (RI), and the like. The UCI may be transmitted through the PUSCH and/or PUCCH.

Figure 2:
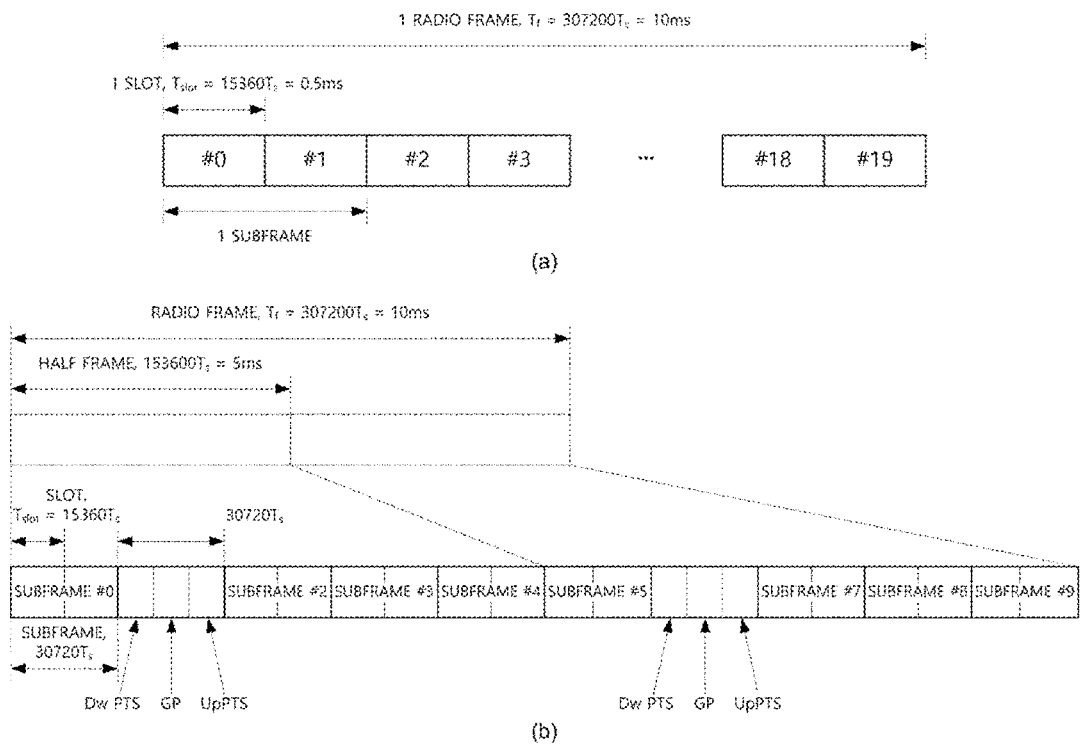
FIG. 2 illustrates one example of a radio frame structure used in a wireless communication system.

FIG. 2 illustrates one example of a radio frame structure used in a wireless communication system. FIG. 2A illustrates a frame structure for frequency division duplex (FDD) and FIG. 2B illustrates a frame structure for time division duplex (TDD).

Referring to FIG. 2, a radio frame may have a length of 10 ms (307200 Ts) and be constituted by 10 subframes (SFs). Ts represents a sampling time and is expressed as Ts=1/(2048*15 kHz). Each subframe may have a length of 1 ms and be constituted by 2 slots. Each slot has a length of 0.5 ms. A time for transmitting one subframe is defined as a transmission time interval (TTI). A time resource may be distinguished by radio frame numbers/indexes, subframe numbers/indexes #0 to #9, and slot numbers/indexes #0 to #19.

The radio frame may be configured differently according to a duplex mode. In an FDD mode, downlink transmission and uplink transmission are distinguished by a frequency and the radio frame includes only one of a downlink subframe and an uplink subframe with respect to a specific frequency band. In a TDD mode, the downlink transmission and the uplink transmission are distinguished by a time and the radio frame includes both the downlink subframe and the uplink subframe with respect to a specific frequency band.

Figure 3:
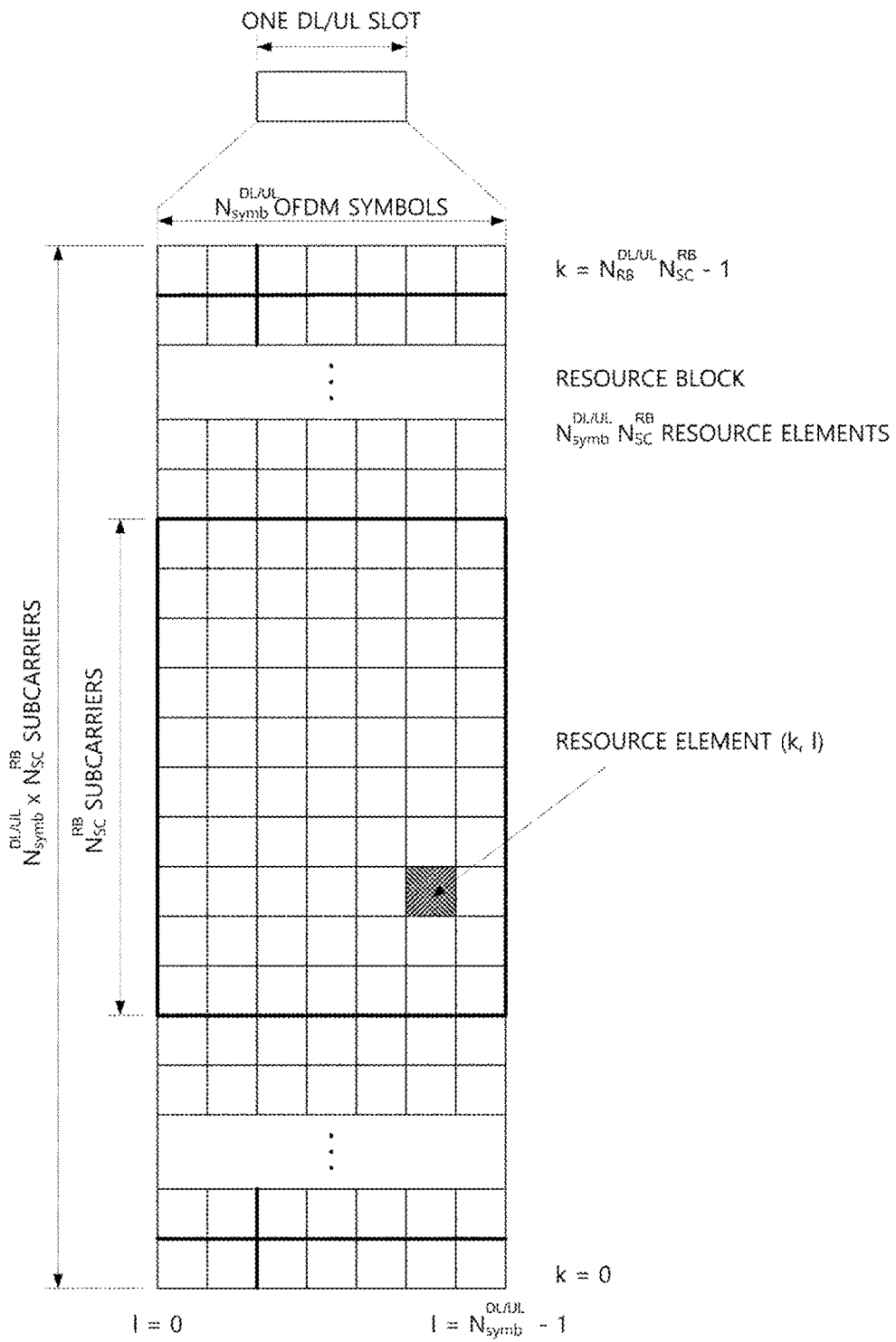
FIG. 3 illustrates one example of a downlink (DL)/uplink (UL) slot structure in the wireless communication system.

FIG. 3 illustrates a structure of a downlink/uplink slot.

Referring to FIG. 3, the slot includes a plurality of orthogonal frequency divisional multiplexing (OFDM) symbols in a time domain and a plurality of resource blocks (RBs) in a frequency domain. The OFDM symbol also means one symbol period. The OFDM symbol may be called an OFDMA symbol, a single carrier frequency division multiple access (SC-FDMA) symbol, or the like according to a multi-access scheme. The number of OFDM symbols included in one slot may be variously modified according to the length of a cyclic prefix (CP). For example, in the case of a normal CP, one slot includes 7 OFDM symbols and in the case of an extended CP, one slot includes 6 OFDM symbols. The RB is defined as $N^{DL/UL}_{symb}$ (e.g., 7) continuous OFDM symbols in the time domain and $N^{RB}_{sc}$ (e.g., 12) continuous subcarriers in the frequency domain. A resource constituted by one OFDM symbol and one subcarrier is referred to as a resource element (RE) or a tone. One RB is constituted by $N^{DL/UL}_{symb} * N^{RB}_{sc}$ resource elements.

The resource of the slot may be expressed as a resource grid constituted by $N^{DL/UL}_{symb} * N^{RB}_{sc}$ subcarriers and $N^{DL/UL}_{symb}$ OFDM symbols. Each RE in the resource grid is uniquely defined by an index pair (k, l) for each slot. k represents an index given with 0 to $N^{DL/UL}_{RB} * N^{RB}_{sc} - 1$ in the frequency domain and l represents an index given with 0 to $N^{DL/UL}_{symb} - 1$ in the time domain. Herein, $N^{DL}_{RB}$ represents the number of resource blocks (RBs) in the downlink slot and $N^{UL}_{RB}$ represents the number of RBs in the UL slot. $N^{DL}_{RB}$ and $N^{UL}_{RB}$ depend on a DL transmission bandwidth and a UL transmission bandwidth, respectively. $N^{DL}_{symb}$ represents the number of symbols in the downlink slot and $N^{UL}_{symb}$ represents the number of symbols in the UL slot. $N^{RB}_{sc}$ represents the number of subcarriers constituting one RB. One resource grid is provided per antenna port.

Figure 4:
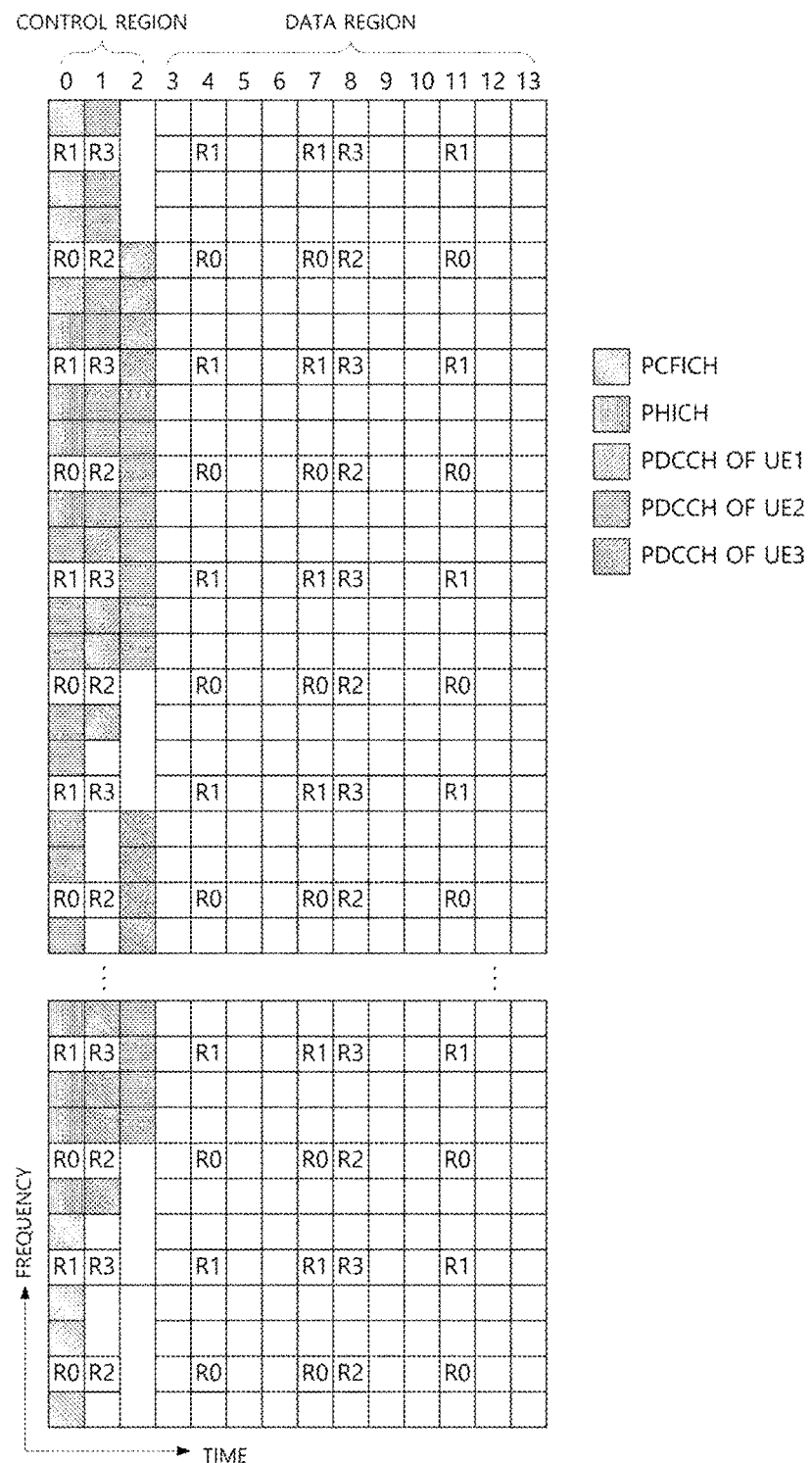
FIG. 4 illustrates a structure of a downlink subframe.

FIG. 4 illustrates a structure of a downlink subframe.

Referring to FIG. 4, the subframe may be constituted by 14 OFDM symbols. First 1 to 3 (alternatively, 2 to 4) OFDM symbols are used as a control region and the remaining 13 to 11 (alternatively, 12 to 10) OFDM symbols are used as a data region according to subframe setting. R1 to R4 represent reference signals for antenna ports 0 to 3. Control channels allocated to the control region include a physical control format indicator channel (PCFICH), a physical hybrid-ARQ indicator channel (PHICH), a physical downlink control channel (PDCCH), and the like. Data channels allocated to the data region include the PDSCH, and the like. When an enhanced PDCCH (EPDCCH) is set, the PDSCH and the EPDCCH are multiplexed by frequency division multiplexing (FDM) in the data region.

The PDCCH as the physical downlink control channel is allocated to first n OFDM symbols of the subframe. n as an integer of 1 (alternatively, 2) or more is indicated by the PCFICH. The PDCCH announces information associated with resource allocation of a paging channel (PCH) and a downlink-shared channel (DL-SCH) as transmission channels, an uplink scheduling grant, HARQ information, and the like to each user equipment or user equipment group. Data (that is, transport block) of the PCH and the DL-SCH are transmitted through the PDSCH. Each of the base station and the user equipment generally transmit and receive data through the PDSCH except for specific control information or specific service data.

Information indicating to which user equipment (one or a plurality of user equipments) the data of the PDSCH is transmitted, information indicating how the user equipments receive and decode the PDSCH data, and the like are transmitted while being included in the PDCCH/EPDCCH. For example, it is assumed that the PDCCH/EPDCCH is CRC-masked with a radio network temporary identity (RNTI) called "A" and information regarding data transmitted by using a radio resource (e.g., frequency location) called "B" and a DCI format called "C", that is, transmission format information (e.g., transport block size, modulation scheme, coding information, and the like) is transmitted through a specific subframe. In this case, a user equipment in the cell monitors the PDCCH/EPDCCH by using the RNTI information thereof and when one or more user equipments having the "A" RNTI are provided, the user equipments receive the PDCCH/EPDCCH and receive the PDSCH indicated by "B" and "C" through information on the received PDCCH/EPDCCH.

Figure 5:
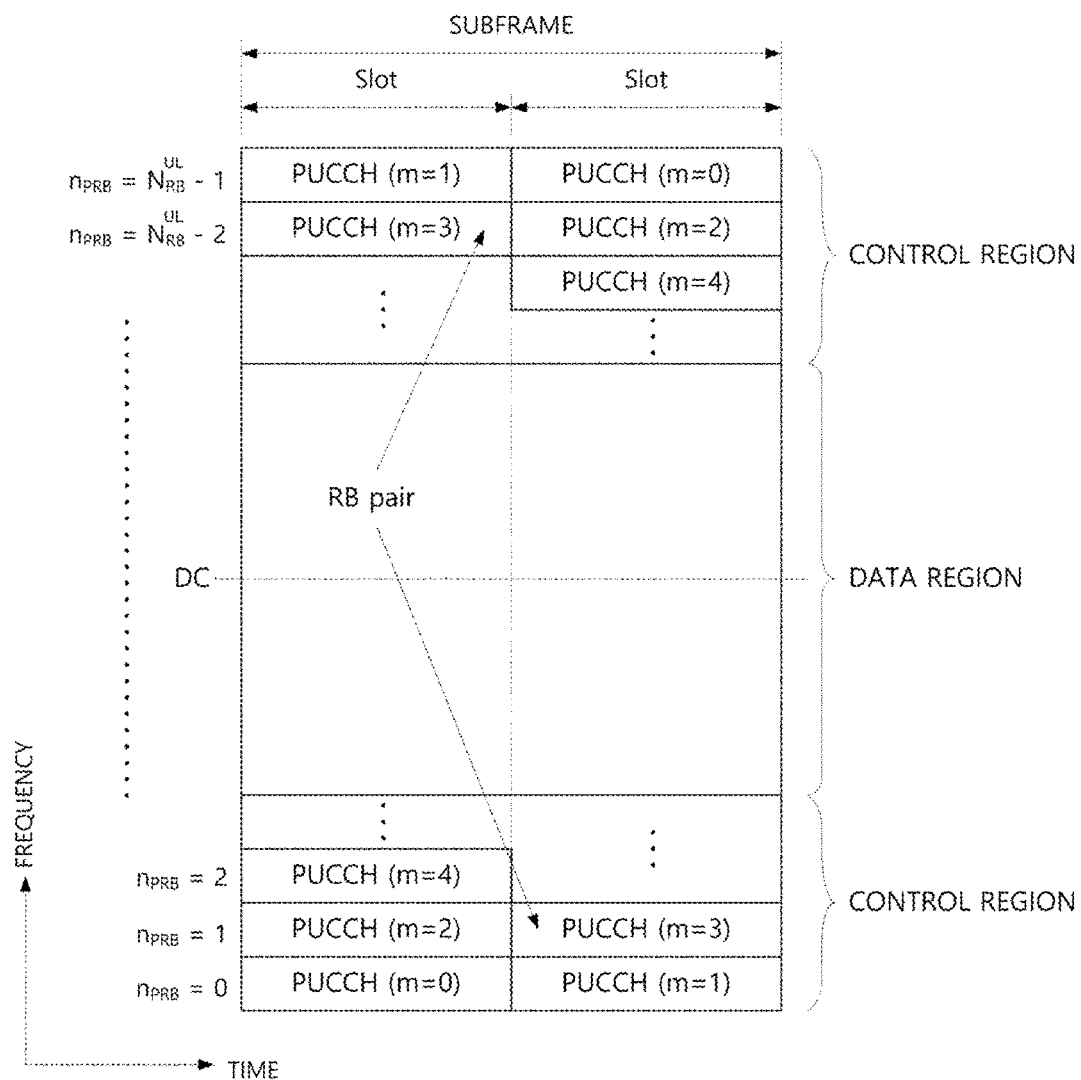
FIG. 5 illustrates a structure of an uplink subframe.

FIG. 5 illustrates a structure of an uplink subframe.

Referring to FIG. 5, the subframe may be divided into the control region and the data region in the frequency domain. The PUCCH is allocated to the control region and carries the UCI. The PUSCH is allocated to the data region and carries user data.

The PUCCH may be used to transmit the following control information.

Scheduling Request (SR): Information used to request a UL-SCH resource. The SR is transmitted by using an on-off keying (OOK) scheme.

HARQ-ACK: Response to the PDCCH and/or response to a downlink data packet (e.g., codeword) on the PDSCH. The codeword is an encoded format of the transport block. The HARQ-ACK indicates whether the PDCCH or PDSCH is successfully received. The HARQ-ACK response includes a positive ACK (simply, ACK), a negative ACK (NACK), discontinuous transmission (DTX), or the NACK/DTX. The DTX represents a case in which the user equipment misses the PDCCH (alternatively, semi-persistent scheduling (SPS) PDSCH) and the NACK/DTX means the NACK or DTX. The HARQ-ACK is mixedly used with the HARQ-ACK/NACK and the ACK/NACK.

Channel State Information (CSI): Feed-back information regarding the downlink channel. Multiple input multiple output (MIMO) related feed-back information includes the RI and the PMI.

Table 1 shows the relationship between a PUCCH format and the UCI.

TABLE 1

| PUCCH Format | Uplink control information (UCI) |
| --- | --- |
| Format 1 | Scheduling request (SR) (non-modulated waveform) |
| Format 1a | 1-bit HARQ ACK/NACK (SR existence/non-existence) |
| Format 1b | 2-bit HARQ ACK/NACK (SR existence/non-existence) |
| Format 2 | CSI (20 coded bits) |
| Format 2 | CSI and 1 or 2-bit HARQ ACK/NACK (20 bits) (corresponding to only extended CP) |
| Format 2a | CSI and 1-bit HARQ ACK/NACK (20 + 1 coded bits) |
| Format 2b | CSI and 2-bit HARQ ACK/NACK (20 + 2 coded bits) |
| Format 3 (LTE-A) | HARQ ACK/NACK + SR (48 coded bits) |

Hereinafter, carrier aggregation will be described. The carrier aggregation means a method in which the wireless communication system uses a plurality of frequency blocks as one large logical frequency band in order to use a wider frequency band. When a whole system band is extended by the carrier aggregation, a frequency band used for communication with each user equipment is defined by a component carrier (CC) unit.

Figure 6:
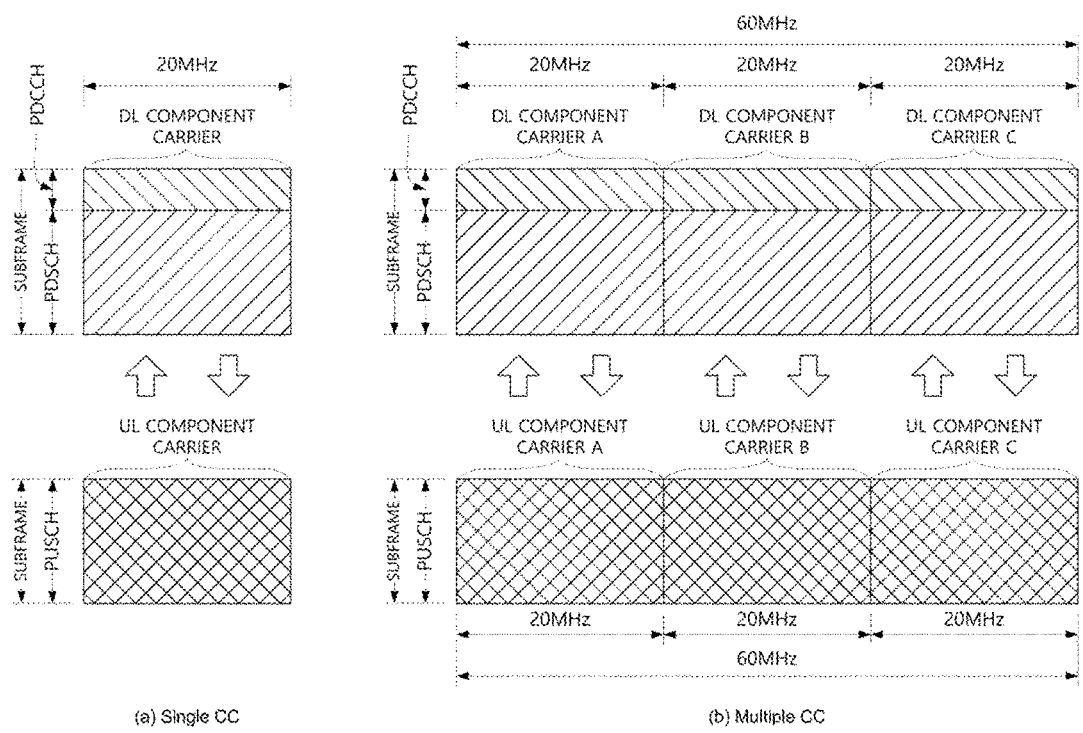
FIG. 6 is a diagram for describing single carrier communication and multi-carrier communication.

FIG. 6 is a diagram for describing single carrier communication and multi-carrier communication. FIG. 6(a) illustrates a subframe structure of a single carrier and FIG. 6(b) illustrates a subframe structure of multi-carriers which are carrier-aggregated.

Referring to FIG. 6(a), in a single carrier system, the base station and the user equipment perform data communication through one DL band and one UL band corresponding thereto. The DL/UL band is divided into a plurality of orthogonal subcarriers and each frequency band operates at one carrier frequency. In the FDD, the DL and UL bands operate at different carrier frequencies, respectively and in the TDD, the DL and UL bands operate at the same carrier frequency. The carrier frequency means a center frequency of the frequency band.

Referring to FIG. 6(b), the carrier aggregation is distinguished from an OFDM system that performs DL/UL communication in a base frequency band divided into a plurality of subcarriers by using one carrier frequency, in that the carrier aggregation performs DL/UL communication by using a plurality of carrier frequencies. Referring to FIG. 6(b), three 20 MHz CCs are gathered in each of the UL and the DL to support a bandwidth of 60 MHz. The CCs may be adjacent to each other or non-adjacent to each other in the frequency domain. For convenience, FIG. 6(b) illustrates a case in which a bandwidth of a UL CC and a bandwidth of a DL CC are the same as each other and symmetric to each other, but the bandwidths of the respective CCs may be independently decided. Further, asymmetric carrier aggregation in which the number of UL CCs and the number of DL CCs are different from each other is also available. The DL/UL CC(s) are independently allocated/configured for each user equipment and the DL/UL CC(s) allocated/configured to the user equipment are designated as serving UL/DL CC(s) of the corresponding user equipment.

The base station may activate some or all of serving CCs of the user equipment or deactivate some CCs. When the base station allocates the CC(s) to the user equipment, if the CC allocation to the user equipment is wholly reconfigured or if the user equipment does not hand over, at least one specific CC among the CC(s) configured with respect to the corresponding user equipment is not deactivated. A specific CC which is always activated is referred to as a primary CC (PCC) and a CC which the base station may arbitrarily activate/deactivate is referred to as a secondary CC (SCC). The PCC and the SCC may be distinguished based on the control information. For example, specific control information may be set to be transmitted/received only through a specific CC and the specific CC may be referred to as the PCC and remaining CC(s) may be referred to as SCC(s). The PUCCH is transmitted only on the PCC.

In 3GPP, a concept of the cell is used in order to manage the radio resource. The cell is defined as a combination of the DL resource and the UL resource, that is, a combination of the DL CC and the UL CC. The cell may be configured by the DL resource only or the combination of the DL resource and the UL resource. When the carrier aggregation is supported, a linkage between the carrier frequency of the DL resource (alternatively, DL CC) and the carrier frequency of the UL resource (alternatively, UL CC) may be indicated by system information. For example, the combination of the DL resource and the UL resource may be indicated by a system information block type 2 (SIB2) linkage. The carrier frequency means a center frequency of each cell or CC. A cell corresponding to the PCC is referred to as the primary cell (PCell) and a cell corresponding to the SCC is referred to as the secondary cell (SCell). A carrier corresponding to the PCell is a DL PCC in the downlink and a carrier corresponding to the PCell is a UL PCC in the uplink. Similarly, a carrier corresponding to the SCell is a DL SCC in the downlink and a carrier corresponding to the SCell is a UL SCC in the uplink. According to a user equipment capability, the serving cell(s) may be constituted by one PCell and 0 or more SCells. For a user equipment which is in an RRC_CONNECTED state, but does not have any configuration for the carrier aggregation or does not support the carrier aggregation, only one serving cell constituted by only the PCell is present.

Figure 7:
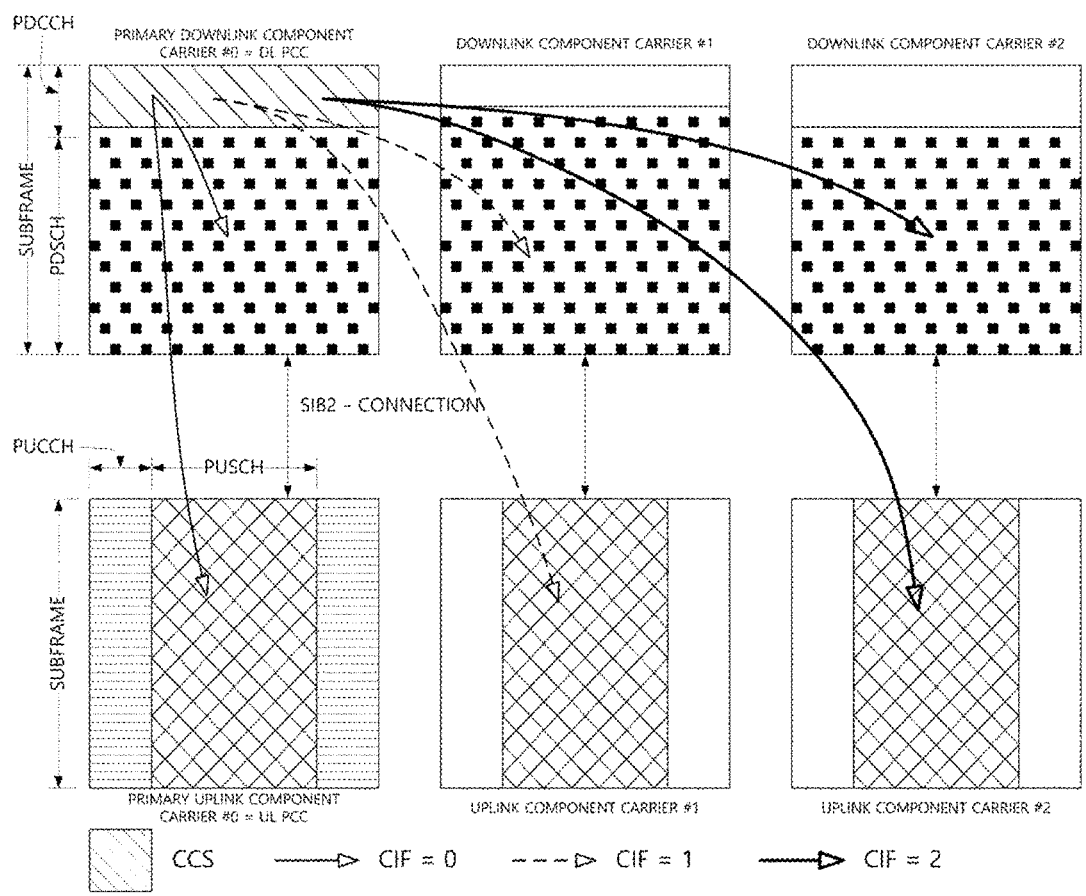
FIG. 7 illustrates an example in which a cross carrier scheduling technique is applied.

FIG. 7 illustrates an example in which cross carrier scheduling is applied. When the cross carrier scheduling is configured, a control channel transmitted through a first CC may schedule a data channel transmitted through the first CC or a second CC by using a carrier indicator field (CIF). The CIF is included in the DCI. In other words, a scheduling cell is configured, and a DL grant/UL grant transmitted in a PDCCH area of the scheduling cell schedules the PDSCH/PUSCH of a scheduled cell. That is, a search space for a plurality of component carriers is present in the PDCCH area of the scheduling cell. The PCell may be basically the scheduling cell and a specific SCell may be designated as the scheduling cell by an upper layer.

In FIG. 7, it is assumed that three DL CCs are aggregated. Herein, DL component carrier #0 is assumed as the DL PCC (alternatively, PCell) and DL component carrier #1 and DL component carrier #2 are assumed as the DL SCC (alternatively, SCell). Further, it is assumed that the DL PCC is set as a PDCCH monitoring CC. When the CIF is disabled, the respective DL CCs may transmit only the PDCCH that schedules the PDSCH thereof without the CIF according to an LTE PDCCH rule (non-cross carrier scheduling or self-carrier scheduling). On the contrary, when the CIF is enabled by UE-specific (alternatively, UE-group-specific or cell-specific) upper layer signaling, a specific CC (e.g., DL PCC) may transmit the PDCCH scheduling the PDSCH of DL CC A and the PDCCH scheduling the PDSCH of another CC by using the CIF (cross-carrier scheduling). On the contrary, in another DL CC, the PDCCH is not transmitted.

Figure 8:
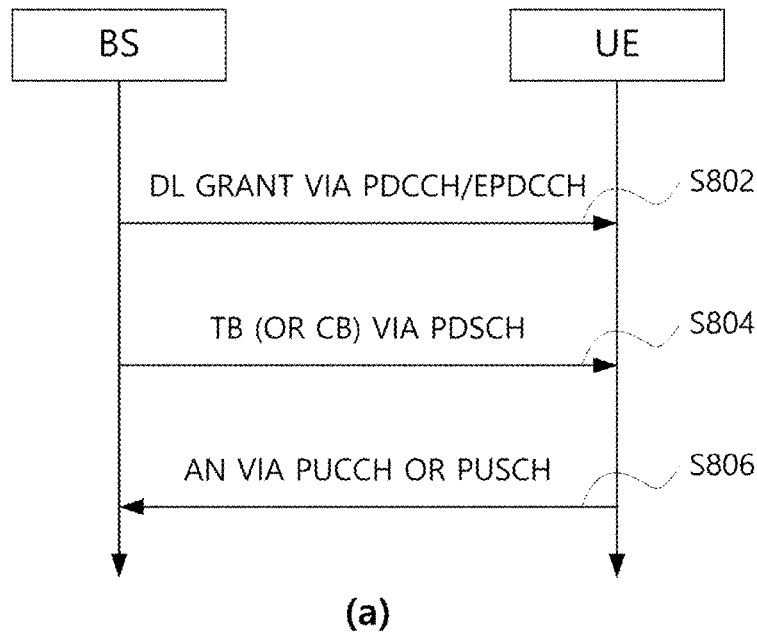
FIG. 8 illustrates a DL/UL hybrid automatic repeat request (HARQ) procedure in a single cell situation.
Figure 8:
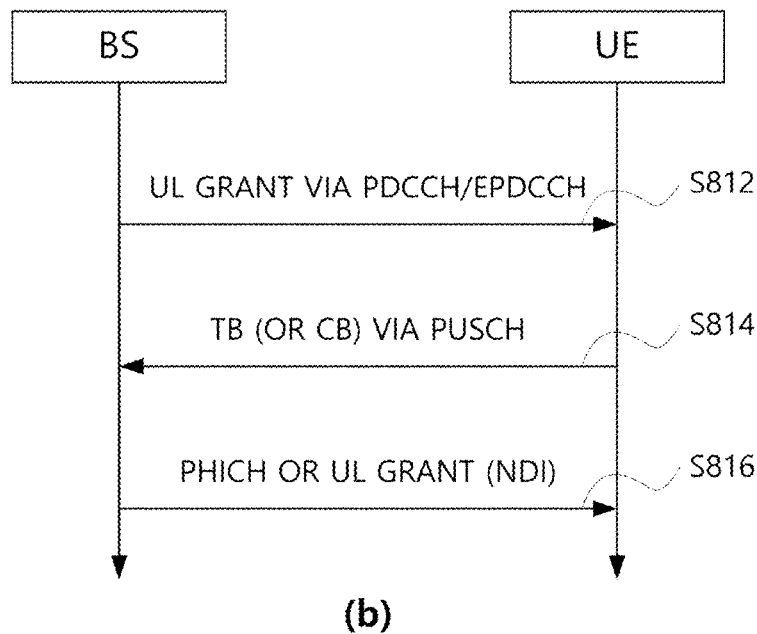

FIG. 8 illustrates a DL/UL HARQ procedure for a single cell situation. FIG. 8(a) illustrates a DL HARQ procedure, and FIG. 8(b) illustrates a UL HARQ procedure. In the case of DL HARQ procedure, ACK/NACK (A/N) for (i) a PDSCH scheduled by a PDCCH, (ii) a PDSCH (i.e., SPS PDSCH) without a corresponding PDCCH, and (iii) a PDCCH indicating the SPS release are fed back. In the case of UL HARQ procedure, ACK/NACK (A/N) for (i) a PUSCH scheduled by a PDCCH and (ii) a PUSCH (i.e., SPS PUSCH) without a corresponding PDCCH are fed back. A PDCCH includes an EPDCCH.

Referring to FIG. 8(a), a user equipment receives a PDCCH (alternatively, EPDCCH) in a subframe #n−k (S802) and receives a PDSCH indicated by the PDCCH in the same subframe (S804). The PDCCH transmits scheduling information (that is, DL grant) and the PDSCH transmits one or a plurality of (e.g., two) transport blocks (TBs) (alternatively, codeword (CW)) according to a transmission mode. Thereafter, the user equipment may transmit an ACK/NACK for the PDSCH (that is, transport block) in a subframe #n (S806). ACK/NACK 1 bit may be transmitted in response to a single transport block and ACK/NACK 2 bits may be transmitted in response to two transport blocks. The ACK/NACK is basically transmitted through the PUCCH, but when the PUSCH is transmitted in the subframe #n, the ACK/NACK may be transmitted through the PUSCH. k represents a time interval between the DL subframe and the UL subframe. In the FDD, k=4 and in the TDD, k may be given by a downlink association set index (DASI). The ACK/NACK means the HARQ-ACK. The HARQ-ACK response includes ACK, NACK, DTX, and NACK/DTX.

Referring to FIG. 8(b), the user equipment receives a PDCCH (alternatively, EPDCCH) in a subframe #n−k1 (S812) and transmits a PUSCH indicated by the PDCCH in the subframe #n (S814). The PDCCH transmits scheduling information (that is, UL grant), and the PUSCH transmits one or a plurality (e.g., two) of transport blocks (TBs) (alternatively, codewords (CW)) according to a transmission mode. Thereafter, the user equipment receives reception response information for the PUSCH (i.e., the transport block) in a subframe #n+k2 through a PHICH or UL grant (S816). The UL grant includes new data indicator (NDI) for each TB. In addition, the NDI indicates a new data transmission or indicates retransmission of the TB of the previous PUSCH according to the toggle. For example, if the NDI is toggled from the NDI value of the previous UL grant, the NDI indicates the new data transmission, and otherwise the NDI indicates retransmission of the TB of the previous PUSCH. k1/k2 indicates a time interval between the DL subframe and the UL subframe. In the FDD, k1=k2=4, and in the TDD, k1/k2 depends on the TDD UL-DL configuration.

When a plurality of cells are configured for the user equipment, ACK/NACK information may be transmitted by using PUCCH format 3 or a channel selection scheme based on PUCCH format 1b.

An ACK/NACK payload for PUCCH format 3 is configured for each cell and thereafter, concatenated according to a cell index order. The ACK/NACK payload is configured with respect to all cells configured to the user equipment regardless of actual data transmission in each cell. Each bit in the ACK/NACK payload indicates HARQ-ACK feedback for the corresponding transport block (alternatively, codeword). The HARQ/ACK feed-back indicates ACK or NACK, and DTX is processed as the NACK. The NACK and the DTX have the same HARQ-ACK feed-back value. If necessary, the base station may distinguish the NACK and the DTX by using information on the control channel which the base station transmits to the user equipment.

The channel selection scheme based on the PUCCH format 1b may be set for transmitting the ACK/NACK when two cells are aggregated. In the channel selection scheme based on the PUCCH format 1b, ACK/NACK responses to the plurality of transport blocks (alternatively, codewords) are identified by a combination of a PUCCH resource index and a bit value.

Table 2 shows mapping between HARQ-ACK(j) and the transport block (TB) of each cell in the channel selection scheme based on the PUCCH format 1b. Tables 3 to 5 show mapping of ACK, NACK, DTX, and NACK/DTX when A=2 to 4, respectively. The user equipment selects one PUCCH resource corresponding to an HARQ-ACK set from A PUCCH resources and transmits a 2-bit value corresponding to the HARQ-ACK set by using the selected PUCCH resource. The DTX is transmitted singly or as the NACK/DTX. When the NACK/DTX is transmitted, if necessary, the base station may distinguish the NACK and the DTX by using the information on the control channel which the base station transmits to the user equipment.

TABLE 2

| | HARQ-ACK(j) | | | |
|---|---|---|---|---|
| A | HARQ-ACK(0) | HARQ-ACK(1) | HARQ-ACK(2) | HARQ-ACK(3) |
| 2 | TB1 PRIMARY CELL | TB1 SECONDARY CELL | NA | NA |
| 3 | TB1 SERVING CELL1 | TB2 SERVING CELL1 | TB1 SERVING CELL2 | NA |
| 4 | TB1 PRIMARY CELL | TB2 PRIMARY CELL | TB1 SECONDARY CELL | TB2 SECONDARY CELL |

TABLE 3

| HARQ-ACK(0) | HARQ-ACK(1) | $n_{PUCCH}^{(1)}$ | b(0)b(1) |
|---|---|---|---|
| ACK | ACK | $n_{PUCCH,1}^{(1)}$ | 1, 1 |
| ACK | NACK/DTX | $n_{PUCCH,0}^{(1)}$ | 1, 1 |
| NACK/DTX | ACK | $n_{PUCCH,1}^{(1)}$ | 0, 0 |
| NACK | NACK/DTX | $n_{PUCCH,0}^{(1)}$ | 0, 0 |
| DTX | NACK/DTX | NO TRANSMISSION | |

TABLE 4

| HARQ-ACK(0) | HARQ-ACK(1) | HARQ-ACK(2) | $n_{PUCCH}^{(1)}$ | b(0)b(1) |
|---|---|---|---|---|
| ACK | ACK | ACK | $n_{PUCCH,1}^{(1)}$ | 1, 1 |
| ACK | NACK/DTX | ACK | $n_{PUCCH,1}^{(1)}$ | 1, 0 |
| NACK/DTX | ACK | ACK | $n_{PUCCH,1}^{(1)}$ | 0, 1 |
| NACK/DTX | NACK/DTX | ACK | $n_{PUCCH,2}^{(1)}$ | 1, 1 |
| ACK | ACK | NACK/DTX | $n_{PUCCH,0}^{(1)}$ | 1, 1 |
| ACK | NACK/DTX | NACK/DTX | $n_{PUCCH,0}^{(1)}$ | 1, 0 |
| NACK/DTX | ACK | NACK/DTX | $n_{PUCCH,0}^{(1)}$ | 0, 1 |
| NACK/DTX | NACK/DTX | NACK | $n_{PUCCH,2}^{(1)}$ | 0, 0 |
| NACK | NACK/DTX | DTX | $n_{PUCCH,0}^{(1)}$ | 0, 0 |
| NACK/DTX | NACK | DTX | $n_{PUCCH,0}^{(1)}$ | 0, 0 |
| DTX | DTX | DTX | NO TRANSMISSION | |

TABLE 5

| HARQ-ACK(0) | HARQ-ACK(1) | HARQ-ACK(2) | HARQ-ACK(3) | $n_{PUCCH}^{(1)}$ | b(0)b(1) |
|---|---|---|---|---|---|
| ACK | ACK | ACK | ACK | $n_{PUCCH,1}^{(1)}$ | 1, 1 |
| ACK | NACK/DTX | ACK | ACK | $n_{PUCCH,2}^{(1)}$ | 0, 1 |
| NACK/DTX | ACK | ACK | ACK | $n_{PUCCH,1}^{(1)}$ | 0, 1 |
| NACK/DTX | NACK/DTX | ACK | ACK | $n_{PUCCH,3}^{(1)}$ | 1, 1 |
| ACK | ACK | ACK | NACK/DTX | $n_{PUCCH,1}^{(1)}$ | 1, 0 |
| ACK | NACK/DTX | ACK | NACK/DTX | $n_{PUCCH,2}^{(1)}$ | 0, 0 |
| NACK/DTX | ACK | ACK | NACK/DTX | $n_{PUCCH,1}^{(1)}$ | 0, 0 |
| NACK/DTX | NACK/DTX | ACK | NACK/DTX | $n_{PUCCH,3}^{(1)}$ | 1, 0 |
| ACK | ACK | NACK/DTX | ACK | $n_{PUCCH,2}^{(1)}$ | 1, 1 |
| ACK | NACK/DTX | NACK/DTX | ACK | $n_{PUCCH,2}^{(1)}$ | 1, 0 |
| NACK/DTX | ACK | NACK/DTX | ACK | $n_{PUCCH,3}^{(1)}$ | 0, 1 |
| NACK/DTX | NACK/DTX | NACK/DTX | ACK | $n_{PUCCH,3}^{(1)}$ | 0, 0 |
| ACK | ACK | NACK/DTX | NACK/DTX | $n_{PUCCH,0}^{(1)}$ | 1, 1 |
| ACK | NACK/DTX | NACK/DTX | NACK/DTX | $n_{PUCCH,0}^{(1)}$ | 1, 0 |
| NACK/DTX | ACK | NACK/DTX | NACK/DTX | $n_{PUCCH,0}^{(1)}$ | 0, 1 |
| NACK/DTX | NACK | NACK/DTX | NACK/DTX | $n_{PUCCH,0}^{(1)}$ | 0, 0 |

TABLE 5-continued

| HARQ-ACK(0) | HARQ-ACK(1) | HARQ-ACK(2) | HARQ-ACK(3) | $n_{PUCCH}^{(1)}$ | b(0)b(1) |
|---|---|---|---|---|---|
| NACK | NACK/DTX | NACK/DTX | NACK/DTX | $n_{PUCCH,0}^{(1)}$ | 0, 0 |
| DTX | DTX | NACK/DTX | NACK/DTX | NO TRANSMISSION | |

Example: CWS Adjustment Scheme for Random Back-Off in Unlicensed Band

Figure 9:
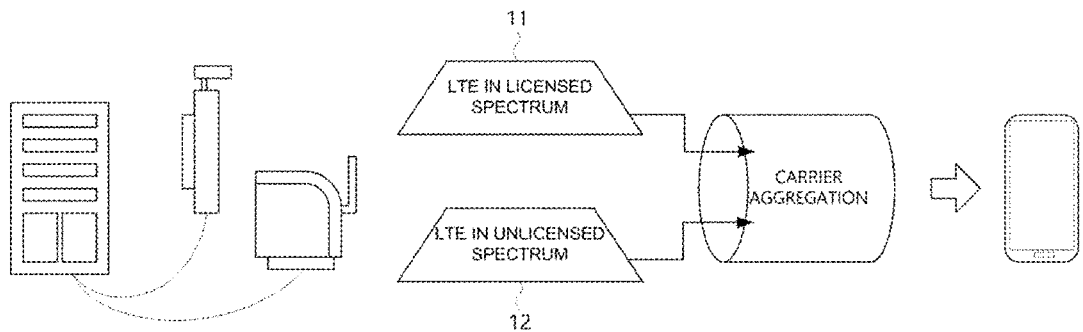
FIG. 9 illustrates a licensed assisted access (LAA) service environment.

FIG. 9 illustrates a licensed assisted access (LAA) service environment. Referring to FIG. 9, a service environment may be provided to a user, in the service environment, an LTE technology (11) in a conventional licensed band and LTE-unlicensed (LTE-U) or LAA which is an LTE technology (12) in an unlicensed band, which has been actively discussed may be connected to each other. For example, the LTE technology (11) in the licensed band and the LTE technology (12) in the unlicensed band in the LAA environment may be integrated by using a technology such as carrier aggregation, or the like, which may contribute to extension of a network capacity. Further, in an asymmetric traffic structure in which the amount of downlink data is more than that of uplink data, the LAA may provide an optimized LTE service according to various requirements or environments. For convenience, the LTE technology in the licensed (alternatively, authorized or permitted) band is referred to as LTE-licensed (LTE-L) and the LTE technology in the unlicensed (alternatively, unauthorized, non-licensed, license-unnecessary) band is referred to as LTE-unlicensed (LTE-U) or LAA.

Figure 10:
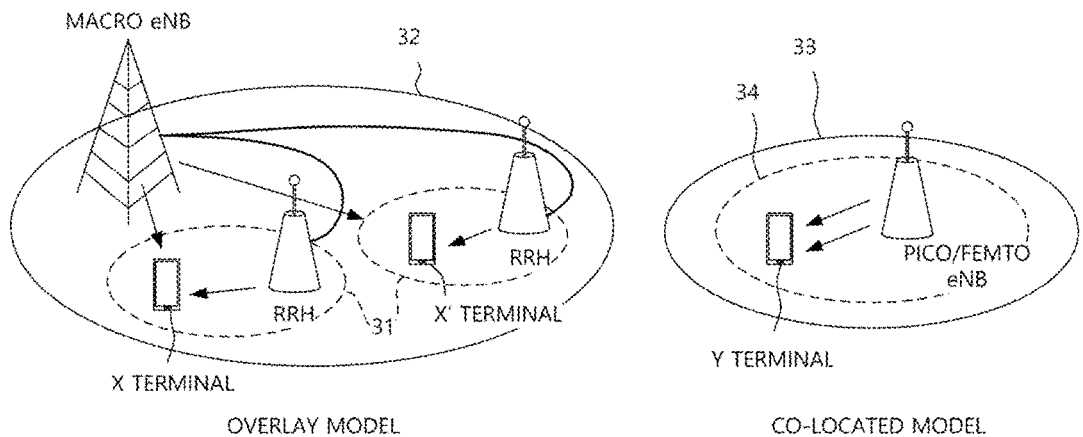
FIG. 10 illustrates a layout scenario of a user equipment and a base station in an LAA service environment.

FIG. 10 illustrates a layout scenario of a user equipment and a base station in an LAA service environment. A frequency band targeted by the LAA service environment has a short wireless communication reach distance due to a high-frequency characteristic. By considering this, the layout scenario of the user equipment and the base station in an environment in which the conventional LTE-L service and the LAA service coexist may be an overlay model and a co-located model.

In the overlay model, a macro base station may perform wireless communication with an X UE and an X' UE in a macro area (32) by using a licensed carrier and be connected with multiple radio remote heads (RRHs) through an X2 interface. Each RRH may perform wireless communication with an X UE or an X' UE in a predetermined area (31) by using an unlicensed carrier. The frequency bands of the macro base station and the RRH are different from each other not to interfere with each other, but data needs to be rapidly exchanged between the macro base station and the RRH through the X2 interface in order to use the LAA service as an auxiliary downlink channel of the LTE-L service through the carrier aggregation.

In the co-located model, a pico/femto base station may perform the wireless communication with a Y UE by using both the licensed carrier and the unlicensed carrier. However, it may be limited that the pico/femto base station uses both the LTE-L service and the LAA service to downlink transmission. A coverage (33) of the LTE-L service and a coverage (34) of the LAA service may be different according to the frequency band, transmission power, and the like.

When LTE communication is performed in the unlicensed band, conventional equipments (e.g., wireless LAN (Wi-Fi) equipments) which perform communication in the corresponding unlicensed band may not demodulate an LTE-U message or data and determine the LTE-U message or data as a kind of energy to perform an interference avoidance operation by an energy detection technique. That is, when energy corresponding to the LTE-U message or data is lower than −62 dBm or certain energy detection (ED) threshold value, the wireless LAN equipments may perform communication by disregarding the corresponding message or data. As a result, that user equipment which performs the LTE communication in the unlicensed band may be frequently interfered by the wireless LAN equipments.

Therefore, a specific frequency band needs to be allocated or reserved for a specific time in order to effectively implement an LTE-U technology/service. However, since peripheral equipments which perform communication through the unlicensed band attempt access based on the energy detection technique, there is a problem in that an efficient LTE-U service is difficult. Therefore, a research into a coexistence scheme with the conventional unlicensed band device and a scheme for efficiently sharing a radio channel needs to be preferentially made in order to settle the LTE-U technology. That is, a robust coexistence mechanism in which the LTE-U device does not influence the conventional unlicensed band device needs to be developed.

Figure 11:
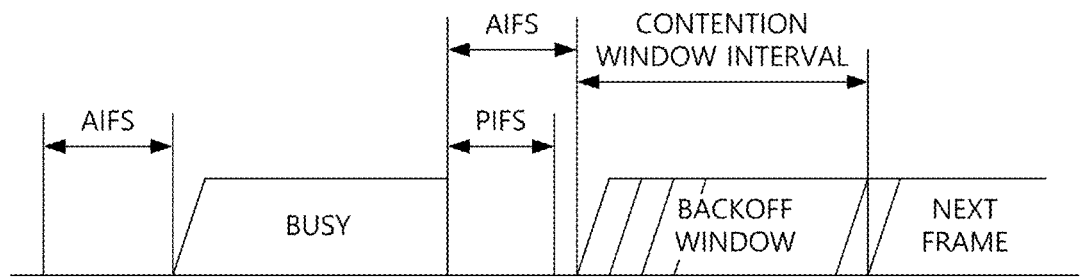
FIG. 11 illustrates a communication scheme that operates in an unlicensed band in the related art.

FIG. 11 illustrates a communication scheme (e.g., wireless LAN) that operates in an unlicensed band in the related art. Since most devices that operate in the unlicensed band operate based on listen-before-talk (LBT), a clear channel assessment (CCA) technique that senses a channel before data transmission is performed.

Referring to FIG. 11, a wireless LAN device (e.g., AP or STA) checks whether the channel is busy by performing carrier sensing before transmitting data. When a predetermined strength or more of radio signal is sensed in a channel to transmit data, it is determined that the corresponding channel is busy and the wireless LAN device delays the access to the corresponding channel Such a process is referred to as clear channel evaluation and a signal level to decide whether the signal is sensed is referred to as a CCA threshold. Meanwhile, when the radio signal is not sensed in the corresponding channel or a radio signal having a strength smaller than the CCA threshold is sensed, it is determined that the channel is idle.

When it is determined that the channel is idle, a terminal having data to be transmitted performs a back-off procedure after a defer period (e.g., arbitration interframe space (AIFS), PCF IFS (PIFS), or the like). The defer period means a minimum time when the terminal needs to wait after the channel is idle. The back-off procedure allows the terminal to further wait for a predetermined time after the defer period. For example, the terminal stands by while decreasing a slot time for slot times corresponding to a random number allocated to the terminal in the contention window (CW) during the channel is in an idle state, and a terminal that completely exhausts the slot time may attempt to access the corresponding channel.

When the terminal successfully accesses the channel, the terminal may transmit data through the channel. When the data is successfully transmitted, a CW size (CWS) is reset to an initial value (CWmin). On the contrary, when the data is unsuccessfully transmitted, the CWS increases twice. As a result, the terminal is allocated with a new random number within a range which is twice larger than a previous random number range to perform the back-off procedure in a next CW. In the wireless LAN, only an ACK is defined as receiving response information to the data transmission. Therefore, when the ACK is received with respect to the data transmission, the CWS is reset to the initial value and when feed-back information is not received with respect to the data transmission, the CWS increases twice.

As described above, since most communications in the unlicensed band in the related art operate based on the LBT, the LTE also considers the LBT in the LAA for coexistence with the conventional device. In detail, in the LTE, the channel access method on the unlicensed band may be divided into 4 following categories according to the presence/an application scheme of the LBT.

Category 1 (cat-1): No LBT
An LBT procedure by a Tx entity is not performed.

Category 2 (cat-2): LBT without random back-off
A time interval (e.g., 25 us) in which the channel needs to be sensed in an idle state before the Tx entity performs a transmission on the channel is decided. The random back-off is not performed. This may be referred to as a type 2 channel access.

Category 3 (cat-3): LBT with random back-off with a CW of fixed size
LBT method that performs random back-off by using a CW of a fixed size.

The Tx entity has a random number N in the CW and the CW size is defined by a minimum/maximum value of N. The CW size is fixed. The random number N is used to decide the time interval in which the channel needs to be sensed in an idle state before the Tx entity performs a transmission on the channel.

Category 4 (cat-4): LBT with random back-off with a CW of variable size
LBT method that performs the random back-off by using a CW of a variable size. The Tx entity has the random number N in the CW and the CW size is defined by the minimum/maximum value of N. The Tx entity may change the CW size at the time of generating the random number N. The random number N is used to decide the time interval in which the channel needs to be sensed in an idle state before the Tx entity performs a transmission on the channel. This may be referred to as a type 1 channel access.

Figure 12:
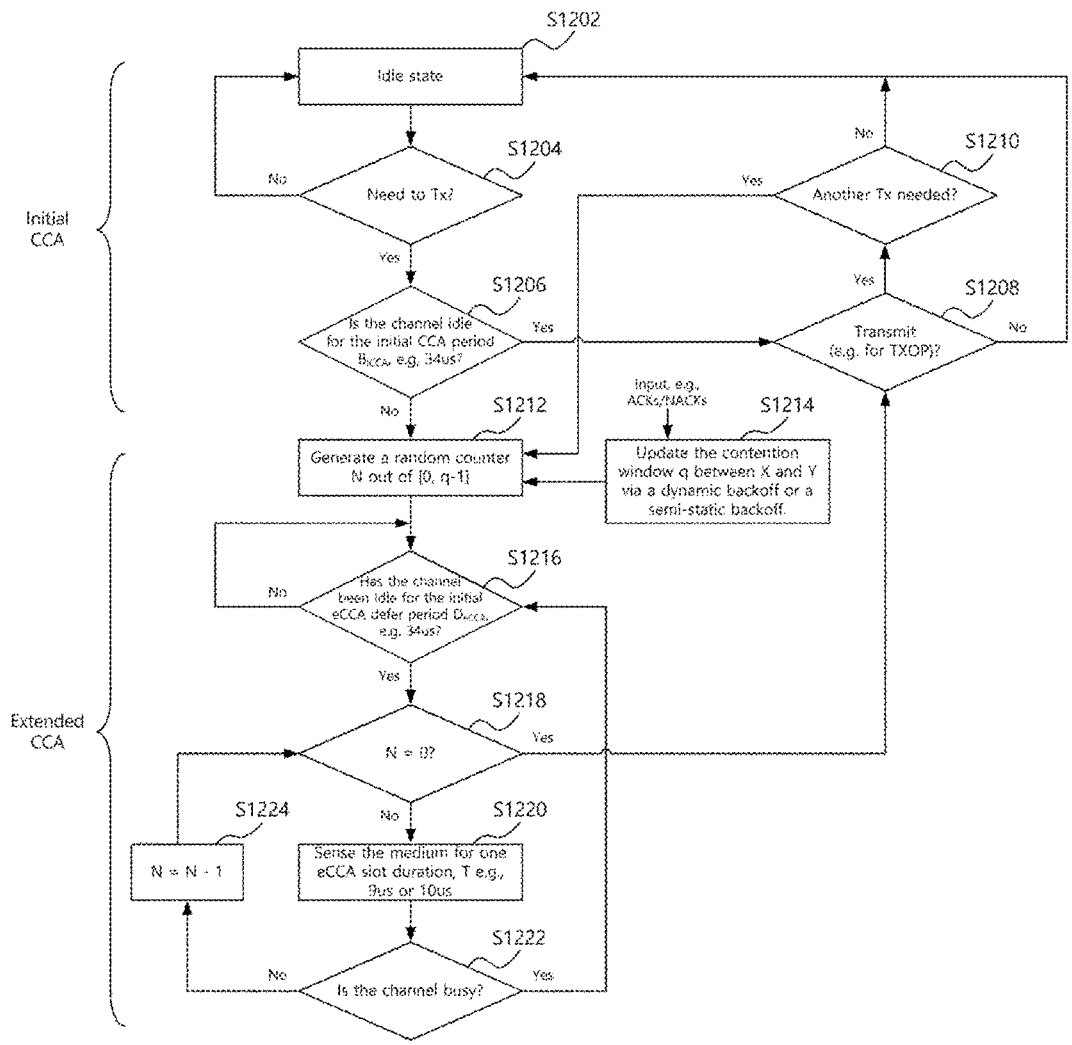
FIGS. 12 and 13 illustrate a listen-before-talk (LBT) process for DL transmission.
Figure 13:
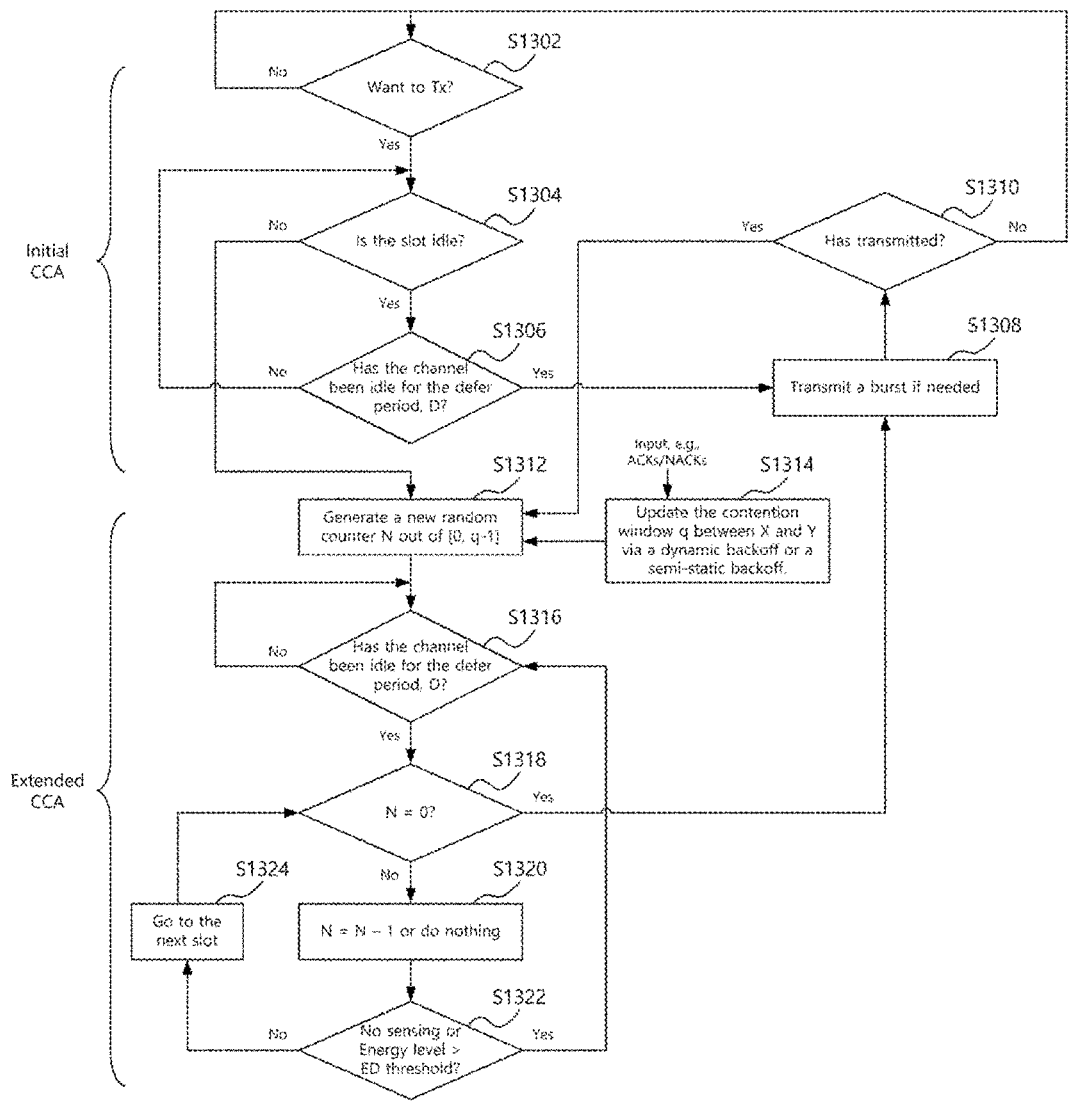

FIGS. 12 and 13 illustrate a DL transmission process based on the category 4 LBT. The category 4 LBT may be used to guarantee fair channel access with Wi-Fi. Referring to FIGS. 12 and 13, the LBT process includes initial CCA (ICCA) and extended CCA (ECCA). In the ICCA, the random back-off is not performed and in the ECCA, the random back-off is performed by using the CW of the variable size. The ICCA is applied to the case in which the channel is idle when signal transmission is required and the ECCA is applied to the case in which the channel is busy when the signal transmission is required or DL transmission is performed just before. Although the following description is based on the DL transmission, it is also applicable to the UL transmission. In the case of UL transmission, the base station is replaced with a user equipment in the following description.

Referring to FIG. 12, a downlink transmission process based on the category 4 LBT, that is, the Type 1 channel access may be performed as follows.

Initial CCA
S1202: The base station verifies that the channel is idle.
S1204: The base station verifies whether the signal transmission is required. When the signal transmission is not required, the process returns to S1202 and when the signal transmission is required, the process proceeds to S1206.

S1206: The base station verifies whether the channel is idle for an ICCA defer period ($B_{CCA}$). The ICCA defer period is configurable. As an implementation example, the ICCA defer period may be constituted by an interval of 16 is and n consecutive CCA slots. Herein, n may be a positive integer and one CCA slot interval may be 9 μs. The number of CCA slots may be configured differently according to a QoS class. The ICCA defer period may be set to an appropriate value by considering a defer period (e.g., DIFS or AIFS) of Wi-Fi. For example, the ICCA defer period may be 34 us. When the channel is idle for the ICCA defer period, the base station may perform the signal transmitting process (S1208). When it is determined that the channel is busy during the ICCA defer period, the process proceeds to S1212 (ECCA).

S1208: The base station may perform the signal transmitting process. When the signal transmission is not performed, the process proceeds to S1202 (ICCA) and when the signal transmission is performed, the process proceeds to S1210. Even in the case where a back-off counter N reaches 0 in S1218 and S1208 is performed, when the signal transmission is not performed, the process proceeds to S1202 (ICCA) and when the signal transmission is performed, the process proceeds to S1210.

S1210: When additional signal transmission is not required, the process proceeds to S1202 (ICCA) and when the additional signal transmission is required, the process proceeds to S1212 (ECCA).

Extended CCA
S1212: The base station generates the random number N in the CW. N is used as a counter during the back-off process and generated from [0, q−1]. The CW may be constituted by q ECCA slots and an ECCA slot size may be 9 μs or 10 μs. The CW size (CWS) may be defined as q and be variable in S1214. Thereafter, the base station proceeds to S1216.

S1214: The base station may update the CWS. The CWS q may be updated to a value between X and Y. The X and Y values are configurable parameters. CWS update/adjustment may be performed whenever N is generated (dynamic back-off) and semi-statically performed at a predetermined time interval (semi-static back-off). The CWS may be updated/adjusted based on exponential back-off or binary back-off. That is, the CWS may be updated/adjusted in the form of the square of 2 or the multiple of 2. In association with PDSCH transmission, the CWS may be updated/adjusted based on feed-back/report (e.g., HARQ ACK/NACK) of the user equipment or updated/adjusted based on base station sensing.

S1216: The base station verifies whether the channel is idle for an ECCA defer period (DeCCA). The ECCA defer period is configurable. As an implementation example, the ECCA defer period may be constituted by an interval of 16 μs and n consecutive CCA slots. Herein, n may be a positive integer and one CCA slot interval may be 9 μs. The number of CCA slots may be configured differently according to the QoS class. The ECCA defer period may be set to the appropriate value by considering the defer period (e.g., DIFS or AIFS) of Wi-Fi. For example, the ECCA defer period may be 34 us. When the channel is idle for the ECCA defer period, the base station proceeds to S1218. When it is determined that the channel is busy during the ECCA defer period, the base station repeats S1216.

S1218: The base station verifies whether N is 0. When N is 0, the base station may perform the signal transmitting process (S1208). In this case, (N=0), the base station may not immediately perform transmission and performs CCA check for at least one slot to continue the ECCA process. When N is not 0 (that is, N>0), the process proceeds to S1220.

S1220: The base station senses the channel during one ECCA slot interval (T). The ECCA slot size may be 9 μs or 10 μs and an actual sensing time may be at least 4 μs.

S1222: When it is determined that the channel is idle, the process proceeds to S1224. When it is determined that the channel is busy, the process returns to S1216. That is, one ECCA defer period is applied again after the channel is idle and N is not counted during the ECCA defer period.

S1224: N is decreased by 1 (ECCA countdown).

FIG. 13 is substantially the same as/similar to the transmitting process of FIG. 12 and is different from FIG. 12 according to an implementation scheme. Therefore, detailed matters may be described with reference to contents of FIG. 12.

S1302: The base station verifies whether the signal transmission is required. When the signal transmission is not required, S1302 is repeated and when the signal transmission is required, the process proceeds to S1304.

S1304: The base station verifies whether the slot is idle. When the slot is idle, the process proceeds to S1306 and when the slot is busy, the process proceeds to S1312 (ECCA). The slot may correspond to the CCA slot in FIG. 12.

S1306: The base station verifies whether the channel is idle for a defer period (D). D may correspond to the ICCA defer period in FIG. 12. When the channel is idle for the defer period, the base station may perform the signal transmitting process (S1308). When it is determined that the channel is busy during the defer period, the process proceeds to S1304.

S1308: The base station may perform the signal transmitting process if necessary.

S1310: When the signal transmission is not performed, the process proceeds to S1302 (ICCA) and when the signal transmission is performed, the process proceeds to S1312 (ECCA). Even in the case where the back-off counter N reaches 0 in S1318 and S1308 is performed, when the signal transmission is not performed, the process proceeds to S1302 (ICCA) and when the signal transmission is performed, the process proceeds to S1312 (ECCA).

Extended CCA

S1312: The base station generates the random number N in the CW. N is used as the counter during the back-off process and generated from [0, q−1]. The CW size (CWS) may be defined as q and be variable in S1314. Thereafter, the base station proceeds to S1316.

S1314: The base station may update the CWS. The CWS q may be updated to the value between X and Y. The X and Y values are configurable parameters. CWS update/adjustment may be performed whenever N is generated (dynamic back-off) and semi-statically performed at a predetermined time interval (semi-static back-off). The CWS may be updated/adjusted based on exponential back-off or binary back-off. That is, the CWS may be updated/adjusted in the form of the square of 2 or the multiple of 2. In association with PDSCH transmission, the CWS may be updated/adjusted based on feed-back/report (e.g., HARQ ACK/NACK) of the user equipment or updated/adjusted based on base station sensing.

S1316: The base station verifies whether the channel is idle for the defer period (D). D may correspond to the ECCA defer period in FIG. 12. D in S1306 and D in S1316 may be the same as each other. When the channel is idle for the defer period, the base station proceeds to S1318. When it is determined that the channel is busy during the defer period, the base station repeats S1316.

S1318: The base station verifies whether N is 0. When N is 0, the base station may perform the signal transmitting process (S1308). In this case, (N=0), the base station may not immediately perform transmission and performs CCA check during at least one slot to continue the ECCA process. When N is not 0 (that is, N>0), the process proceeds to S1320.

S1320: The base station selects one of an operation of decreasing N by 1 (ECCA count-down) and an operation of not decreasing N (self-defer). The self-defer operation may be performed according to implementation/selection of the base station and the base station does not perform sensing for energy detection and not perform even ECCA countdown in the self-defer.

S1322: The base station may select one of the operations not performing sensing for energy detection and the energy detecting operation. When the sensing for the energy detection is not performed, the process proceeds to S1324. When the energy detecting operation is performed, if an energy level is equal to or lower than an energy detection threshold (that is, idle), the process proceeds to S1324. If the energy level is higher than the energy detection threshold (that is, busy), the process returns to S1316. That is, one defer period is applied again after the channel is idle and N is not counted during the defer period.

S1324: The process proceeds to S1318.

LBT Scheme for Uplink Transmission

As a method for performing LBT used by terminal(s) in a transmission of uplink traffic corresponding to an uplink grant, an LBT scheme performed when an uplink grant is transmitted may be performed or a single interval LBT (hereinafter, referred to as type 2 channel access) such as 16 us, 25 us, 34 us or 43 us may be performed when transmitting uplink traffic within a maximum channel occupancy time (MCOT) secured when the uplink grant is transmitted, thereby enabling fast channel access for uplink data transmission.

Alternatively, as a method for performing LBT used by terminal(s) in a transmission of uplink traffic corresponding to an uplink grant, an LBT scheme performed when an uplink grant is transmitted may be performed or a cat-4 LBT (hereinafter, referred to as type 1 channel access) may be performed when transmitting uplink traffic outside the MCOT secured when the uplink grant is transmitted.

Alternatively, the base station may signal to the terminal whether to perform type 2 channel access enabling a fast channel access, or to perform type 1 channel access in which a random backoff is performed, as an LBT for the uplink traffic. For example, the base station may inform the terminal of either type 1 channel access or type 2 channel access through the uplink grant. In this case, the type 1 channel access denotes Cat-4 LBT and type 2 channel access denotes Cat-2 LBT or 25 us LBT.

CWS Adjustment for DL Transmission

Figure 14:
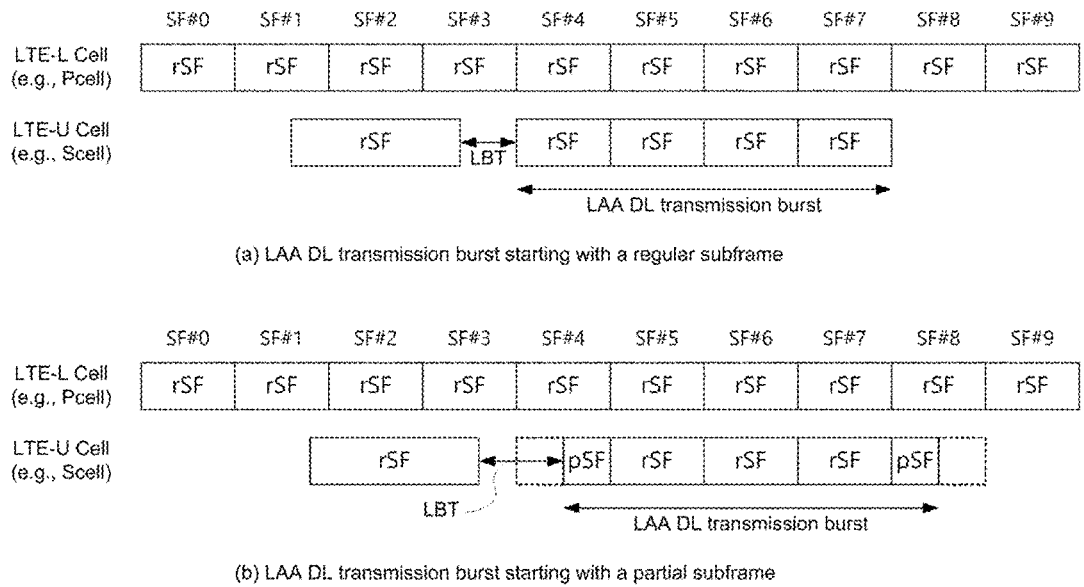
FIG. 14 illustrates a DL transmission in an unlicensed band.

FIG. 14 illustrates an example in which a base station performs DL transmission in an unlicensed band. The base station may aggregate cells (for convenience, LTE-L cell) of one or more licensed bands and cells (for convenience, LTE-U cell, or LAA cell) of one or more unlicensed bands. In FIG. 14, a case in which one LTE-L cell and one LTE-U cell are aggregated for communication with the user equipment is assumed. The LTE-L cell may be the PCell and the LTE-U cell may be the SCell. In the LTE-L cell, the base station may exclusively use the frequency resource and perform an operation depending on LTE in the related art. Therefore, all of the radio frames may be constituted by regular subframes (rSF) having a length of 1 ms (see FIG. 2) and the DL transmission (e.g., PDCCH and PDSCH) may be performed every subframe (see FIG. 1). Meanwhile, in the LTE-U cell, the DL transmission is performed based on the LBT for coexistence with the conventional device (e.g., Wi-Fi device). Further, a specific frequency band needs to be allocated or reserved for a specific time in order to effectively implement the LTE-U technology/service. Therefore, in the LTE-U cell, the DL transmission may be performed through a set of one or more consecutive subframes (DL transmission burst) after the LBT. The DL transmission burst may start as the regular subframe (rSF) or a partial subframe (pSF) according to an LBT situation. pSF may be a part of the subframe and may include a second slot of the subframe. Further, the DL transmission burst may end as rSF or pSF.

Hereinafter, a method for adaptively adjusting the CWS in channel access in the unlicensed band will be described. The CWS may be adjusted based on user equipment (UE) feed-back and the UE feedback used for the CWS adjustment may include an HARQ-ACK response and a CQI/PMI/RI. More specifically, a method for adaptively controlling the CWS based on the HARQ-ACK response will be described. The HARQ-ACK response includes ACK, NACK, and DTX.

For reference, as described with reference to FIG. 11, even in Wi-Fi, the CWS is adjusted based on the ACK. When the ACK is fed back, the CWS is reset to the minimum value (CWmin) and when the ACK is not fed back, the CWS increases. However, since the Wi-Fi is a peer-to-peer (1:1) system, while a cellular system (e.g., LTE) is a multi-access system, it is inefficient to apply a Wi-Fi method as it is and a CWS adjusting method considering multiple-access is required.

First, terms are defined as below.

Set of HARQ-ACK feedback values (HARQ-ACK feedback set): It means HARQ-ACK feedback value(s) used for updating/adjusting the CWS. The HARQ-ACK feedback set corresponds to HARQ-ACK feedback value(s) that is decoded and usable at a time when the CWS is decided. The HARQ-ACK feedback set includes HARQ-ACK feedback value(s) for one or more DL (channel) transmission (e.g., PDSCH) on the unlicensed band (e.g., LTE-U cell). The HARQ-ACK feedback set may include HARQ-ACK feedback value(s) for the DL (channel) transmission (e.g., PDSCH), for example, a plurality of HARQ-ACK feedback values fed back from a plurality of user equipments. The HARQ-ACK feedback value may represent receiving response information for the transport block or PDSCH, and represent ACK, NACK, DTX, and NACK/DTX. According to a context, the HARQ-ACK feedback value may be used mixedly with the HARQ-ACK value/bit/response/information, and the like.

Reference window: It means a time interval at which the DL transmission (e.g., PDSCH) corresponding to the HARQ/ACK feedback set is performed in the unlicensed band (e.g., LTE-U cell). The reference window may be defined by the unit of SF. The reference window will be described below in more detail.

In the LTE, according to the HARQ-ACK feedback scheme or a PUCCH format, an HARQ-ACK value may represent only ACK and NACK or further represent DTX. For example, when PUCCH format 3 is configured as the HARQ-ACK feedback method, the HARQ-ACK value may represent only ACK and NACK. On the contrary, when a channel selection scheme using PUCCH format 1b is configured as the HARQ-ACK feedback method, the HARQ-ACK value may represent ACK, NACK, DTX, and NACK/DTX.

Therefore, a case in which only ACK and e NACK are considered as the HARQ-ACK response, and a case in which the DTX is further considered as the HARQ-ACK response are separately described. Basic matters are common to each other.

Case 1: The Case of Considering Only ACK and NACK as a HARQ-ACK Response

The following methods may be considered as a method of adjusting the CWS based on the HARQ-ACK feedback set. Options 1 to 3 and Alts 1 to 3 may be combined.

Option 1: If HARQ-ACK feedback values for the reference window all are determined as the NACK, the CWS is increased, and if not (that is, if at least one ACK is present), the CWS may be reset to a minimum value.

Option 2: If at least one of the HARQ-ACK feedback values for the reference window is determined as the NACK, the CWS is increased, and if not (that is, if all of the values are the ACKs), the CWS may be reset to a minimum value.

Option 3: If among the HARQ-ACK feedback values for the reference window, the NACK is determined as at least Z % (0<Z<100), the CWS is increased, and if not, the CWS may be reset to a minimum value. As an example, Z may be 50 or 80. That is, if the ratio (hereinafter, referred to as Y %) of the NACK in the HARQ-ACK feedback is equal to or more than a reference value, the CWS is increased, and when the ratio of NACK is less than the reference value, the CWS may be reset to the minimum value. The reference value may be 0<reference value<1, or 0%<reference value<100% according to a unit. Equally, if among the HARQ-ACK feedback values for the reference window, the ACK is determined as a value less than P % (X=100−Z), the CWS is increased, and if not, the CWS may be reset to a minimum value. As an example, P may be 20 or 50.

When the CWS is increased, the CWS may be increased two times, increased exponentially between a minimum value CW_min and a maximum value CW_max, or increased to the maximum value.

Additionally, when at least one of the following conditions is satisfied, the CWS may be reset to CW_min Alt 1: A case where the maximum CWS, CW_max is used for K continuous ECCAs. Herein, K is fixed to one of 1, 2, and 3, or may be selected within {1, . . . , 8} by the base station.

Alt 2: A case where there is no DL transmission by the base station for at least T period. T is a pre-determined value or a configurable value.

Alt 3: A case where the maximum HARQ retransmission is used in K continuous ECCAs. Herein, K is fixed to one of 1, 2, and 3, or may be selected within {1, ..., 8} by the base station.

The reference window may be (1) a single subframe, (2) multi (for example, two) subframes, or (3) all subframes where the HARQ-ACK feedback is usable, in the last DL transmission burst (that is, the latest DL transmission burst on the unlicensed band).

Herein, the (1) single subframe may be the first or last subframe of the last DL transmission burst. The single subframe may be a regular subframe rSF or a partial subframe pSF. However, in the partial subframe, the number of user equipments which may be served by the base station is limited. Accordingly, when the first or last subframe of the last DL transmission burst is the partial subframe, the base station may efficiently adjust the CWS according to channel collision or interference by defining a HARQ-ACK feedback set based on the HARQ-ACK feedback value of the user equipment(s) corresponding to the regular subframe. For example, when the first or last subframe of the last DL transmission burst is the partial subframe, the reference window may be the multiple subframes.

Herein, the (2) multi subframes may be a first multiple subframe or the last multiple subframe in the last DL transmission burst. For example, when the number of multiple subframes is two, the multiple subframes may be first two subframes of the last DL transmission burst, that is, (1st subframe) the partial subframe or the regular subframe and (2nd subframe) the regular subframe. Further, the multiple subframes may be the last two subframes, that is, (1st subframe) the regular subframe and (2nd subframe) the partial subframe or the regular subframe.

Case 2-1: The Case of Additionally Considering DTX as a HARQ-ACK Response

Hereinafter, a method of adjusting the CWS by considering ACK, NACK, and DTX, as the HARQ-ACK response transmitted from the user equipment, will be described. In self-carrier scheduling, that is, in the case where the DL transmission (for example, the PDSCH) for the carrier in the unlicensed band is performed through a control channel (for example, (E)PDCCH) transmitted on the same unlicensed band carrier, the HARQ feedback which may be transmitted by the user equipment with respect to the DL transmission of the unlicensed band may include ACK, NACK, DTX and NACK/DTX. Herein, since the DTX corresponds to a case where the DL transmission is unsuccessful by a hidden node and the like in the unlicensed band carrier, the DTX may be used for CWS adjustment together with the NACK. Further, the DTX is one of methods in which the user equipment notifies a case where the user equipment may not decode the corresponding control channel to the base station even though the base station transmits the control channel (for example, the (E)PDCCH) including scheduling information to the user equipment. The DTX may be determined only by the HARQ-ACK feedback value or determined by considering the HARQ-ACK feedback value and an actual scheduling situation. For convenience, a self-carrier scheduling operation is assumed.

The following methods may be considered as a method of adjusting the CWS based on the HARQ-ACK feedback set. Methods A-1 to A-4 and methods B-1 to B-3 may be combined.

Method A-1: In the case where all of the HARQ-ACK feedback values for the reference window are NACK, all of the HARQ-ACK feedback values are determined as DTX, or all of the HARQ-ACK feedback values are NACK/DTX, the CWS is increased, and if not (that is, if at least one ACK is present), the CWS may be reset to a minimum value.

Method A-2: If at least one of the HARQ-ACK feedback values for the reference window is determined as the NACK, the DTX or the NACK/DTX, the CWS is increased, and if not (that is, if all of the values are the ACKs), the CWS may be reset to a minimum value.

Method A-3: If among the HARQ-ACK feedback values for the reference window, NACK or DTX is determined as at least Z % (0<Z<100), the CWS is increased, and if not, the CWS may be reset to a minimum value. As an example, Z may be 50 or 80. Herein, the NACK or the DTX of at least Z % means that either the NACK or the DTX is added, i.e., a sum of NACK, DTX and NACK/DTX, to become at least Z %. That is, NACK/DTX and DTX may be treated equally with NACK. Accordingly, if a ratio (hereinafter, referred to as Y %) of NACK or DTX in the HARQ-ACK feedback is equal to or more than a reference value, the CWS is increased, and when the ratio of NACK or DTX is less than the reference value, the CWS may be reset to the minimum value. The reference value may be 0<reference value<1, or 0%<reference value<100% according to a unit. Equally, if among the HARQ-ACK feedback values for the reference window, the ACK is determined as a value less than P % (X=100−Z), the CWS is increased, and if not, the CWS may be reset to a minimum value. As an example, P may be 20 or 50.

Method A-4: In the case where all of the HARQ-ACK feedback values for the reference window are determined as the DTX, the base station increases the CWS by considering that all of the control channels PDCCH/EPDCCH are not received by the user equipment or the decoding of both the PDCCH and the EPDCCH is unsuccessful by interference of other nodes, and if not (that is, in the case where all of the HARQ-ACK feedback values are not determined as the DTX), the CWS may be adjusted according to the methods A-1 to A-3.

When the CWS is increased, the CWS may be increased two times, increased exponentially between a minimum value CW_min and a maximum value CW_max, or increased to the maximum value.

Additionally, when at least one of the following conditions is satisfied, the CWS may be reset to CW_min Method B-1: A case where the maximum CWS CW_max is used for K continuous ECCAs. Herein, K is fixed to one of 1, 2, and 3, or may be selected within {1, ..., 8} by the base station.

Method B-2: A case where there is no DL transmission by the base station for at least T period. T is a pre-determined value or a configurable value.

Method B-3: A case where the maximum HARQ retransmission is used within K continuous ECCAs. Herein, K is fixed to one of 1, 2, and 3, or may be selected within {1, ..., 8} by the base station.

The reference window may be (1) a single subframe, (2) multi (for example, two) subframes, or (3) all subframes where the HARQ-ACK feedback is usable in the last DL transmission burst (that is, the latest DL transmission burst on the unlicensed band). The detailed contents may refer to the contents described in Case 1.

Case 2-2: The Case of Additionally Considering DTX as a HARQ-ACK Response

Hereinafter, another example of the method of adjusting the CWS by considering ACK, NACK, and DTX, as the HARQ-ACK response transmitted from the user equipment, will be described. In self-carrier scheduling, that is, in the case where the DL transmission (for example, the PDSCH) for the carrier in the unlicensed band is performed through a control channel (for example, (E)PDCCH) transmitted on the same unlicensed band carrier, the HARQ feedback which may be transmitted by the user equipment with respect to the DL transmission in the unlicensed band may include ACK, NACK, DTX and NACK/DTX. Herein, since the DTX corresponds to a case where the DL transmission is unsuccessful by a hidden node and the like in the unlicensed band carrier, the DTX may be used for CWS adjustment together with the NACK. Further, the DTX disclosed herein is one of methods in which the user equipment notifies a case where the user equipment does not decode the corresponding control channel to the base station even though the base station transmits the control channel (for example, the (E)PDCCH) including scheduling information to the user equipment. The DTX may be determined only by the HARQ-ACK feedback value or determined by considering the HARQ-ACK feedback value and an actual scheduling situation. For convenience, a self-carrier scheduling operation is assumed.

The following methods may be considered as a method of adjusting the CWS based on the HARQ-ACK feedback set. Methods C-1 and C-2 and methods D-1 to D-3 may be combined.

Method C-1: In the case where there is the DTX in the HARQ-ACK feedback values for the reference window, a weight value may be applied to the DTX when calculating Y % based on the NACK or the DTX, as the HARQ-ACK feedback, according to the method A-3. In the case where the base station may distinguish the NACK and the DTX and in the case where the user equipment feedbacks the DTX even though the base station transmits a PDSCH related with a control channel PDCCH/EPDCCH, the base station may know that the corresponding user equipment does not receive the control channel PDCCH/EPDCCH. In this case, the base station may recognize that there is a possibility that an interference or hidden node and the like occurs in the corresponding channel. Accordingly, when receiving the DTX from the user equipment, the base station may calculate Y % by applying the weight value to the DTX in order to more positively solve the problem generated by the interference or hidden node on the channel. Further, when the NACK/DTX is included in the HARQ-ACK feedback values within the reference window, the base station may regard the NACK/DTX as the NACK. Unlike this, when the user equipment feedbacks the NACK/DTX to the base station, it is meaningful that the user equipment notifies to the base station that the HARQ-ACK feedback values may be the DTX. Accordingly, when the NACK/DTX is fed back from the user equipment, the base station may calculate Y % by applying the weight value to the NACK/DTX in the HARQ-ACK feedback set. Values considered as the HARQ-ACK feedback may be ACK, NACK, NACK/DTX, and DTX. As described herein, Y % for adjusting the CWS may be calculated by considering different weight values for the NACK, the NACK/DTX, and the DTX except for the ACK.

Equation 1 represents one example of the method C-1. The method may be similarly expressed by another equation and is not limited by the following Equation.

$$Y\% = \{W\_A * Pr(A) + W\_B * Pr(B) + W\_C * Pr(C)\} * 100, \quad \text{[Equation 1]}$$

Herein, Pr(A) represents a probability of the NACK in the reference window, that is, Pr(A)=the number of NACKs/the total number of usable HARQ-ACK feedbacks in the reference window. Herein, Pr(B) represents a probability of the NACK/DTX in the reference window, that is, Pr(B)=the number of NACK/DTXs/the total number of usable HARQ-ACK feedbacks in the reference window. Herein, Pr(C) represents a probability of the NACK/DTX in the reference window, that is, Pr(C)=the number of DTXs/the total number of usable HARQ-ACK feedbacks in the reference window. W_A means a weight value for the NACK, W_B means a weight value for the NACK/DTX, and W_C means a weight value for the DTX.

First, W_A=W_B=W_C is a case where the NACK, the NACK/DTX, and the DTX are calculated with the same weight value in the HARQ-ACK feedback set when calculating Y %. W_A<W_B=W_C is a case where the NACK/DTX and the DTX are calculated with a larger weight value than that of the NACK and the NACK/DTX and the DTX are calculated with the same weight value in the HARQ-ACK feedback set when calculating Y %. W_A=W_B<W_C is a case where the NACK and the NACK/DTX are calculated with the same weight value and the DTX is calculated with a larger weight value in the HARQ-ACK feedback set when calculating Y %. W_A<W_B=W_C is a case where the NACK/DTX is calculated with a larger weight value than the NACK and the DTX is calculated with a larger weight value than the NACK/DTX in the HARQ-ACK feedback set when calculating Y %.

When the calculated Y % is at least Z %, the CWS is increased, and if not, the CWS may be reset to a minimum value. Herein, Z % is a reference value which may be set in the base station (for example, 0<Z<100). For example, Z may be 50 or 80.

Method C-2: When there is at least one DTX feedback for the reference window, the CWS may be increased. The method is a method of overriding to the option-3 or the method A-3. If not (that is, No DTX), the CWS may be adjusted according to the option-3 or the method A-3. Since the DTX represents that the user equipment does not receive the control channel PDCCH/EPDCCH on the unlicensed band due to the interference or hidden node in the same channel, the base station may increase the CWS as the method for solving the problem.

When the CWS is increased, the CWS may be increased two times, increased exponentially between a minimum value CW_min and a maximum value CW_max, or increased to the maximum value.

Additionally, when at least one of the following conditions is satisfied, the CWS may be reset to CW_min Method D-1: A case where the maximum CWS CW_max is used for K continuous ECCAs. Herein, K is fixed to one of 1, 2, and 3, or may be selected within {1, . . . , 8} by the base station.

Method D-2: A case where there is no DL transmission by the base station for at least T period. T is a pre-determined value or a settable value.

Method D-3: A case where the maximum HARQ retransmission is used in K continuous ECCAs. Herein, K is fixed to one of 1, 2, and 3, or may be selected within {1, . . . , 8} by the base station.

The reference window may be (1) a single subframe, (2) multi (for example, two) subframes, or (3) all subframes where the HARQ-ACK feedback is usable in the last DL transmission burst (that is, the latest DL transmission burst on the unlicensed band). The detailed contents may refer to the contents described in Case 1.

Cases 2-1 and 2-2 may be differently applied as described below according to whether the scheduling cell is a LTE-L cell or a LTE-U cell in the cross-carrier scheduling.

In the case where the DL transmission transmitted in the unlicensed carrier is cross-carrier scheduled from a different unlicensed band (that is, an unlicensed carrier, an unlicensed band cell, and an LTE-U cell), the CWS may be adjusted by using the same method as the self-carrier scheduling. The reason is that since the control channels (e.g., the PDCCH/EPDDCH) are transmitted in the unlicensed carrier, the determination of the base station based on the HARQ-ACK response(s) (ACK, NACK, DTX and NACK/DTX) may be equally performed with the case of the self-carrier scheduling.

In the case where the DL transmission transmitted in the unlicensed carrier is cross-carrier scheduled from a licensed band (that is, a licensed carrier, a licensed band cell, and an LTE-L cell), the PDCCH/EPDCCH which are the control channels scheduling the DL transmission is transmitted in the licensed band. In this case, since the DTX feedback is used to determine a decoding situation of the user equipment for the control channel transmitted on the licensed band, it doesn't help adaptively adjusting the CWS for channel access in the unlicensed band. Accordingly, in the cross-carrier scheduling from the licensed band, the method of adjusting the CWS considering the DTX is set not to be used, and the CWS may be adjusted by considering only the ACK and the NACK as the HARQ-ACK response(s) for the DL transmission (for example, PDSCH) on the unlicensed band. Alternatively, the CWS may be adjusted by considering only the ACK, the NACK and the NACK/DTX as the HARQ-ACK response(s) for the DL transmission (for example, PDSCH) on the unlicensed band. For example, the DTX as the HARQ-ARQ response due to the cross-carrier scheduling from the licensed band may be excluded in the process of applying the cases 1, 2-1, and 2-2. In detail, in the option 3 and the method A-3, the DTX as the HARQ-ARQ response due to the cross-carrier scheduling from the licensed band may be excluded when calculating Z %. That is, in the HARQ-ACK feedback set, only the ACK and the NACK are selected to calculate Z % or only the ACK, the NACK and the NACK/DTX are selected to calculate Z %. In addition, the following two methods are available for the base station to calculate Z % excluding DTX in Option 3 and Method A-3.

First, DTX indicating failure in receiving control channel at the user equipment for control channel transmission on the licensed cell is not included in the entire HARQ-ACK value(s) and is not included in the ratio of NACK, when determining Z %.

Second, DTX indicating failure in receiving control channel at the user equipment for control channel transmission on the licensed cell is included in the entire HARQ-ACK value(s) but is not included in the ratio of NACK, when determining Z %.

As described above, if the DL transmission transmitted on the unlicensed carrier is cross-carrier scheduled from a licensed band (i.e., a licensed carrier, a licensed band cell, and an LTE-L cell), the DTX as a HARQ-ACK response by cross-carrier scheduling from the licensed band may be excluded from the procedures applying Cases 1, 2-1, and 2-2. Specifically, DTX as a HARQ-ACK response by cross-carrier scheduling from the licensed band may be excluded when calculating Z % in option 3 and method A-3. In addition, the following two methods are available for the base station to calculate Z % excluding DTX in Option 3 and Method A-3.

First, DTX indicating failure in receiving control channel at the user equipment for control channel transmission on the licensed cell is not included in the entire HARQ-ACK value(s) and is not included in the ratio of NACK, when determining Z %.

Second, DTX indicating failure in receiving control channel at the user equipment for control channel transmission on the licensed cell is included in the entire HARQ-ACK value(s) but is not included in the ratio of NACK.

However, when HARQ-ACK feedback is performed using a channel selection scheme based on the PUCCH format 1b (i.e., PUCCH format 1b with channel selection), even if the user equipment performs no transmission, the base station may determine the HARQ-ACK response according to the no transmission. Specifically, the base station may determine the HARQ-ACK response corresponding to the no transmission based on the HARQ-ACK response values of Tables 3 to 5 defined for A=2 to 4. For example, when A=2, if the user equipment performs no transmission, the base station may determine that the HARQ-ACK response corresponding to the no transmission is [HARQ-ACK (0), HARQ-ACK (1)]=[DTX, NACK/DTX] based on Table 3.

If the DL transmission transmitted on an unlicensed carrier is cross-carrier scheduled from a licensed band (i.e., a licensed carrier, a licensed band cell, and an LTE-L cell) and the user equipment is configured to transmit a HARQ-ACK response using a channel selection scheme based on the PUCCH format 1b, in the cases other than (i) the case of no transmission from the user equipment and (ii) the case where the base station fails to detect the HARQ-ACK response, the NACK/DTX state and the any state as the HARQ-ACK response may be regarded as a NACK when calculating Z % for adjusting the CWS. That is, if there is an HARQ-ACK response explicitly, the NACK/DTX state and the any state may be regarded as a NACK when calculating Z %. On the other hand, in the case where (i) there is no transmission from the user equipment or (ii) the base station fails to detect the HARQ-ACK response, the HARQ-ACK response(s) determined by the base station as a DTX may be excluded when calculating Z %. In this case, as a method for configuring a DTX to be excluded when calculating Z %, the following two methods are possible.

First, since the corresponding DTX may not reflect the channel state of the unlicensed cell, the DTX is not included in the entire HARQ-ACK value(s) and is not included in the ratio of NACK, when determining Z %.

Second, the corresponding DTX is included in the entire HARQ-ACK value(s) but is not included in the ratio of NACK.

Unlike this, in the case where there is no transmission from the user equipment or (ii) when the base station fails to detect the HARQ response, the HARQ-ACK response(s)

determined by the base station as a NACK/DTX may be considered as a NACK when calculating Z %. This may be a method for allowing a CWS adjustment to be performed by the base station by assuming the possibility of a NACK for DL transmission on the unlicensed carrier. Unlike this, in the case where (i) the user equipment indicates a NACK/DTX with the no transmission or (ii) the base station does not detect the HARQ-ACK response, the HARQ-ACK response(s) determined by the base station as a NACK/DTX are regarded as a DTX, not a NACK, when calculating Z % in order not to include the NACK/DTX in Z %. Accordingly, the NACK/DTX state may be ignored. Specifically, since it is impossible to determine whether (i) and (ii) are due to an error in the PDCCH/EPDCCH transmission in the licensed carrier or resulted from the case that a PUCCH detection is not performed by the base station because the channel state of the channel through which a PUCCH on a licensed carrier is transmitted is not in a good condition while a NACK for a PDSCH transmitted through an unlicensed carrier is transmitted by the user equipment transmits through the PUCCH on the licensed carrier. Accordingly, the corresponding NACK/DTX state may be regarded as a DTX when calculating Z %, so that it may not be regard as the NACK when calculating Z % of NACK. That is, the NACK/DTX state may be ignored so as not to be included in Z %. Here, the following two methods are available for the base station to determine Z % ignoring the NACK/DTX, without including the NACK/DTX.

First, since the DTX, indicating failure in receiving control channel at the user equipment for control channel transmission on the licensed cell, may not reflect the channel state of the unlicensed cell, it is possible to configure the NACK/DTX not to be included in the entire HARQ-ACK value(s), and not to be included in the ratio of NACK, when determining Z %.

Second, since the DTX, indicating failure in receiving control channel at the user equipment for control channel transmission on the licensed cell, may not reflect the channel status of the unlicensed cell, it is possible to configure the NACK/DTX to be included in the entire HARQ-ACK value(s), but not to be included in the ratio of NACK.

Meanwhile, when a part of the HARQ-ACKs is determined to be DTX and another part of the HARQ-ACKs is determined to be NACK/DTX in the process of detecting a HARQ-ACK for the no transmission, the DTX as a part of the HARQ-ACKs may be reflected in calculation of the Z % identically to the NACK/DTX. For example, if the NACK/DTX is regarded as a NACK to be reflected in Z %, the DTX may also be determined as a NACK to be reflected in Z % of the NACK. On the other hand, if the NACK/DTX is not reflected in Z %, the DTX may be regarded as the DTX not to be reflected in Z %. Here, the following two methods are available for a method for setting the base station not to reflect the DTX when determining Z %.

First, since the DTX, indicating failure in receiving control channel at the user equipment for control channel transmission on the licensed cell, does not reflect a channel state of an unlicensed cell, the DTX is not included in the entire HARQ-ACK value(s) and is not included in the ratio of NACK, when determining Z %.

Second, the DTX, indicating failure in receiving control channel at the user equipment for control channel transmission on the licensed cell, is included in the entire HARQ-ACK value(s) but is not included in the ratio of NACK.

Figure 15:
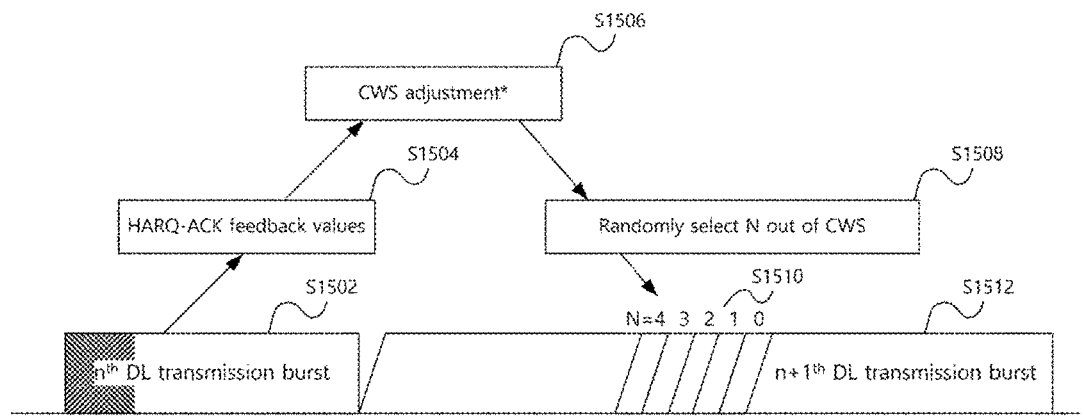
FIGS. 15 to 17 illustrate a DL transmission process in an unlicensed band.
Figure 16:
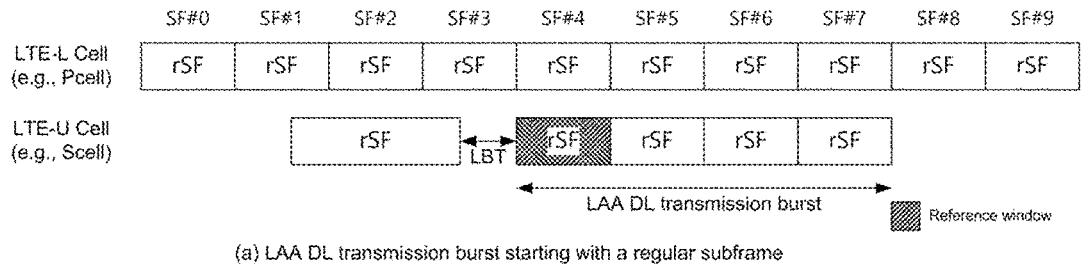
Figure 16:
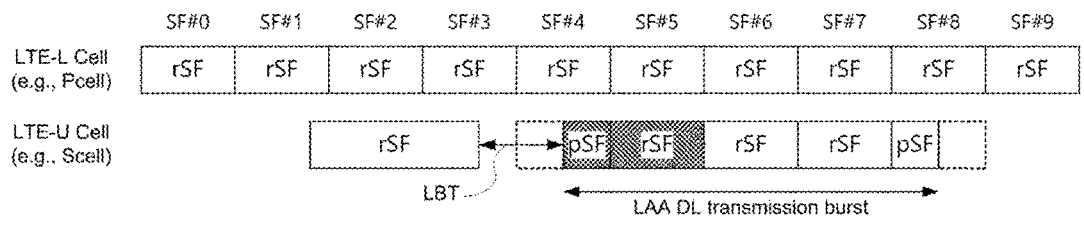
Figure 17:
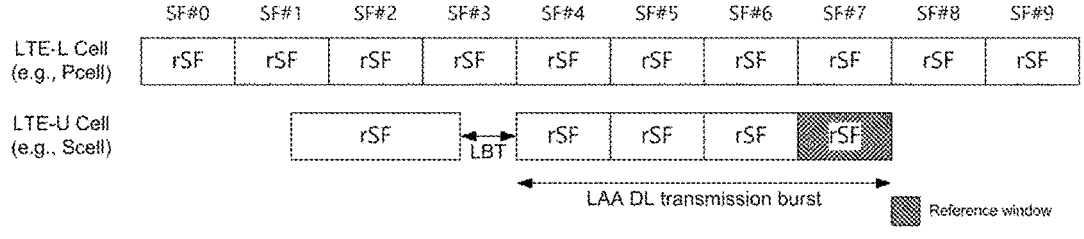
Figure 17:
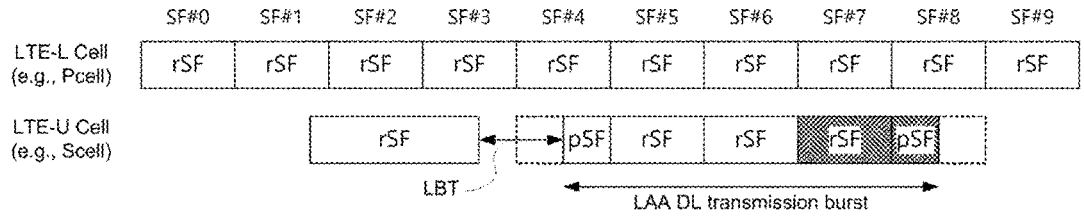

FIGS. 15 to 17 illustrate a signal transmitting process. FIG. 15 illustrates a method for adjusting a CWS according to case 1 and FIGS. 16 and 17 illustrate a reference window for generating an HARQ-ACK feedback set. Cases 2-1 and 2-2 may be similarly performed.

Referring to FIG. 15, the base station may transmit an n-th DL transmission burst in the unlicensed band (e.g., LTE-U cell) (S1502) and thereafter, transmit an (n+1)-th DL transmission burst based on the ECCA when additional DL transmission is required (S1512). In detail, the base station additionally performs the random back-off in the CW when the channel in the unlicensed band is idle during the ECCA defer period (S1510). The base station may generate a random number N in the CW (e.g., [0, q−1]) (S1508) and perform the back-off as long as slots corresponding to the random number N (S1510). Herein, the CWS is adaptively varied based on the HARQ-ACK feedback values from user equipments (S1506). The HARQ-ACK feedback values used for adjusting the CWS include HARQ-ACK feedback values for a most recent DL transmission burst (n-th DL transmission burst). The HARQ-ACK feedback values used for adjusting the CWS include HARQ-ACK feedback values for the DL transmission on the reference window in the DL transmission burst (S1504).

When case 1 is applied, the CWS may be adjusted as follows based on the HARQ-ACK feedback values. Cases 2-1 and 2-2 may be similarly applied.

Option 1: When all of the HARQ-ACK feedback values for the reference window are NACK, the CWS is increased and if not, the CWS is reset to the minimum value.

Option 2: When at least one of the HARQ-ACK feedback values for the reference window is the NACK, the CWS is increased and if not, the CWS is reset to the minimum value.

Option 3: When the NACK among the HARQ-ACK feedback values for the reference window is at least Z % (0<Z<100), the CWS is increased and when the NACK is not at least Z %, the CWS is reset to the minimum value.

When the CWS is increased, the CWS may be increased twice, exponentially increased between the minimum value (CW_min) and a maximum value (CW_max), or increased to the maximum value.

Referring to FIGS. 16 and 17, the reference window may be constituted by start subframe(s) (FIG. 16) and last subframe(s) (FIG. 17) of the most recent DL transmission burst (n-th DL transmission burst). When the reference window is positioned at the start of the DL transmission burst, the reference window may be constituted by (i) one regular subframe and (ii) one partial subframe and one regular subframe. Further, when the reference window is positioned at the end of the DL transmission burst, the reference window may be constituted by (i) one regular subframe and (ii) one regular subframe and one sub subframe.

The present method assumes that a HARQ-ACK response transmitted from the user equipment is transmitted through a PUCCH or a PUSCH on a PCell of a licensed band.

Next, when the user equipment is configured to transmit ACK, NACK, NACK/DTX, and DTX values as a HARQ-ACK response for PDSCH(s) transmitted through DL on an unlicensed carrier through UL on the unlicensed carrier, a method for performing CW size update/adjustment for transmission in the base station will be described.

A case where the HARQ-ACK for the PDSCH(s) transmitted through the DL on LAA SCell is transmitted only through the UL on the unlicensed carrier or the LAA SCell will be described.

In a method 100, in a case where HARQ-ACK for PDSCH(s) transmitted through a DL on an unlicensed carrier or an LAA SCell is transmitted only through a UL on an unlicensed carrier or an LAA SCell, if at least one ACK is fed back as the HARQ-ACK(s) transmitted through the UL on the LAA SCell, the base station may reset the CW size for DL PDSCH(s) transmissions on the LAA SCell, and otherwise may increase the CW size (e.g., double). That is, when the base station successfully decodes a PUCCH or a PUSCH including the HARQ-ACK transmitted from the user equipment on the LAA SCell and detects at least one ACK from the user equipment for the PDSCH(s) transmitted from the base station, the base station may reset the CW size. In this case, the base station determines that the channel for the medium between the base station and the user equipment is idle to reset every CWp (e.g., p={1, 2, 3, 4}) that may be differently set according to a channel access priority class to CWmin. In addition, when the user equipment transmits feedback with NACK since the user equipment fails to decode the PDSCH(s) and the base station detects or determines NACK, NACK/DTX, or DTX, the base station may double the CW. Alternatively, even in the case of detecting NACK, NACK/DTX, or DTX at the base station, which may occur due to the transmission of the PUCCH or the PUSCH including the HARQ-ACK transmitted from the user equipment is transmitted on the unlicensed carrier, the base station may double the CW. In this case, the base station may determine that the channel for the medium between the base station and the user equipment is busy and double the CWp (e.g., p={1, 2, 3, 4}) that may be differently set according to the channel access priority class. Further, if the LBT using the CW_max value is repeatedly set to K times (e.g., K={1, . . . , 8}) after doubling the CW size, CWp may be set to the CW_min value. The value K may be designated to one value of {1, . . . , 8} by the base station.

When the number of unlicensed carriers increases, it may be impossible to transmit the HARQ-ACK value only through a UL on a specific single unlicensed carrier. In this case, the HARQ-ACK transmission may be performed through the UL in units of a group in which transmission of an HARQ-ACK response is possible and set by the RRC. Meanwhile, when there is not much DL PDSCH transmission on the unlicensed carrier, it is possible to transmit the HARQ-ACK response only through a UL on a single LAA SCell. When the HARQ-ACK transmission is performed through the UL of a group unit, an unlicensed carrier (e.g., an LAA SCell index) on which the transmission of the HARQ-ACK depending on channel availability based on a channel access within a group may be configured to dynamically vary in units of a subframe, or may be configured to a single semi-static unlicensed carrier (e.g., LAA SCell). The base station receiving the feedback on the HARQ-ACK(s) based on the group may update/adjust a CWp and a group_index by managing the CWp and the group_index for the DL PDSCH to be transmitted to the user equipment based on the group. Based on the feedback of the HARQ-ACK of the DL PDSCH(s) on the LAA SCELL(s) configured as the group, CW size may be reset or doubled.

A case where HARQ-ACK feedbacks for PDSCH(s) transmitted on an unlicensed carrier or an LAA SCell are divided into HARQ-ACK feedbacks transmitted through a PUCCH or a PUSCH on licensed carriers and HARQ-ACK feedbacks transmitted through a PUCCH or a PUSCH on unlicensed carriers will be described.

In a method 110, the HARQ-ACK feedbacks for PDSCH(s) transmitted on an unlicensed carrier or an LAA SCell are divided into the HARQ-ACK feedbacks transmitted through the PUCCH or the PUSCH on the licensed carrier and the HARQ-ACK feedbacks transmitted through the PUCCH or the PUSCH on the unlicensed carrier. In this case, based on the Z % of NACK (e.g., 80 or 50, which may be a natural number value set by the base station), if the feedback determined as NACK is Z % or more, the CW size update/adjustment according to the HARQ-ACK feedback transmitted through the UL on the licensed carrier doubles the CW, otherwise the CW size update/adjustment resets the CW size. When a HARQ-ACK feedback is transmitted on the licensed carrier among the HARQ-ACK feedbacks for PDSCHs transmitted on the LAA cell, a CW size for an LAA SCell transmitting the PDSCH corresponding to the HARQ-ACK transmitted on the licensed carrier may be updated/adjusted using Methods A-1, A-2, A-3, A-4, B-1, B-2, B-3, and a combination thereof. If the LBT using the CW_max value is repeatedly set to K times (e.g., K={1, . . . , 8}) after doubling the CW size, CWp may be set to the CW_min value. The value K may be designated to one value of {1, . . . , 8} by the base station.

In case of the CW size update/adjustment according to the HARQ-ACK feedback transmitted through the UL on the unlicensed carrier, the group of the HARQ-ACK corresponding to the PDSCH(s) transmitted through the DL on the LAA SCell is transmitted only through the UL on the unlicensed carrier or the LAA SCell may be limited to the LAA SCell transmitting the PDSCH corresponding to the HARQ-ACK transmitted on the unlicensed carrier. Therefore, the same method as in Method 100 can be applied to perform CW size update/adjustment for the PDSCH transmitted on the LAA SCell. If the LBT using the CW_max value is repeatedly set to K times (e.g., K={1, . . . , 8}) after doubling the CW size, CWp may be set to the CW_min value. The value K may be designated to one value of {1, . . . , 8} by the base station.

Unlike the method for updating/adjusting the CW size according to whether the cell transmitting the HARQ-ACK independently is the unlicensed cell (e.g., LAA SCell) or the licensed cell, by referring both the HARQ-ACK feedback on the licensed carrier and the HARQ-ACK feedback on the unlicensed carrier, a method for managing the CW size for the LBT of the DL PDSCH transmission on the unlicensed carrier or the LAA SCell may also be considered. When conditions of methods 100 and 110 as a hybrid method of the method 100 and the method 110, that is, a case (i.e., Condition-110) where ACK detection as a feedback value transmitted through the UL on the unlicensed carrier is performed by the base station and a case (i.e., Condition-110) where the feedback that is regarded as NACK is not equal to or more than Z %, are both satisfied, CW size may be reset. However, when both conditions are not satisfied, CW size may be doubled. Alternatively, since Condition-100 considers UL transmission on an unlicensed carrier, it is determined that the channel state of the unlicensed carrier may be better reflected so that CW size may be reset or doubled depending on whether Condition-100 is satisfied.

Unlike this, Condition-110, which is designed to better reflect the channel state of all UEs, is considered to better reflect the channel state of unlicensed carriers in all UEs, so that a method for resetting or doubling the CW size according to whether Condition-110 is satisfied may be considered. If the LBT using the CW_max value is repeatedly set to K times (e.g., K=$\{1, \ldots, 8\}$) after doubling the CW size, CWp may be set to the CW_min value. The value K may be designated to one value of $\{1, \ldots, 8\}$ by the base station.

In the LTE system up to the existing Rel-13, if a simultaneous transmission of PUSCH and PUCCH is set in a user equipment, the simultaneous transmission of PUSCH and PUCCH may be performed in the same carrier or in different carriers. However, if the simultaneous transmission of PUSCH and PUCCH is not configured in the user equipment, in a case where the PUSCH transmission is not scheduled in the corresponding subframe, transmission of UCI such as HARQ-ACK and CSI is performed on the PUCCH, and in a case where the PUSCH transmission is scheduled in the corresponding subframe, the transmission of UCI such as the HARQ-ACK and the CSI to be transmitted through the PUCCH is piggybacked to the PUSCH. This applies equally to different carriers when carrier aggregation is performed.

In this case, in performing carrier aggregation, in cases where aggregated carriers are composed of different licensed carriers and unlicensed carriers, it is assumed that a group of cells on which transmission of a PUCCH is possible is composed of licensed carrier(s) and unlicensed carrier(s). In this case, if simultaneous transmission of PUSCH and PUCCH is configured in the user equipment, HARQ-ACK and CSI as user equipment feedback for DL transmissions transmitted on the licensed carrier(s) may be transmitted through the PUCCH on the licensed carrier(s), but the HARQ-ACK may not be transmitted through a scheduled PUSCH on the unlicensed carrier(s), and the CSI (e.g., periodic CSI or aperiodic CSI) may be transmitted to the scheduled PUSCH on the unlicensed carrier(s). In addition, if HARQ-ACK and CSI as user equipment feedback for DL transmissions transmitted on unlicensed carriers are transmitted through the PUCCH on the licensed carrier or if the PUSCH on the unlicensed carrier is scheduled, transmission through the corresponding PUSCH may be possible.

However, if simultaneous transmission of PUSCH and PUCCH is not configured in the user equipment, HARQ-ACK and CSI as a feedback from the user equipment for DL transmissions transmitted from licensed carriers may be transmitted through a PUCCH on the licensed carriers, but the HARQ-ACK may not be transmitted through a scheduled PUSCH on the unlicensed carrier, and CSI (e.g., periodic CSI or aperiodic CSI) may be transmitted through the scheduled PUSCH on an unlicensed carrier. According to the method used in the existing LTE system, if the PUSCH is not scheduled in the corresponding subframe, HARQ-ACK and CSI as a user equipment feedback for DL transmission on the licensed carrier and on the unlicensed carrier are transmitted through the PUCCH on the licensed carrier, and if the PUSCH is scheduled in the corresponding subframe on the licensed carrier or on the unlicensed carrier, only the scheduled PUSCH is transmitted by piggybacking HARQ-ACK and CSI as the user equipment feedback for DL transmission on the licensed carrier and on the unlicensed carrier with a scheduled PUSCH on a licensed carrier or on an unlicensed carrier. However, since HARQ-ACK as the user equipment feedback for DL transmission transmitted on licensed carriers is configured not to be transmitted on unlicensed carrier, if the PUSCH is scheduled on the unlicensed carrier, the HARQ-ACK response as the user equipment feedback for the DL transmission transmitted on the licensed carrier may not be transmitted through the scheduled PUSCH on the unlicensed carrier. Therefore, the following options may be considered in order to solve the corresponding case.

Option 1. In a case where the configuration of a carrier aggregation (CA) is composed of licensed carriers and unlicensed carriers, as a group of cells on which transmission of a PUCCH is possible, it is composed of licensed carrier(s) and unlicensed carrier(s), and if simultaneous transmission of PUSCH and PUCCH is not configured in the user equipment, in a subframe where transmission of the PUCCH may be performed, the user equipment does not expect transmission of the PUSCH to be scheduled on the unlicensed carrier from the base station, and the user equipment assumes only the transmission of the PUCCH, so that HARQ-ACK and CSI as a user equipment feedback for DL transmission on the licensed carrier and on the unlicensed carriers are transmitted through the PUCCH on the licensed carrier.

Option 2. In a case where the configuration of the CA is composed of licensed carriers and unlicensed carriers, as a group of cells on which transmission of a PUCCH is possible, it is composed of licensed carrier(s) and unlicensed carrier(s), and if simultaneous transmission of PUSCH and PUCCH is not configured in the user equipment, for a subframe where transmission of the PUCCH may be possible, as a user equipment feedback for DL transmission on the licensed carrier to be transmitted by the user equipment, only when the HARQ-ACK response is a subframe to be transmitted, the user equipment does not expect the PUSCH transmission to be scheduled on the unlicensed carrier from the base station. In addition, the user equipment assumes only the transmission of the PUCCH, so that HARQ-ACK and CSI as the user equipment feedback for DL transmission on the licensed carrier and on the unlicensed carrier are transmitted through the PUCCH on the licensed carrier. Since only the HARQ-ACK response for the DL transmission on the licensed carrier may not be transmitted to the PUSCH on the unlicensed carrier, the CSI may be transmitted to the PUSCH on the unlicensed carrier. Therefore, only when the UCI type to be piggybacked is the HARQ-ACK response for the DL transmission on the licensed carrier, the method may be applied.

Option 3. In a case where the CA is composed of licensed carrier(s) and unlicensed carrier(s), as a group of cells on which transmission of a PUCCH is possible, and the simultaneous transmission of PUSCH and PUCCH is not configured in the user equipment, for a subframe where PUCCH transmission may be possible, if the PUSCH transmission is scheduled on the unlicensed carrier from the base station, the user equipment configures HARQ-ACK and CSI as a user equipment feedback for DL transmissions on the licensed carrier and on the unlicensed carrier, to be transmitted through the PUSCH on the unlicensed carrier, by using the legacy UCI piggyback method.

Option 4. In a case where the CA is composed of licensed carrier(s) and unlicensed carrier(s), as a group of cells on which transmission of a PUCCH is possible, and the simultaneous transmission of PUSCH and PUCCH is not configured in the user equipment, for a subframe where PUCCH transmission may be possible, if the PUSCH transmission is scheduled on the unlicensed carrier from the base station, the user equipment drops the scheduled PUSCH on the unlicensed carrier, and the user equipment configures HARQ-ACK and CSI as the user equipment feedback for DL transmissions on the licensed carrier and on the unlicensed carrier to be transmitted through the PUCCH on the licensed carrier, by assuming the transmission only through the PUCCH.

Option 5. In a case where the CA is composed of licensed carrier(s) and unlicensed carrier(s), as a group of cells on which transmission of a PUCCH is possible, and the simultaneous transmission of PUSCH and PUCCH is not configured in the user equipment, for a subframe where PUCCH transmission may be possible, if a PUSCH transmission is scheduled on the unlicensed carrier from a base station, the user equipment drops the scheduled PUSCH as only when the subframe is the HARQ-ACK response to be transmitted as an user equipment feedback for DL transmission on the licensed carrier to be transmitted by the user equipment. In addition, the user equipment configures HARQ-ACK and CSI as the user equipment feedback for DL transmissions on the licensed carrier and on the unlicensed carrier to be transmitted through the PUCCH on the licensed carrier, by assuming the transmission only through the PUCCH. Since only the HARQ-ACK response to the DL transmission on the licensed carrier may not be transmitted through the PUSCH on the unlicensed carrier, the CSI may be transmitted through the PUSCH on an unlicensed carrier. Therefore, only when the UCI type to be piggy-backed is the HARQ-ACK response to the DL transmission on the licensed carrier, it may drop the scheduled PUSCH on the unlicensed carrier by applying the corresponding method.

<Exclusion Method for Calculating NACK Rate for PUSCH Transmission Drop in Adjusting CWS>

In Options 4 to 5, the base station may schedule the PUSCH, but the user equipment may drop the PUSCH. If a CWS adjustment is used based on the PUSCH reception of the base station at UL LBT, in the case of Options 4 to 5, since the base station may recognize the PUSCH drop from the user equipment according to the combination of the configuration information, for the PUSCH drop of the user equipment, during the CWS adjustment, the corresponding PUSCH drop may not indicate the collision handling or interference condition on the unlicensed carrier(s). Accordingly, the dropped PUSCH may be configured not to be used for calculating the NACK ratio for the CWS adjustment or calculating Z % of the NACK used for DL CWS adjustment.

The representation of the unlicensed carrier(s) in the present disclosure may be identical to that of the LAA SCell(s).

CWS Adjustment for UL Transmission

A method for adjusting a CWS for the UL LBT of the user equipment will be described.

When a base station manages a user equipment-specific CWS of each of user equipment(s), or each of the user equipment(s) enables the base station to recognize the CWS of each user equipment, the base station may update/adjust the CWS of each user equipment based on the UL transmissions transmitted from the user equipment. Meanwhile, in the case of power limitation of a user equipment, depending on a priority of channels of licensed carrier(s) and channels of unlicensed carrier(s), a PUSCH transmission may be dropped on the unlicensed carrier(s). However, since the base station may difficult to recognize the power limitation state of the user equipment, it is impossible to recognize whether the channels dropped by the user equipment are transmitted due to the power limitation. The base station expects the user equipment to transmit the scheduled channel and expects UL reception at the corresponding reception timing. Accordingly, when the UL transmission is dropped in the user equipment, the base station may determine a reception response for the UL transmission to a NACK and use the NACK as information for updating the CWS of the use equipment. However, due to the power limitation state of the user equipment, the dropped UL transmission may not be useful information for determining whether the channel for the medium between the user equipment and the base station is busy or idle. Therefore, when the base station performs the CWS update/adjustment for each user equipment, it may consider performing the CWS update/adjustment based on whether the base station receives the PUSCH transmitted by the user equipment. For example, when the user equipment transmits the PUSCH and the base station successfully decodes the PUSCH, the base station may reset the CWS of the corresponding user equipment to the minimum value (i.e., CWmin) by determining that the response for the PUSCH transmission is an ACK. In this case, the user equipment determines that the channel between the user equipment and the base station is idle, so that the user equipment may reset every CWp (e.g., p={1, 2, 3, 4}), which may be set differently according to the channel access priority class, to the minimum value (i.e., (CWmin, p)). Meanwhile, when the base station fails to decode the corresponding PUSCH, the base station may double the CWS of the corresponding user equipment by determining that the response to the PUSCH transmission is a NACK and. In this case, the user equipment determines that the channel between the user equipment and the base station is busy, so that the user equipment doubles the CWp (e.g., p={1, 2, 3, 4}) that may be differently set according to the channel access priority class. In addition, if the base station performs energy detection for the PUSCH transmission through detection of the UL DM-RS, or if the PUSCH is scheduled with the SRS, the energy detection of the SRS may be performed to determine whether the PUSCH is transmitted.

When the base station manages the CWS of each user equipment according to a PUSCH decoding result, the base station may enable each user equipment to perform the CWS update/adjustment using a new data indicator (NDI) included in a UL grant. The NDI is 1-bit information indicating an initial-transmission/retransmission of the PUSCH based on whether it is toggled based on an NDI value of the previous UL grant. For example, if an NDI value of the current UL grant is equal to the NDI value of the previous UL grant, the current UL grant indicates a retransmission of the PUSCH (i.e., decoding failure of the previous PUSCH). In addition, if the NDI value of the current UL grant is toggled differently from the previous value, the current UL grant indicates an initial transmission of the PUSCH (i.e., the decoding success of the previous PUSCH). Specifically, when the NDI on the UL grant received in the n-th subframe from the base station is toggled so that transmission of a PUSCH scheduled to the corresponding user equipment in the (n+4)-th subframe indicates new data, at the time when the UL grant is received, the CWp for the corresponding user equipment may be reset, that is, the current CWp may be set to the CW_min, p value. Unlike this, when the NDI received on the UL grant received in the n-th subframe from the base station does not indicate the new data (i.e., when the NDI in the (n−4)-th UL subframe is not toggled to indicate retransmission of the PUSCH), it may perform LBT for transmission of the PUSCH in the (n+4)-th subframe by doubling the current CWS (at the time of receiving the UL grant). In addition, if the LBT using the CW_max value is repeatedly set to K times (e.g., K={1, . . . , 8}) by retransmission, CWp may be set to the CW_min value. The value K may be designated to one value of {1, . . . , 8} by the base station.

Next, when the base station manages only a CWS for the base station transmission without information on the CWS of the user equipment and each user equipment(s) manages its own CWS, each user equipment may perform the CWS update/adjustment using New data indicator (NDI) information included in the UL grant transmitted from the base station. For example, when the NDI on the UL grant received in the n-th subframe from the base station is toggled so that transmission of the PUSCH scheduled to the corresponding user equipment in the (n+4)-th subframe indicates the new data, at the time when the UL grant is received, the CWp for the corresponding user equipment may be reset, that is, the current CWp may be set to the CW_min, p value. Unlike this, when the NDI received on the UL grant received in the n-th subframe from the base station does not indicate the new data (i.e., when the NDI in the (n−4)-th UL subframe is not toggled to indicate retransmission of the PUSCH), it may perform the LBT for the transmission of the PUSCH in the (n+4)-th subframe by doubling the current CWS (at the time of receiving the UL grant). In addition, if the LBT using the CW_max value is repeatedly set to K times (e.g., K={1, . . . , 8}) by retransmission, CWp may be set to the CW_min value. The value K may be designated to one value of {1, . . . , 8} by the base station.

If the user equipment adjusts the CWS according to toggle of the NDI included in the UL grant, it may be considered to update/adjust the CWS depending on whether the UL transmission on a reference subframe has been successfully decoded to promptly adjust the CWS according to the UL channel states. Here, the reference subframe may be defined as follows.

The reference subframe is defined as a starting transmission subframe of the most recent UL transmission burst in which the Cat-4 LBT procedure is expected to be used, and it refers to the subframe in which the transmission of the UL DMRS or SRS from the user equipment is detected by the base station and the PUSCH is decoded.

The reference subframe may be defined as the starting transmission subframe of the most recent UL transmission burst in which the Cat-4 LBT procedure is expected to be used.

The reference subframe may be defined as the first subframe of a reference scheduled burst in which the base station successfully decodes at least one transport block on the LAA SCell. The reference scheduled burst refers to the UL subframe(s) most recently consecutively scheduled for the corresponding user equipment. The reference scheduled burst is the UL subframe(s) expected to initiate a UL transmission after a Cat-4 LBT, and refers to the UL subframe(s) expected to complete transmission before at least four subframes than a subframe in which the CWS adjustment information (e.g., NDI) is transmitted.

The reference subframe may be defined as a (starting) subframe of the most recent UL transmission burst successfully transmitted by the user equipment.

The reference subframe may be defined as a (starting) subframe of the most recent UL transmission burst successfully transmitted, after the user equipment performs Cat-4.

When the base station successfully decodes the reference subframe (e.g., PUSCH), the CWS may be reset by the user equipment. In addition, when the base station does not successfully decode the reference subframe (e.g., PUSCH), the CWS may be increased by the user equipment. When the CWS is defined for each of channel access priority classes, CWSp may be reset or increased to a CWSp value of the next higher allowed level for every channel access priority classes. p is the channel access priority class (e.g., p={1, 2, 3, 4}).

When the PUSCH carries a plurality of transport blocks (TB) in the reference subframe (i.e., UL SU-MIMO) and at least one of the TB(s) in the reference subframe are successfully decoded, CWS for each of the channel access priority classes may be reset, and otherwise, the CWS may be increased to a CWS value of the next higher allowed level of for each of the channel access priority classes. The transmission success/failure of the user equipment with respect to the reference subframe may be determined by referring to the NDI value transmitted in the UL grant by the base station. The NDI is set by each TB. Accordingly, if the NDI for at least one of the TB(s) for the reference subframe is toggled, the CWS may be reset for every channel access priority classes, and otherwise (i.e., there is no toggled NDI), for every channel access priority classes, the CWS may be increased to the CWS value of the next higher allowed level. In other words, if any NDI is toggled in a subsequent UL grant after and associated with the reference subframe (e.g., only one of the two NDIs is toggled), the CWS may be reset to the minimum value, and the CWS may be increased if there is no toggled NDI. Whether the UL grant is associated with a reference subframe of a previous UL transmission burst may be determined based on whether or not HARQ-process ID of the reference subframe is the same as HARQ-process ID of a subframe scheduled by the UL grant (or uplink transmission (e.g., PUSCH)). Since asynchronous HARQ may be applied to UL transmission on LAA SCell, whether the UL grant is associated with the reference subframe of a previous UL transmission burst may be determined based on whether the HARQ-process ID in the UL grant is the same as the HARQ-process ID used to schedule the reference subframe. Meanwhile, when the LBT using the CW_max value is repeatedly set to K times (e.g., K={1, . . . , 8}) by retransmission, only the CWp of the repeated channel access priority class may be set to the CW_min value. The value K may be designated to one value of {1, . . . , 8} by the base station.

Meanwhile, the base station may signal or indicate the user equipment a location of the reference subframe within the reference scheduled burst that the user equipment may use to update the CWS. For example, when information indicating cat-4 LBT, as the LBT type to be performed by the user equipment in UL transmission, is implicitly or explicitly signaled to the user equipment via the UL grant, information on the location of the reference subframe may be included in the corresponding UL grant. Even if no reference subframe is detected in the base station, the base station may signal the information on the location of the reference subframe to the user equipment.

For example, the number of bits may be determined according to the number of subframes scheduled for multi-subframe to inform the location of the reference subframe in the reference scheduled burst with a bitmap. As another example, the location of the reference subframe may be indicated including a case where no reference subframe is detected with a bitmap regardless of the number of subframes scheduled for multi-subframe (e.g., 0000: no reference subframe, 1000: 1st subframe, 0100: 2nd subframe, 0010: 3rd subframe, 0001: 4th subframe). Unlike this, assuming that the maximum number of subframes that can be multi-subframe scheduled is four, the location of the reference subframe may be designated with two bits. As another example, it is possible to signal 5 states (e.g., no reference subframe, 1st subframe, 2nd subframe, 3rd subframe, and 4th subframe) with 3 bits, including a case where any reference subframe is not detected.

When the user equipment receives the location of the reference subframe from the base station, the user equipment may perform a UL transmission (e.g., PUSCH) in a subframe (e.g., the first UL subframe of four consecutive UL subframes) prior to a reference subframe (e.g., the second UL subframe of four consecutive UL subframes) in the reference scheduled burst. In this case, the base station may not receive the UL transmission in the reference subframe even though the user equipment has transmitted it earlier. Therefore, the user equipment may determine that a collision has occurred in the base station reception for the UL transmission, and the user equipment may increase the CWS(s) for every channel access priority classes (or LBT priority classes) (e.g., twice).

When the user equipment receives the location of the reference subframe from the base station, the user equipment may perform a UL transmission (e.g., PUSCH) in a subframe (e.g., the third UL subframe of four consecutive UL subframes) after a reference subframe (e.g., the second UL subframe of four consecutive UL subframes) in the reference scheduled burst. In this case, the user equipment may maintain the CWS(s) for every channel access priority classes (or the LBT priority classes) without changing them. That is, the base station considers that the UL transmission is received in the reference subframe even though the user equipment transmits it later and the CWS may be maintained by considering that it is not related to collision in the base station reception for UL transmission.

When the user equipment receives the location of the reference subframe from the base station, the user equipment may perform a UL transmission (e.g., PUSCH) in the same subframe (e.g., the first UL subframe of four consecutive UL subframes) in the reference scheduled burst. In this case, since the user equipment performs the UL transmission in the reference subframe and the base station successfully decodes at least one transport block for the UL transmission of the reference subframe, the user equipment may determine that the base station successfully receives the UL transmission. Thus, the user equipment may reset the CWS(s) for every channel access priority classes (or the LBT priority classes) to a minimum value.

Meanwhile, if the user equipment is configured to reset the CWS or increase it to the next higher allowed level in the cat-4 LBT based on the NDI for the reference subframe, since asynchronous HARQ is applied to UL transmission in LAA SCell, not synchronous HARQ, it is not guaranteed that the UL grant that may refer to the retransmission for UL transmission (e.g., PUSCH) transmitted in the subframe n is transmitted in the subframe (n+4). Therefore, when the UL grant is not received in the subframe (n+4), ambiguity arises as to whether the user equipment should reset the CWS or increase it to the next level for using the CWS for the cat-4 LBT. To solve this problem, if the NDI for at least one of the TB(s) based on the NDI of the recently received UL grant is toggled, the user equipment resets the CWS for every channel access priority classes to CW_min, and otherwise, increases the CWS to a CWS value of the next higher allowed level for every channel access priority classes. In addition, when the LBT using the CW_max value is repeatedly set to K times (e.g., K=$\{1, \ldots, 8\}$) by retransmission, only the CWp of the repeated channel access priority class may be set to the CW_min value. The value K may be designated to one value of $\{1, \ldots, 8\}$ by the base station.

As described above, therefore, the base station may not distinguish the following three cases in which the user equipment fails to transmit the PUSCH. Therefore, a method for classifying the following three cases and a method for adjusting the CWS according to the corresponding method will be described.

First, the case where the PUSCH may not be transmitted due to not receiving the UL grant, Second, the case where LBT fails before PUSCH transmission and PUSCH may not be transmitted Third, the case where LBT succeeds before PUSCH transmission but PUSCH may not be transmitted (e.g., UL power limit case)

First, as an example of a method for distinguishing the first and second cases, if LAA SCell is configured to receive cross-carrier scheduling from a cell of a licensed carrier, (E)PDCCH and PDSCH including the UL grant for transmission of the UL PUSCH on the LAA SCell may be simultaneously transmitted in the downlink. In this case, when the base station detects explicit HARQ-ACK feedback (including a case of receiving "ACK, NACK" or "ACK, NACK, NACK/DTX" or at least ACK or NACK) as feedback on the PDSCH rather than no transmission on a licensed carrier or an unlicensed carrier, since it may be seen that (E)PDCCH scheduling PDSCH may be regarded as successful in the user equipment, the base station may determine that the user equipment has successfully received the UL grant. Thus, in the first case, that is, the PUSCH may not be transmitted because the UL grant is not received, it may be excluded from the event to adjust (e.g., CWS increase) the CWS used to perform the UL LBT for transmission of the next PUSCH. When (E)PDCCH including the UL grant is transmitted from the cell of the licensed carrier, since the first case may not be advantageous informing the state of the channel collision for transmission of the UL PUSCH on the LAA SCELL, the base station may be excluded for adjusting the CWS for the uplink transmission of the user equipment. That is, when the base station may not receive (or detect) the PUSCH at the transmission timing of the PUSCH determined by the reception of the UL grant, the base station may determine that the PUSCH is not transmitted due to the failure of the PUSCH LBT and increase the CWS for the corresponding user equipment (e.g., twice).

The above contents may be identically applied to the case where the unlicensed carrier or LAA SCell is configured to self-carrier scheduling. When the (E)PDCCH and the PDSCH including the UL grant for transmission of the UL PUSCH on the LAA SCell may be simultaneously transmitted on the downlink on the LAA SCELL, as feedback on the PDSCH, the explicit HARQ-ACK feedback (including a case in which one of "ACK, NACK" or "ACK, NACK, NACK/DTX" or at least ACK or NACK is detected), which is not a no transmission case, may be detected by the base station on a licensed carrier or an unlicensed carrier. In this case, it may be seen that the reception of the (E)PDCCH for scheduling the PDSCH is successful in the user equipment. In addition, the base station may determine that the user equipment has successfully received the UL grant. Thus, in the first case, that is, when the PUSCH may not be transmitted because the UL grant is not received on the unlicensed carrier, it may be excluded from the event to adjust (e.g., CWS increase) the CWS used to perform the UL LBT for transmission of the next PUSCH. That is, when the base station may not receive (or detect) the PUSCH at the transmission timing of the PUSCH determined by the reception of the UL grant, the base station may determine that the PUSCH is not transmitted due to the failure of the PUSCH LBT and increase the CWS for the corresponding user equipment (e.g., twice).

Next, an implicit signaling method and an explicit signaling method will be described as methods by which the base station may distinguish between the second and third cases.

First, as an implicit signaling method, when a CA is configured for a power limitation case of a user equipment, a PUSCH on an unlicensed carrier may be dropped according to a transmission priority according to a channel type in different carriers and contents of channels. The transmission priority may follow the priority defined in the standard up to the existing 3GPP Rel-13 (e.g., PRACH>PUCCH>PUSCH with UCI>PUSCH>periodic SRS). Therefore, when transmission of channels (e.g., PRACH, PUCCH, or PUSCH with UCI) having a higher priority than the PUSCH on the unlicensed carrier is detected in another carrier at transmission timing of the PUSCH according to the UL grant transmission, the base station may regard the PUSCH on the unlicensed carrier as dropped due to the power limitation state of the user equipment. In this case, the PUSCH not received on the unlicensed carrier may be excluded from the event to adjust the CWS (e.g., CWS increase) used to perform UL LBT for transmission of the next PUSCH. That is, although the LBT for the PUSCH has succeeded (i.e., the channel is idle), even if the PUSCH is not received (or detected) in the base station at the transmission timing of the PUSCH according to the UL grant because the PUSCH may not be transmitted due to the power limitation state of the user equipment, the base station may not double or increase the CWS of the corresponding user equipment (i.e., maintain the CWS).

In addition, the above implicit signaling method may be configured differently in a case where the user equipment receives cross-carrier scheduling of the PUSCH and in a case where the user equipment receives self-carrier scheduling of the PUSCH. In the case of the self-carrier scheduling, when it is determined that the UL grant has been successfully received, the channel state may be considered/ regarded to be idle at the PUSCH transmission timing on the unlicensed carrier. That is, although the PUSCH LBT succeeds, even if the PUSCH is not received (or detected) at the base station at the transmission timing of the PUSCH according to the UL grant, in consideration that the PUSCH may not be transmitted due to the power limitation state of the user equipment (i.e., the third case), the CWS of the corresponding user equipment may not be doubled or increased from the previous CWS (i.e., maintain the CWS).

In the case of the cross-carrier scheduling, successful UL grant reception on the licensed carrier may not be considered as a method for determining the state of a channel at the PUSCH timing on an unlicensed carrier. In this case, since it is difficult for the base station to determine the second case and the third case, the base station arbitrarily determine whether the second case or the third case to apply the CWS adjustment method. Alternatively, in order to configure to obtain more channel opportunities, even if it is scheduled by a UL grant from a licensed carrier, in a case where the PUSCH is not received, a method may be considered in which the CWS is configured to be doubled or increased from the previous value.

Next, as an explicit signaling method, information on a PUSCH LBT failure on the LAA SCELL or information on whether the PUSCH on the LAA SCell is dropped due to power limitation may be included within the PUCCH/ PUSCH of the licensed PCell or the PUCCH/PUSCH of the licensed SCell and transmitted. Alternatively, information on a PUSCH LBT failure on another LAA SCell or information on whether a PUSCH on the LAA SCell is dropped due to power limitation may be included in a PUSCH of the LAA SCell set to be transmittable after LBT success and transmitted.

Figure 18:
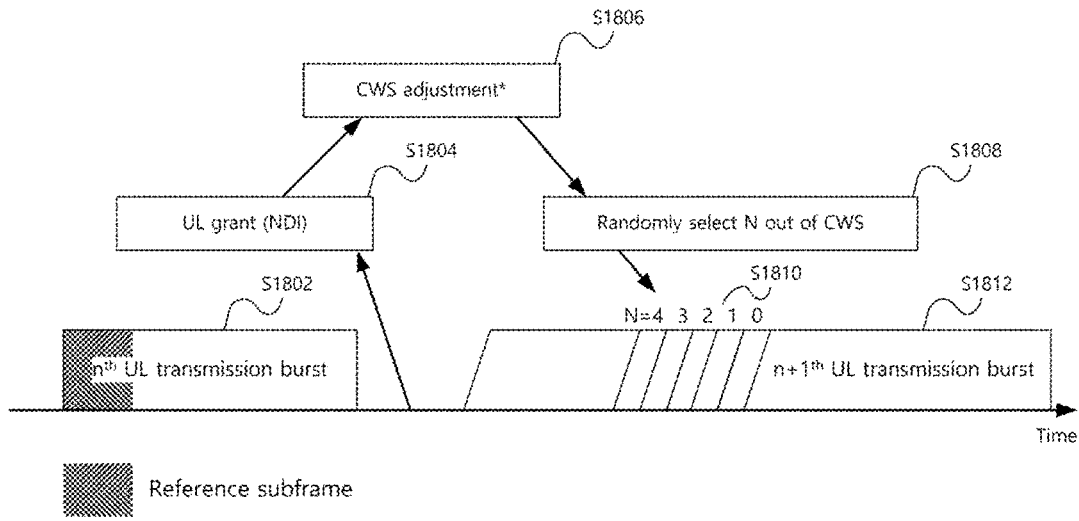
FIGS. 18 to 22 illustrate a UL transmission process in an unlicensed band.

FIG. 18 illustrates a signal transmission process.

Referring to FIG. 18, after receiving a UL grant (e.g., UG #1) from a base station, a user equipment may transmit an n-th UL transmission burst (e.g., UTB #1) (S1802). The UTB #1 includes one or more, preferably two or more, consecutively scheduled UL subframe(s), and a PUSCH may be transmitted for each UL subframe. The UTB #1 may be transmitted in an unlicensed band (e.g., an LTE-U cell) and may be transmitted based on a Cat-4 LBT procedure (i.e., Type 1 channel access). Then, the base station may transmit UL grant (e.g., UG #2) to the user equipment (S1804). The UG #2 includes scheduling information for the (n+1)-th UL transmission burst (e.g., UTB #2), and the UTB #2 includes one or more contiguously scheduled UL subframe(s). The UG #2 includes PUSCH scheduling information for each UL subframe in the UTB #2, and each PUSCH scheduling information includes an NDI for each TB. The user equipment may transmit UTB #2 according to UG #2 (S1812). The UTB #2 may also be transmitted in an unlicensed band (e.g., LTE-U cell) and may be transmitted based on the Cat-4 LBT procedure. Specifically, if channel of the unlicensed band is in an idle state during the ECCA defer period, the user equipment further performs a random backoff within a CWS (S1810). The user equipment generates a random number N equal to or less than the CWS (e.g., [0, q−1]) (S1808) and performs backoff with the number of slots corresponding to the random number N (S1810). In this case, the size (i.e., CWS) of CW is adaptively changed based on the NDI value of the UG #2 (S1806). The NDI value used for adjusting the CWS may be related to the UL transmission (i.e., PUSCH) on a reference subframe in the most recent UL transmission burst (i.e., UTB #1). Specifically, when at least one NDI is toggled with respect to the TB(s) transmitted on the reference subframe in the UTB #1, the CWS is reset to the minimum value, otherwise the CWS may be increased. For example, if multiple (e.g., two) TBs are transmitted on the reference subframe and at least one NDI is toggled in a UL grant after and associated with the reference subframe (e.g., only one of the two NDIs is toggled), the CWS may be reset to the minimum value. Since asynchronous HARQ is applied to UL transmission in LAA SCell, in the UL transmission, whether the UL grant is associated with the reference subframe of the previous UL transmission burst may be confirmed using a HARQ-process ID. For example, when the UL grant having the HARQ-process ID used for the scheduling of the reference subframe is received after the reference subframe (or when the HARQ-process ID of the reference subframe and the HARQ process ID of the subframe scheduled by the UL grant are the same), and when at least one of the NDI values in the UL grant are toggled, the CWS may be reset to the minimum value. On the other hand, if the UL grant associated with the reference subframe is not received, or the UL grant associated with the reference subframe is received but the NDI is not toggled on all TBs, the CWS may be increased. When CWS increases, CWS may be doubled or increased exponentially between the minimum value (i.e., CW_min) and the maximum value (i.e., CW_max) or increased to the maximum value.

The method described above based on multi-subframe scheduling may be similarly applied to the case of single subframe scheduling.

Next, a signaling method for the LBT parameter for adjusting the CWS at performing UL LBT for UL PUSCH transmission by the user equipment will be described.

When a base station informs a user equipment of a UL LBT parameter, since the base station may difficult to recognize the channel access priority class for the traffic transmitted by the user equipment, notifying CWS of every channel access priority classes to the user equipment may be a large signaling overhead. Also, when each channel access priority class follows the channel access priority class (DL channel access priority class) used in the DL, as shown in Table 6, the range of allowed CWp size is large, so that related signaling overhead may be increased.

TABLE 6

| Channel Access Priority Class (p) | $m_p$ | $CW_{min,p}$ | $CW_{max,p}$ | $T_{mcot,p}$ | allowed $CW_p$ sizes |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

In addition, Table 7 may be used as an LBT parameter for the UL channel access priority class.

TABLE 7

| LBT priority class | n | CWmin | CWmax | MCOT | Set of CW sizes |
|---|---|---|---|---|---|
| 1 | 2 | 3 | 7 | 2 ms | {3, 7} |
| 2 | 2 | 7 | 15 | 4 ms | {7, 15} |
| 3 | 3 | 15 | 1023 | 6 ms (see note 1) or 10 ms (see note 2) | {15, 31, 63, 127, 255, 511, 1023} |
| 4 | 7 | 15 | 1023 | 6 ms (see note 1) or 10 ms (see note 2) | {15, 31, 63, 127, 255, 511, 1023} |

(note 1),
(note 2)
(note 1):
The maximum channel occupancy time (MCOT) of 6 ms may be increased to 8 ms by inserting one or more gaps and the minimum duration of a pause due to the gap should be 100 us. The maximum duration length before including the gap should be 6 ms. The gap duration is not included in the channel occupancy time.
(note 2):
If the absence of any other technology (e.g., Wi-Fi) on the same carrier is guaranteed, the MCOT for LBT priority classes 3 and 4 may be up to 10 ms, otherwise, the MCOT for LBT priority classes 3 and 4 is as specified in Note 1.

Therefore, in order to inform the CW size among the LBT parameters that the base station may inform the user equipment, a method for reducing the signaling overhead and a method for adjusting the CWS according to the signaling overhead will be described.

First, as the base station informs the user equipment of a common value for the CWS regardless of the channel access priority class, the user equipment receiving the common value may perform an LBT that performs a backoff operation using the CWS corresponding to a common value according to the channel access priority class to be transmitted. In other words, the base station determines whether the CWS is doubled or increased based on the reception of the PUSCH transmitted from the user equipment, and informs the user equipment of a common value with the parameters for the LBT, regardless of the channel access priority class, the user equipment receiving the common value sets the CWS according to the common value of the LBT of the PUSCH to be transmitted to performs the LBT, and transmits the PUSCH according to the success of the LBT. In the case of receiving a common value through the UL grant, when the common value is 0, the LBT may be performed with the minimum value of the CW size of the channel access priority class for the PUSCH to be transmitted, and when the common value is 1, LBT may be performed by setting the minimum value of CW size to the next level value. As a common value is applied according to sizes of CWp allowed in each channel access priority class, as in DL, when the maximum CWmax, p value in the channel access priority class is repeatedly set to K times, the CWp value may be set to the CWmin, p value in the channel access priority class. Here, K may be selected from {1, 2, . . . , 8} by the base station. K may be indicated to the user equipment via RRC signaling.

When DL channel access priority class 4 is used, 6 is indicated as the common value for CWS, and in a case where the next PUSCH transmission is intended for transmission with channel access priority class 1, in considering that the maximum CWS is repeated 6 times, according to the condition that if it is repeatedly set to K times by the base station, CWp value should be set to CWmin, p value in channel access priority class, the CWS of the PUSCH for the corresponding channel access priority class may be determined. A method may be considered in which when K is configured to 6, CWp may be set to the minimum value CWS, and if K is configured to 4, it is configured to the CWp maximum value, and since the common value is larger than the set value K, CWp is configured to the minimum value CWS.

Furthermore, as another method, as the level of allowed CWp size for UL PUSCH transmission is configured to the same number of levels (e.g., one of {2, 3, 4, . . . , 8 steps}) for every channel access priority classes. In addition, the base station informs the user equipment of the common value for the CWS regardless of the channel access priority class. Then, the user equipment receiving the common value may perform an LBT that performs backoff using the CWS corresponding to the common value according to a channel access priority class to be transmitted. This may be a method in which the increase or reset of the CWS with respect to the adjustment of the CWS according to each channel access priority class is controlled to be the same by the common value and the signaling overhead for CWS indication is reduced. In other words, in the case of receiving the common value of a condition in which the CWS increases for every channel access priority classes, the CWS is increased to the next higher allowed value regardless of the channel access priority class to be transmitted from the user equipment. In addition, even in the case of receiving the common value of the reset condition in the CWS reset or satisfying the reset condition by repeating K times, the corresponding CWS for every channel access priority class is reset regardless of the channel access priority class. This may be considered as a method for reducing the signaling overhead for CWS among the LBT parameters transmitted in the UL grant. As one embodiment below, when the channel access priority class used in the DL is based on the following method, a method for setting a level of the allowed CWp size to two levels may be used. In the corresponding case, a signaling overhead of a common value indicating CWS is sufficient for one bit.

TABLE 8

| Channel Access Priority Class (p) | allowed $CW_p$ sizes |
| --- | --- |
| 1 | {3, 7} |
| 2 | {7, 15} |
| 3 | {15, 31} |
| 4 | {31, 63} |

If Modified to a more general allowed CWp size representation, it may be as follows.

TABLE 9

| Channel Access Priority Class (p) | allowed $CW_p$ sizes |
| --- | --- |
| 1 | {A, B} |
| 2 | {C, D} |
| 3 | {E, F} |
| 4 | {G, H} |

Here, B, C, D, E, F, G, and H values may be set to values satisfying the condition A<B=<C<D=<E<F=<G<H, and B, D, F, and H values may be set as the maximum CW size value of the corresponding channel access priority class. For example, when the maximum allowed CW size uses the value used in the DL, each of B, D, F, and H may have one value of {7, 15, 31, 63, 127, 255, 511, 1023}.

As another embodiment, if the UL transmission is configured to use a smaller CW size than the DL transmission. For example, when the maximum allowed CW size is configured to {3, 4, 5, 6} or {3, 4, 5, 6, 7}, even when having the maximum CWS defined by the value of one of {3, 4, 5, 6} or one of {3, 4, 5, 6, 7}, the allowed CWp size level for UL PUSCH transmission may be set to the same number of levels for every channel access priority classes.

Table 10 is one example, and a method for setting an allowed CWp size level to two levels may be used.

TABLE 10

| Channel Access Priority Class (p) | allowed $CW_p$ sizes |
| --- | --- |
| 1, 2 | {A, B} |
| 3, 4 | {C, D} |

Here, B, C, and D values may be set to values satisfying the condition A<B=<C<D, and B and D values may be set to the maximum CW size value of the corresponding channel access priority class. For example, if the maximum allowed CW size is configured to {3, 4, 5, 6} or {3, 4, 5, 6, 7}, it is possible to set each of B and D to one of {3, 4, 5, 6} or one of {3, 4, 5, 6, 7} as the maximum allowed CW size.

Referring to FIG. 9, B, C, D, E, F, G, and H values may be set to values satisfying the condition A<B=<C<D=<E<F=<G<H, and B, D, F, and H values may be set to the maximum CW size value of the corresponding channel access priority class. For example, if the maximum allowed CW size is configured to {3, 4, 5, 6} or {3, 4, 5, 6, 7}, it is possible to set each of B, D, F, and H to one of {3, 4, 5, 6} or one of {3, 4, 5, 6, 7} as the maximum allowed CW size.

Figure 19:
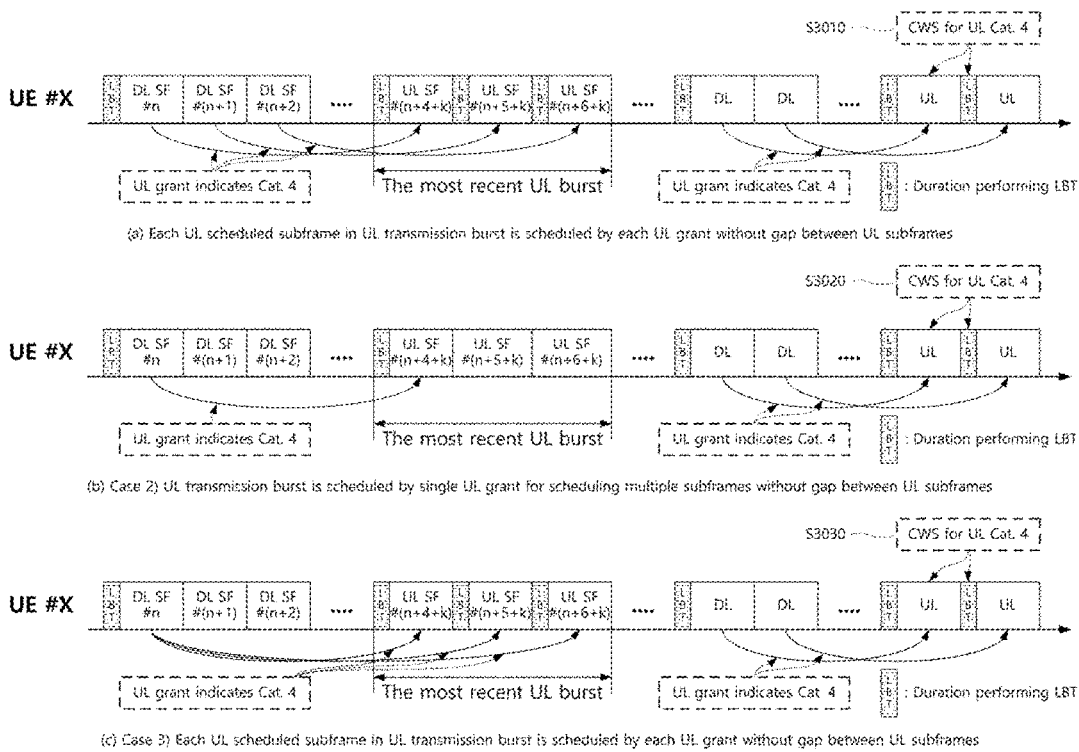
Figure 20:
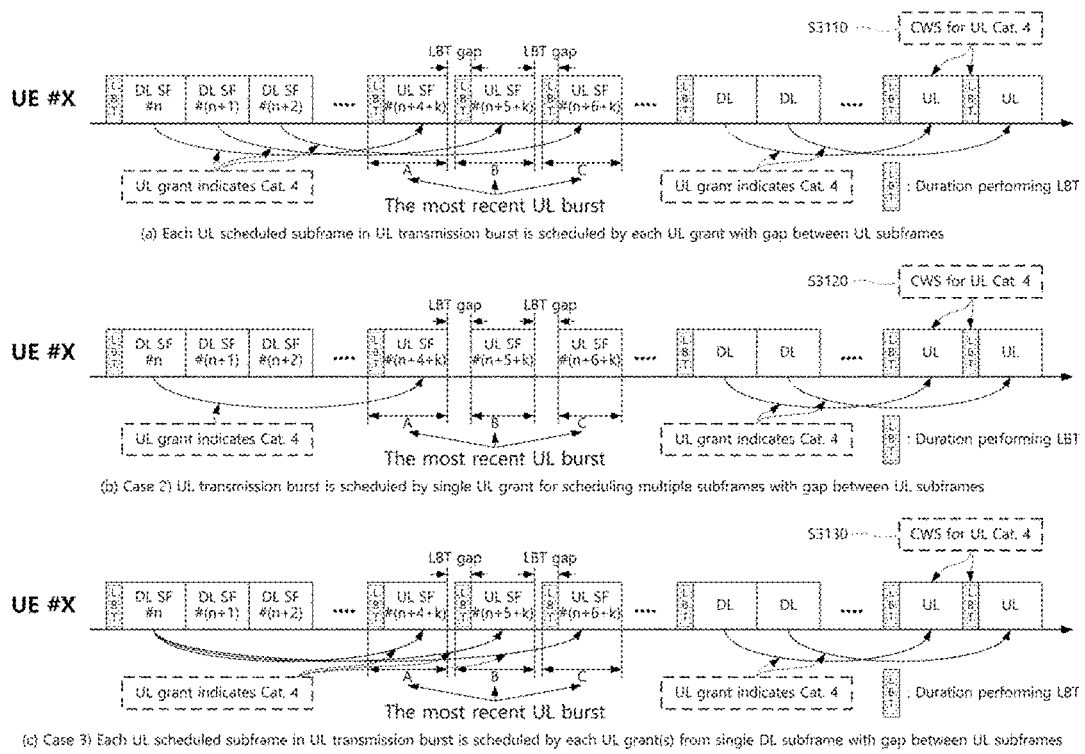

When the base station performs the scheduling to the user equipment as shown in FIGS. 19 to 20 and configures the reference subframe for updating the CWS by the user equipment. In this case, the user equipment performs the UL LBT for the reference subframe according to the scheduling information transmitted in the UL grant from the base station. Then, when the LBT succeeds, the use equipment performs UL transmission in the UL reference subframe. However, even though the user equipment performs the UL transmission, a case where the base station fails to detect the UL transmission, due to the channel interference condition of the unlicensed band used by the LAA SCell, may occur. In this case, the base station may not accurately identify whether the UL transmission of the scheduled UL subframe fails to perform transmission due to UL LBT failure of the user equipment, due to transmission failure at the user equipment, or because the user equipment miss the UL grant from the base station, or whether the base station may not detect it due to channel interference in the corresponding subframe. Especially, if the base station fails to detect the reference subframe despite the transmission of the reference subframe from the user equipment, the CWS should be increased, but if the base station and the user equipment determine the reference subframe differently each other, the CWS may be reset even though it is an increase condition of the CWS. Alternatively, the opposite case may occur. Accordingly, by solving the mismatch problem of the reference subframe between the base station and the user equipment for adjusting the CWS and setting to have the same understanding between the base station and the user equipment, in determining the CWS for the UL LBT performed by the user equipment, a method for configuring the base station and the user equipment to recognize whether the reference subframe of the UL transmission burst received at the base station is same as the reference subframe transmitted by the user equipment will be described.

When assuming that a reference subframe is a starting transmission subframe of a UL transmission burst transmitted from a user equipment by performing cat-4 LBT, the following description is a method for indicating the starting transmission subframe of the UL transmission burst in the user equipment and a method for configuring a base station to recognize whether the first subframe of a UL transmission burst received by the base station is the first subframe transmitted by the user equipment.

Figure 21:
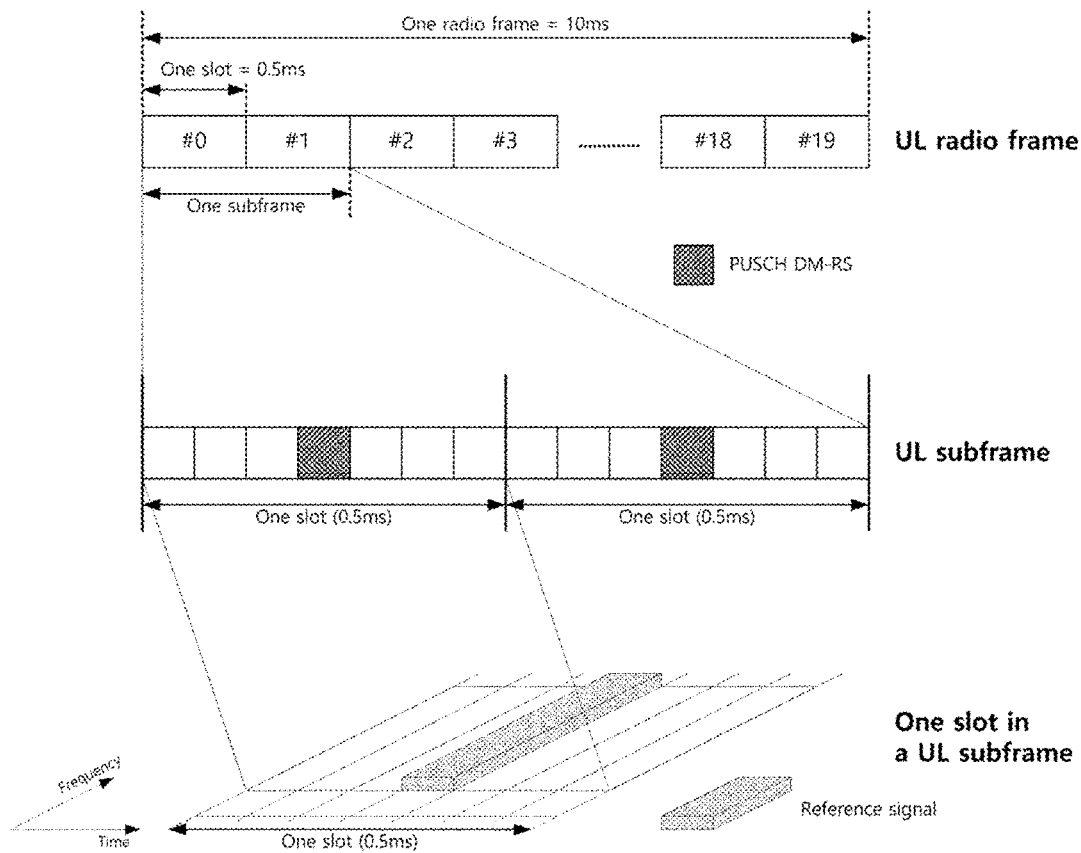

FIG. 21 is a diagram showing a structure of a UL radio frame, a UL subframe, and a UL slot in LTE. In the LTE, a cyclic-shift index of a sequence of a reference signal (e.g., UL DMRS) within the UL subframe is determined by a value set by the cyclic-shift index of the UL DMRS in the UL grant transmitted from a base station to a user equipment and RRC signaling, and a function of the slot index. The cyclic shift value determined by RRC signaling during a certain time interval is the same, and since the cyclic shift index value determined by the UL grant is constant within a subframe, the cyclic shift value of the UL DMRS in the subframe may be determined to be a different value depending on the slot index.

Method P) as a method different from a method of using the cyclic-shift index of the UL DM-RS sequence transmitted in the UL subframe transmitted at the first in the UL transmission burst transmitted after the UL LBT based on the slot index used in the legacy, a method for transmitting a UL DM-RS sequence using the following methods P-1 to P-3 may be considered. Therefore, as the base station performs detection of the UL DMRS as many as twice at the time of the PUSCH detection for each subframe of the UL transmission burst scheduled by the base station, the base station determines whether each subframe of the received UL transmission burst is the first successfully transmitted subframe or whether there is the first successfully transmitted subframe prior to transmission of the corresponding subframe.

Method P-1) as one embodiment, unlike the legacy method, the user equipment switches a cyclic shift index of a UL DM-RS sequence transmitted in the UL subframe transmitted at the first in the UL transmission burst to a cyclic shift index of a UL DM-RS transmitted in each slot of the UL subframe transmitted at the first transmission, that is, switches the first slot index and the second slot index, so that the user equipment transmits the UL subframe including the UL DM-RS by setting the cyclic shift of the UL DM-RS sequence transmitted in the first slot based on the second slot index and the cyclic shift of the DMRS sequence transmitted in the second slot based on the first slot index.

As the user equipment informs whether the corresponding UL subframe is the first UL subframe of the UL transmission burst scheduled from the base station, through indicating that the cyclic shift index of the UL DM-RS is switched between the slots, when the user equipment transmits the UL subframe to the base station, this may be used as a method for preventing a mismatch of the user equipment and the base station for the starting transmission UL subframe.

For contiguous UL subframes of UL transmission bursts scheduled by the base station, the base station performs two detections based on the UL DM-RS generated by two different schemes (i.e., switching or no switching of the UL DM-RS cyclic shift value between the slots) until the PUSCH detection of the UL subframe. Then, when the UL PUSCH is detected by the switched UL DM-RS, the transmission of the corresponding subframe may be determined as the UL subframe at the starting of the UL transmission burst form the user equipment. In this case, depending on the success of PUSCH decoding in the starting UL subframe, the base station may signal the user equipment through signaling (e.g., UL grant, common control channel, common PDCCH) a reset of the CWS or that the CWS increases with a next higher allowed value. Unlike this, if the UL PUSCH is detected by the non-switched UL DM-RS at the base station, the base station determines that the transmission of the corresponding subframe is not the transmission of the first UL subframe of the UL transmission burst from the user equipment and the first UL subframe of the UL transmission burst in the user equipment is transmitted from the user equipment but the first UL subframe may not be detected at the base station due to the interference condition of the channel, so that the base station may signal the user equipment through signaling (e.g., UL grant, common control channel, common PDCCH) to increase the CWS to the next higher allowed value.

Method P-2) A method of setting the cyclic shift index of the UL DM-RS sequence in the first slot and the cyclic shift index of the UL DM-RS sequence in the second slot according to the same slot index may be considered. There may be a method of setting the cyclic shift index of the UL DM-RS sequence to be the same based on the index of the first slot of the UL subframe to be transmitted, and there may be a method of setting the same cyclic shift index of the UL DM-RS sequence based on the index of the second slot.

As the user equipment informs whether the UL subframe is the starting UL subframe of the UL transmission burst scheduled from the base station when the user equipment transmits the UL subframe to the base station through indicating that the cyclic shift index of the UL DM-RS is switched between the slots, this may be used as a method for preventing a mismatch of the user equipment and the base station for the starting transmission UL subframe.

For contiguous UL subframes of UL transmission bursts scheduled by the base station, the base station performs two detections based on the UL DM-RS generated by the two different schemes (i.e., based the same slot index for the UL DMRS cyclic shift value between the slots or based on each slot index for the UL DM-RS cyclic shift value) until the PUSCH detection of the UL subframe. Then, when the UL PUSCH is detected by the UL DM-RS generated by the value of the same slot index of the UL DM-RS cyclic shift value between the slots, the transmission of the corresponding subframe may be determined as the UL subframe at the starting of the UL transmission burst from the user equipment. In this case, depending on the success of PUSCH decoding in the starting UL subframe, the base station may signal the user equipment through signaling (e.g., UL grant, common control channel, common PDCCH) a reset of CWS or that the CWS increases with a next higher allowed value. Unlike this, if the UL PUSCH is detected in the base station by the UL DM-RS generated by the value set based on the slot index, the base station determines that the transmission of the corresponding subframe is not the transmission of the first UL subframe of the UL transmission burst from the user equipment and the first UL subframe of the UL transmission burst in the user equipment is transmitted from the user equipment but the first UL subframe may not be detected at the base station due to the interference condition of the channel, so that the base station may signal the user equipment through signaling (e.g., UL grant, common control channel, common PDCCH) to increase the CWS to the next higher allowed value.

Method P-3) A method for transmitting a pre-defined cyclic shift index of UL DM-RS sequence based on the pre-defined index of the cyclic shift of the UL DM-RS previously set for a base station and a user equipment by applied to the UL DM-RS of a UL subframe to be transmitted at the first by the user equipment may be considered.

Method Q) as a method different from a method for using the cyclic-shift index of the sequence of the UL DM-RS transmitted in the UL subframe(s) excluding the UL subframe transmitted at the first in the UL transmission burst transmitted after the UL LBT based on a slot index using in a legacy, by generating a UL DM-RS sequence by using the following methods Q-1 to Q-3 to transmit, it is possible to distinguish between the starting transmission of the UL transmission burst at the base station and the non-starting transmission.

Method Q-1) as the setting of the cyclic-shift index of the UL DM-RS sequence transmitted to the UL subframe excluding the first UL subframe transmitted in the UL transmission burst is different from the legacy method, the user equipment switches the cyclic shift index of the UL DMRS transmitted in each slot between the slots, that is, switches the first slot index and the second slot index, so that the user equipment transmit the UL subframe including the UL DMRS by setting the cyclic shift of the DMRS sequence of the UL DMRS transmitted in the first slot based on the second slot index and the cyclic shift of the DMRS sequence of the UL DMRS transmitted in the second slot based on the first slot index.

Method Q-2) In the UL subframe(s) except the first UL subframe transmitted in the UL transmission burst, a method of setting the cyclic shift index of UL DMRS sequence in first slot and the cyclic shift index of the UL DMRS sequence in the second slot by the user equipment according to the same slot index may be considered. There may be a method of setting the cyclic shift index of the UL DMRS sequence to be the same based on the index of the first slot of the UL subframe to be transmitted, and there may be a method of setting the same cyclic shift index of the UL DMRS sequence based on the index of the second slot.

Method Q-3) In the UL subframe(s) except the first UL subframe transmitted in the UL transmission burst, a method for transmitting a cyclic shift index of a pre-defined UL DMRS sequence based on a pre-defined index of the cyclic shift of the UL DMRS previously set for a base station and a user equipment by applied to the UL DMRS of a UL subframe to be transmitted at the first by the user equipment may be considered.

Figure 22:
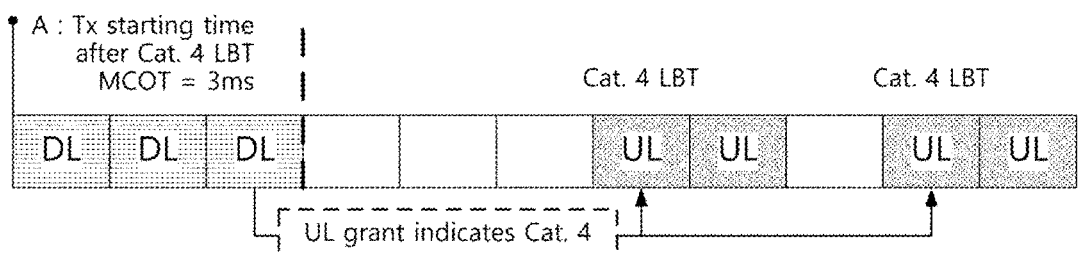
Figure 22:
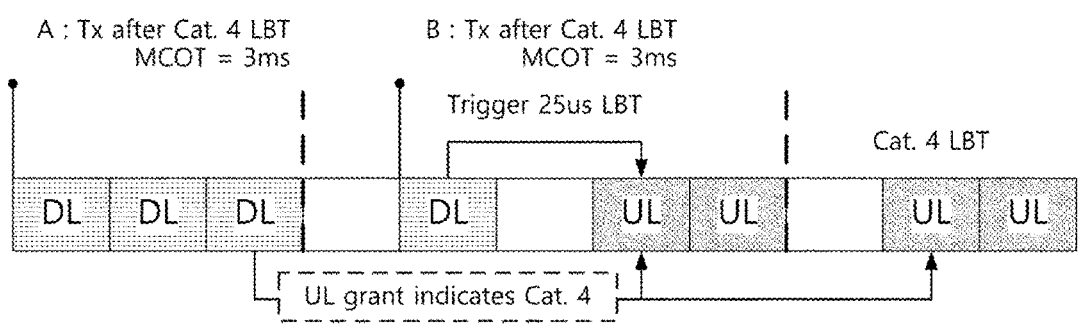

FIG. 22 illustrates a method for determining a CWS in a subframe in which Cat-4 should be performed for UL transmission. Specifically, it illustrates a case where each UL scheduled subframe of the most recent UL transmission burst has a gap between consecutive subframes and is scheduled by each UL grant (i.e., FIG. 20(a)), a case where scheduling is performed with a gap between consecutive UL subframes scheduled by a multi-subframe scheduling from one DL subframe (i.e., FIG. 20(b)), and a case where scheduling is performed with a gap between UL subframes scheduled by a plurality of UL grants from one DL subframe (i.e., FIG. 20(c)). In these cases, each UL subframe performing each cat-4 LBT may be regarded as a UL transmission burst due to a gap between UL subframes. As shown in FIG. 20, if there is a gap between scheduled UL subframes, in determining the CWS for performing cat-4 for the next UL transmission, the most recent UL transmission burst performing cat-4 as the reference subframe may be an A subframe (e.g., UL SF #(n+4+k)), a B subframe (e.g., UL SF #(n+5+k)), or a C subframe (e.g., UL SF #(n+6+k)) in FIGS. 20(a), 20(b) and 20(c). Here, since a subframe that has performed each cat-4 transmitted lastly may be the subframe of the UL burst most recently, in this case, even if it is the UL subframe that starts first among the scheduled subframes due to LBT success in the preceding cat-4 LBT, by informing the starting subframe of the UL burst by using Methods P-1, P-2, P-3 and Methods Q-1, Q-2 and Q-3 in the corresponding subframe, it is difficult to solve the reference subframe mismatch for adjusting the CWS for the next UL transmission between the base station and the user equipment. In such a case, detection of the UL DMRS and the PUSCH twice in the base station may increase only the detection complexity of the base station. Therefore, in a case where the base station configures the user equipment to perform scheduling with a UL gap, a method in which the base station signals the user equipment to not perform the modification transmission of the UL DMRS sequence in the user equipment, that is, Methods P-1, P-2, P-3 and Methods Q-1, Q-2, and Q-3 may be considered. As the signaling method, for example, it is possible to indicate through the UL grant, the common control channel or the common PDCCH. As shown in FIG. 19, in a case where the base station performs the scheduling for the UL transmission burst without a gap, the base station may configure the user equipment to use Methods P-1, P-2, and P-3 and Methods Q-1, Q-2, and Q-3 to solve the mismatch between the base station and the user equipment for the reference subframe. Further, as shown in FIG. 20, in a case where the base station schedules the UL transmission burst with a gap, the base station may signal the user equipment not to perform Methods P-1, P-2, and P-3 and Methods Q-1, Q-2, and Q-3 so as to reduce the number of blind detection times at the base station.

Embodiment 1—Channel Access for Uplink Multi-Carrier Transmission

When a plurality of LAA SCells are configured, the following channel access method is used as a method for a base station to access a channel for downlink multi-carrier transmission.

Multi-carrier channel access type A (i.e., Type-A): With regard to each set (i.e., carrier set) which is a combination of carriers through which the base station intends to perform transmissions on the LAA SCell, a single-carrier channel access procedure using cat-4 LBT may be independently performed for each carrier. Thereafter, according to the determination of the base station, a self-defer time that does not reduce the backoff counter is used in a specific carrier, so that a transmission time point is matched between multiple carriers.

Multi-carrier channel access type B (i.e., Type-B): Similar to the scheme used in Wi-Fi, one carrier (c_j) among the carriers intended to be transmitted by the base station is randomly selected or the carrier (c_j) is selected not to be changed at least for one second, and channel access using the cat-4 LBT is performed on the carrier (c_j). When channel access on the carrier (c_j) successful, channel sensing is performed by at least T_mc=25 us on other carriers (c_i) (i≠j) immediately before the transmission time of the carrier that succeeded in the channel access. In this case, the base station performs multi-carrier transmissions including other carriers when the channel is idle for the T_mc.

In a scheme for transmitting multiple carriers through a downlink, carriers through which the base station intends to transmit signals basically perform channel access by assuming a cat-4 LBT having a backoff. However, in the case of the channel access type B, the cat-4 LBT may be performed in the specific carrier determined by the base station and simultaneous transmission with the carrier in which the cat-4 LBT is performed may be performed on other carriers through the channel sensing of 25 us interval. If the cat-4 LBT fails in the specific carrier determined by the base station, transmission is not performed on all the multiple carriers regardless of the result of sensing in the other carriers.

However, in case of the uplink in which the user equipment performs transmission to the base station, the base station informs, through the UL grant, the user equipment of the LBT type that should be performed by the user equipment. The LBT type may be, for example, (i) the cat-4 LBT, i.e., the type 1 channel access, or (ii) the cat-2 LBT (e.g., LBT based on 25 us CCA only) that performs only channel sensing of a single interval, i.e., the type 2 channel access. Therefore, according to the LBT type indication of the base station, there may be a case where the LBT type in all carriers in which the user equipment performs uplink transmission (e.g., PUSCH) is not cat-4 LBT. That is, the cat-4 LBT may be indicated on some carriers and the cat-2 LBT may be indicated on another carrier among the carriers through which the base station intends that the user equipment to perform the transmission.

Hereinafter, a channel access method for a user equipment to transmit multiple carriers and an uplink transmission method therefor will be described. In this specification, transmitting a carrier means transmitting a signal (e.g., PUSCH) through or on the carrier. In addition, the carrier means a carrier (i.e., unlicensed carrier) (e.g., LAA SCell) operating in the unlicensed band unless otherwise specified.

Also, multi-carrier transmission in this specification refers to a signal transmission operation when multiple carriers are simultaneously scheduled on the LAA SCell(s). In actual signal transmission, according to the channel access method, signals may be transmitted only on some carriers constituting multiple carriers, and signal transmission on other some carriers may be dropped.

Figure 23:
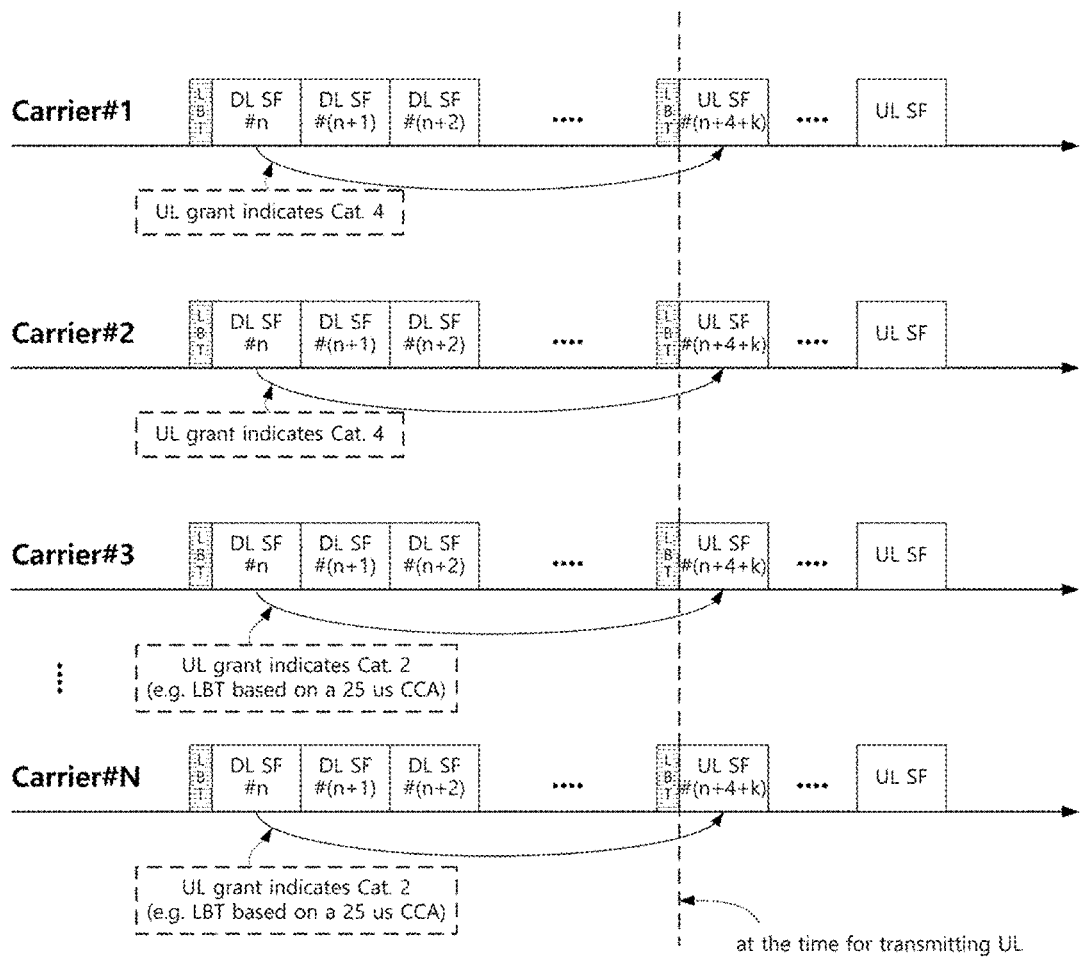
FIGS. 23 to 27 illustrate a UL multi-carrier transmission according to the present invention.

FIG. 23 illustrates that a user equipment performs UL transmissions on multiple carriers in the case where the base station independently indicates different UL LBT types to each carrier via the UL grant(s). It is assumed that a self-carrier scheduling is performed.

First, it can be considered to reuse the type B-scheme used for multi-carrier channel access in the downlink for an uplink multi-carrier access scheme. In this case, when the base station has a plurality of carriers indicating the cat-4 LBT through the UL grant to the user equipment, and there are a plurality of carriers in which the user equipment is indicated to perform the cat-4 LBT based on the UL grant received from the base station the user equipment needs to select one of the carriers for which cat-4 LBT is indicated. It is to apply the scheme in which the cat-4 LBT is performed on only one carrier and transmission on the remaining carriers are allowed only by the sensing of Tmc (e.g., 25 us) in the type-B scheme. The following method can be used as a method for selecting one of the carriers that the user equipment should perform cat-4 LBT.

First, through the base station signaling, the user equipment may select one of the carriers to perform the cat-4 LBT. In this regard, the base station may define the carrier in which the cat-4 LBT should be performed and assign (via a UL grant for the carrier) the carrier to the user equipment. However, in this case, if the user equipment misses the corresponding UL grant, the user equipment cannot perform a channel access for multi-carrier transmission. Therefore, the base station may designate the priority value of the carrier in which the cat-4 LBT should be performed and signal the value to the user equipment. Specifically, the base station may indicate the priority value of the corresponding carrier to the user equipment via the UL grant (hereinafter, referred to as cat-4 LBT UL grant) indicating (each) cat-4 LBT. Accordingly, the user equipment identifies the value indicated as the priority by the base station and performs the cat-4 LBT first on the carrier(s) having the highest priority. If the cat-4 LBT is successful, the user equipment senses for Tmc (e.g., 25 us) on other carriers immediately before the transmission and may perform UL transmission (e.g., PUSCH) on multiple carriers simultaneously when the channel is busy. Accordingly, even if the user equipment misses the UL grant for the carrier set to the highest priority by the base station, the user equipment may perform the cat-4 LBT for UL transmission according to the next higher priority value.

A method for selecting one of the carriers signaled that a cat-4 LBT should be performed by the user equipment according to a predefined rule between the base station and the user equipment is as follows.

1) A carrier with the smallest (carrier/cell) index among the carriers for which cat-4 LBT is indicated may be selected. That is, the user equipment performs cat-4 LBT only for the carrier having the smallest index among the carriers for which the cat-4 LBT UL grant is received. In addition, the user equipment may sense at least for Tmc on the remaining carrier(s) immediately before the transmission and perform UL transmission when the channel is idle. The present invention is also applicable to a case where the user equipment misses the UL grant by selecting a carrier based on the received UL grant of the user equipment. In this specification, the cat-x LBT UL grant refers to the UL grant indicating cat-x LBT (e.g., x=2, 4).

2) A carrier with the largest CWS (i.e., maximum CWS) among the carriers for which cat-4 LBT is indicated may be selected. That is, the user equipment performs cat-4 LBT only for the carrier having the largest CWS among the carriers for which the cat-4 LBT UL grant is received. In addition, the user equipment may sense at least for Tmc on the remaining carrier(s) immediately before the transmission and perform UL transmission when the channel is idle. Accordingly, coexistence with Wi-Fi may be guaranteed as much as possible. Further, the present invention is also applicable to a case where the user equipment misses the UL grant by selecting a carrier based on the received UL grant of the user equipment.

3) A carrier with the smallest CWS (i.e., minimum CWS) among the carriers for which cat-4 LBT is indicated may be selected. That is, the user equipment performs cat-4 LBT only for the carrier having the smallest CWS among the carriers for which the cat-4 LBT UL grant is received. In addition, the user equipment may sense at least for Tmc on the remaining carrier(s) immediately before the transmission and perform UL transmission when the channel is idle. Accordingly, it is possible to maximally guarantee the UL transmission on the LAA SCell which performs scheduling-based channel access unlike Wi-Fi while allowing coexistence with Wi-Fi. Further, the present invention is also applicable to a case where the user equipment misses the UL grant by selecting a carrier based on the received UL grant of the user equipment.

4) A carrier with the largest random backoff counter (i.e., maximum backoff counter) among the carriers for which cat-4 LBT is indicated may be selected. That is, the user equipment performs cat-4 LBT only for the carrier having the largest random backoff counter among the carriers for which the cat-4 LBT UL grant is received. In addition, the user equipment may sense at least for Tmc on the remaining carrier(s) immediately before the transmission and perform UL transmission when the channel is idle. Accordingly, coexistence with Wi-Fi may be guaranteed as much as possible. Further, the present invention is also applicable to a case where the user equipment misses the UL grant by selecting a carrier based on the received UL grant of the user equipment.

5) A carrier with the smallest random backoff counter (i.e., the minimum backoff counter) among the carriers for which cat-4 LBT is indicated may be selected. That is, the user equipment performs cat-4 LBT only for the carrier having the smallest random backoff counter among the carriers for which the cat-4 LBT UL grant is received. In addition, the user equipment may sense at least for Tmc on the remaining carrier(s) immediately before the transmission and perform UL transmission when the channel is idle. Accordingly, it is possible to maximally guarantee the UL transmission on the LAA SCell which performs scheduling-based channel access unlike Wi-Fi while allowing coexistence with Wi-Fi. Further, the present invention is also applicable to a case where the user equipment misses the UL grant by selecting a carrier based on the received UL grant of the user equipment.

Figure 24:
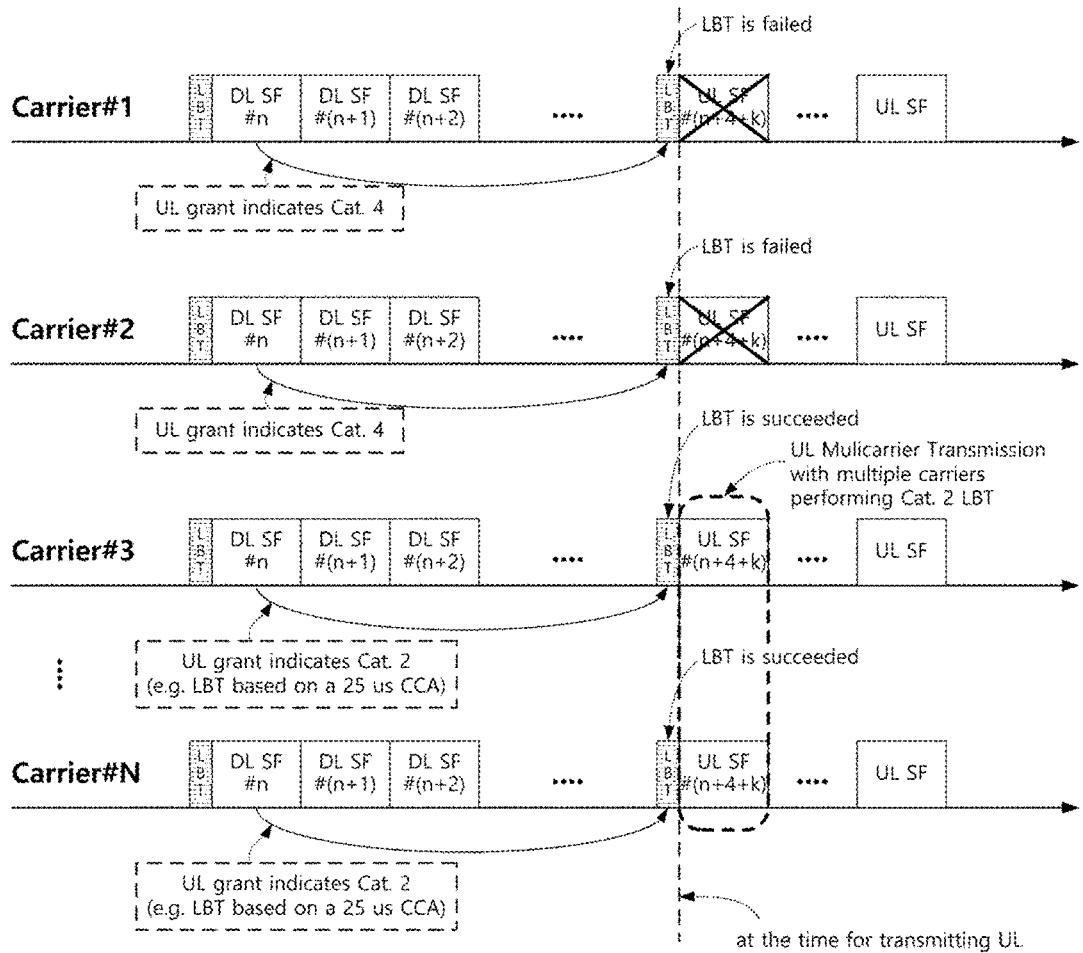

FIG. 24 illustrates an uplink multi-carrier transmission operation at the time of LBT failure in a cat-4 LBT carrier(s) when the base station separately indicates the different UL LBT types for each carrier via the UL grant(s). It is assumed that a self-carrier scheduling is performed.

Referring to FIG. 24, even when the UL LBT fails in the carrier(s) in which the cat-4 LBT is performed, it is possible to perform multi-carrier transmission only using carriers in which cat-2 LBT is performed when the UL LBT is successful in the carriers in which the cat-2 LBT is performed. In the case of the multi-carrier channel access type B in the downlink, if the cat-4 LBT fails in the specific carrier designated by the base station at the time of channel access of multiple carriers, the LBT is not performed in the other carrier(s). Further, even if the LBT in the other carrier(s) is performed in advance, multi-carrier transmission not including the carrier in which the cat-4 LBT is performed is not available regardless of the channel sensing result. However, in the uplink case, UL LBT type (or UL channel access type) of each carrier is indicated by the UL grant(s) transmitted from the base station. In this case, an LBT failure may occur depending on the interference condition or the channel condition in the carrier in which cat-4 LBT is performed as shown in FIGS. 23-24. However, in the case of the carrier for which cat-2 LBT is indicated to be performed from the base station, uplink transmission on the corresponding carrier may be possible according to whether the cat-2 LBT is successful. Therefore, irrespective of the success or failure of the cat-4 LBT, it is possible to perform uplink transmission by allowing channel access in the carrier for which cat-2 LBT is indicated, according to the success of the LBT. That is, channel access of the carrier(s) for which cat-4 LBT is indicated and channel access of the carrier(s) for which cat-2 LBT is indicated are independently managed. Thus, the success or failure of cat-4 LBT affects only the channel access/multi-carrier transmission of the carrier(s) for which cat-4 LBT is indicated, and does not affect the channel access/multi-carrier transmission of the carrier(s) for which cat-2 LBT is indicated. On the other hand, the success or failure of cat-2 LBT affects only the carrier on which the cat-2 LBT is actually performed, and does not affect other carriers.

Figure 25:
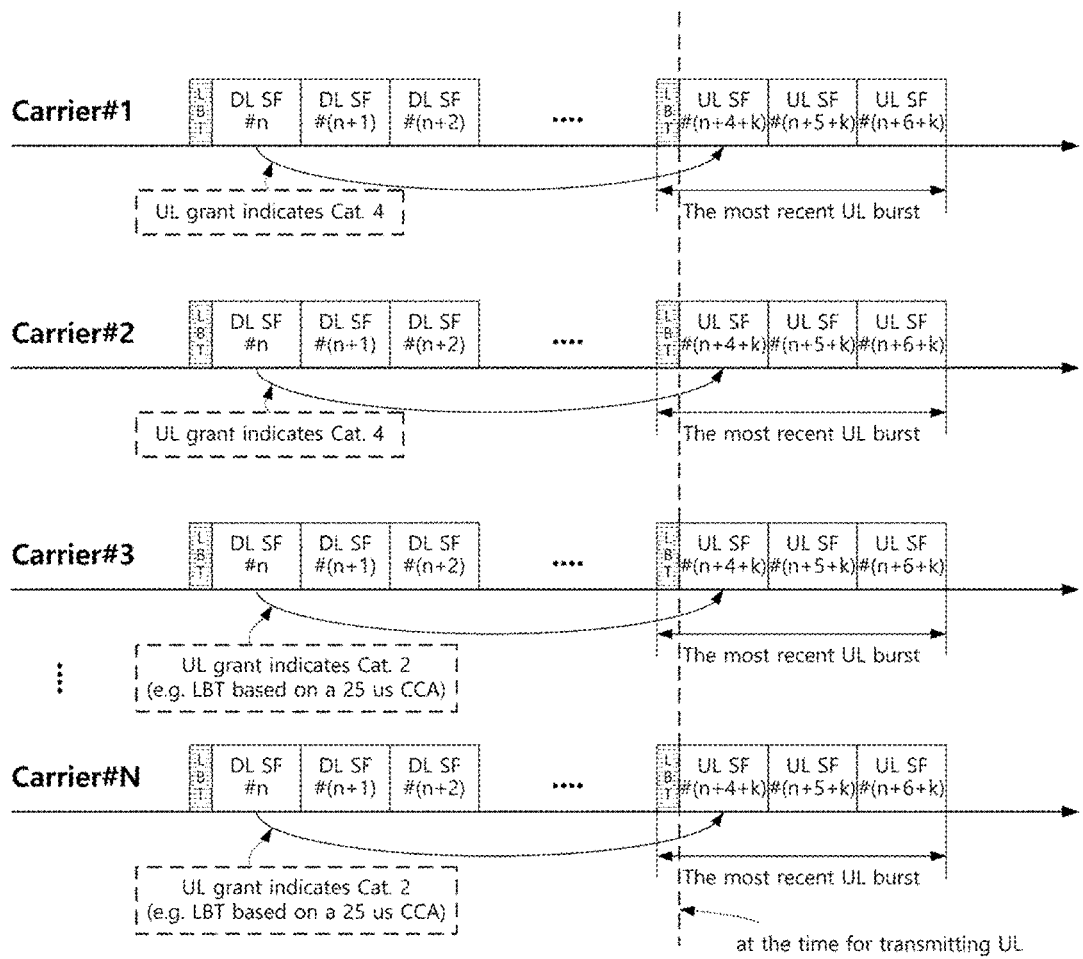
Figure 26:
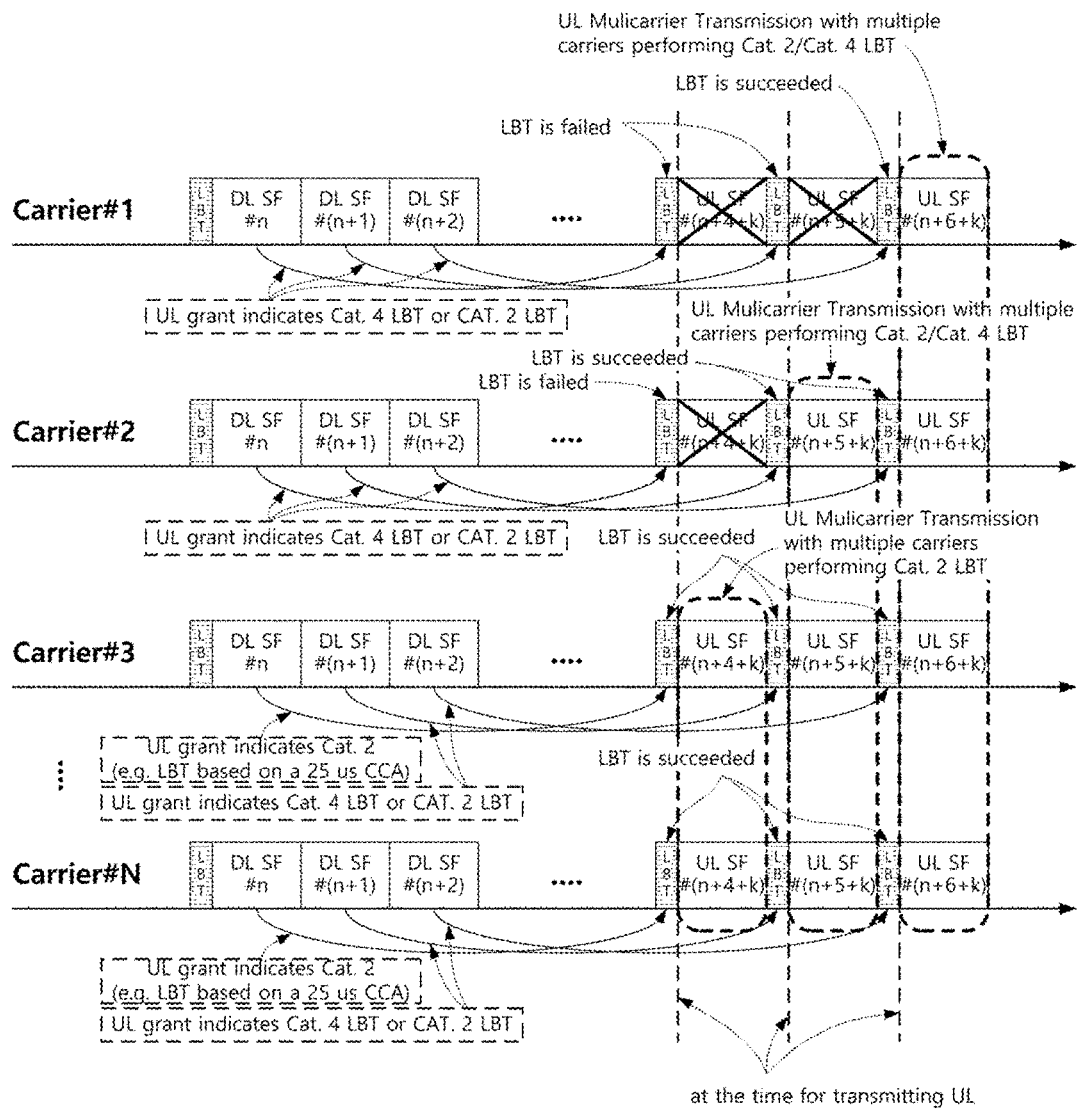

FIG. 24 illustrates a case where a single subframe is scheduled through one UL grant. However, even when a multi-subframe is scheduled through one UL grant as shown in FIG. 25, the UL channel access according to the present invention may be also applied in the same manner. Also, the UL channel access according to the present invention may be similarly applied to the case where multiple subframes are scheduled through UL grants transmitted from different downlink subframes as shown in FIG. 26. Also, the UL channel access according to the present invention may be similarly applied to the case where each UL scheduled subframe of the UL transmission burst is scheduled by the UL grant(s) of one DL subframe as in FIG. 27.

FIG. 25 illustrates that a user equipment performs UL transmission on multiple carriers in the case where the base station independently indicates different UL LBT types for each carrier for multiple subframes via UL grant(s). It is assumed that a self-carrier scheduling is performed.

FIG. 26 illustrates that a user equipment performs UL transmissions on multiple carriers in the case where the base station schedules multiple subframes through the UL grant(s). Specifically, FIG. 26 shows a case of indicating UL LBT type that may be the same or different for each carrier and different UL subframe, while transmitting UL grant(s) from different downlink subframes for each subframe of the multiple subframes. It is assumed that a self-carrier scheduling is performed.

Referring to FIG. 26, the number of multiple carriers that can be transmitted according to the UL transmission time and the success of the LBT performed before each subframe transmission time may be changed for each subframe. In the case of the cat-4 LBT being performed in the subframe of the carrier set to perform the cat-4 LBT, if the channel access type of the multi-carrier set to be executable by the user equipment is signaled as the type-B, the LBT in other carriers except the carrier in which cat-4 LBT is performed may perform sensing for Tmc=25 us (i.e., sensing the Tmc immediately before the LBT completion time in the carrier in which the cat-4 LBT is performed) to perform UL transmission in multiple carriers.

Figure 27:
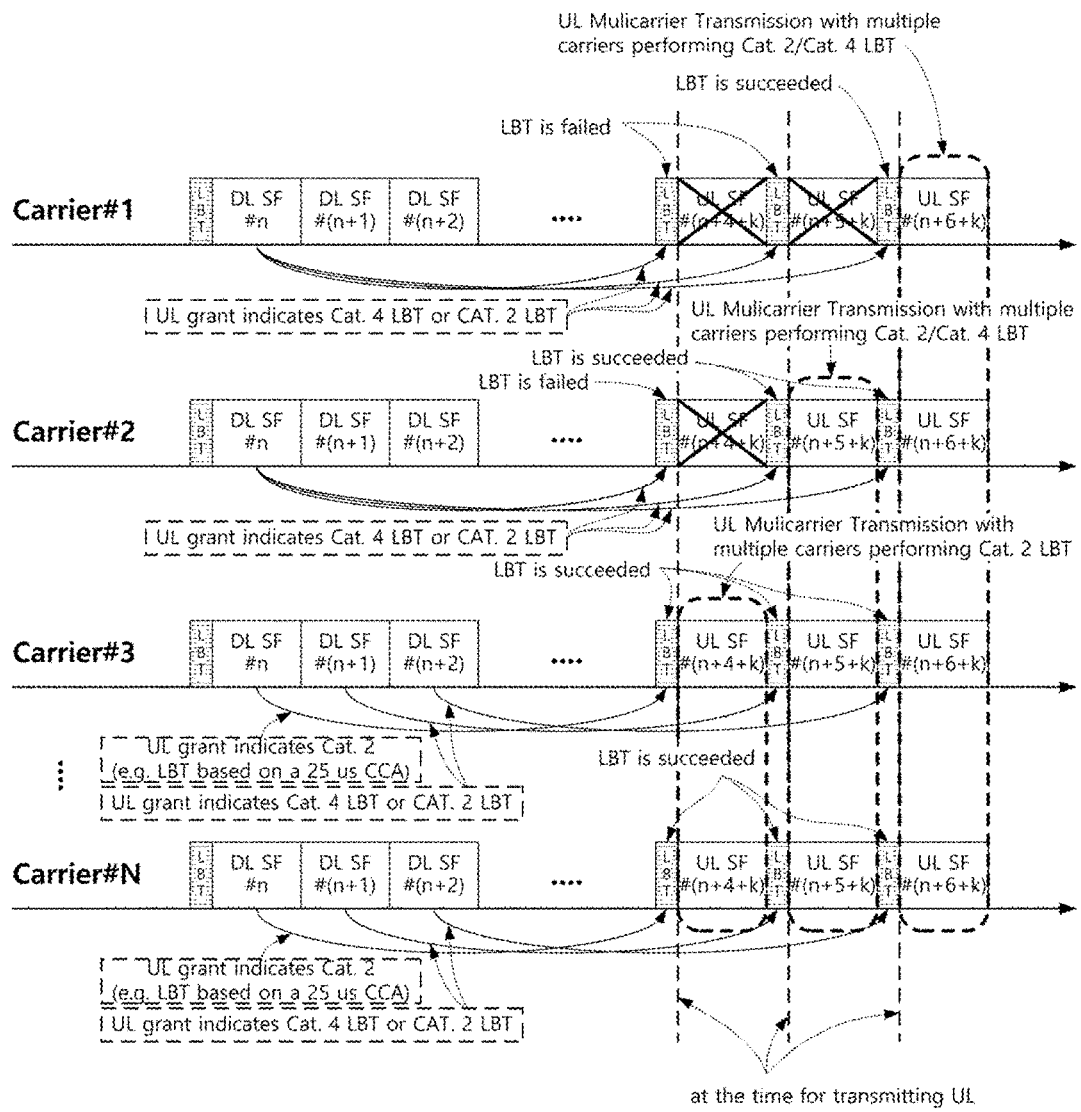

FIG. 27 illustrates that a user equipment performs UL transmissions on LAA Scell(s) on multiple carriers in the case where the base station schedules multiple subframes through the UL grant(s). Specifically, FIG. 27 shows a case of indicating UL LBT type that may be the same or different for each carrier and different UL subframe, while transmitting UL grant(s) from the same downlink subframes or different downlink subframes for each subframe of the multiple subframes. It is assumed that a self-carrier scheduling is performed.

Referring to FIG. 27, the embodiment is the same as that described in FIG. 26 except that multiple subframes are scheduled through one UL grant. That is, the number of multiple carriers that can be transmitted according to the UL transmission time and the success of the LBT performed before each subframe transmission time may be changed for each subframe. In the case of the cat-4 LBT being performed in the subframe of the carrier set to perform the cat-4 LBT, if the channel access type of the multi-carrier set to be executable by the user equipment is signaled as the type-B, the LBT in other carriers except the carrier in which cat-4 LBT is performed may perform sensing for Tmc=25 us (i.e., sensing the Tmc immediately before the LBT completion time in the carrier in which the cat-4 LBT is performed) to perform UL transmission in multiple carriers.

Since the user equipment performs UL transmission in units of subframes, the user equipment may perform UL transmission in the carriers in which the transmission is possible at each UL transmission time (e.g., a subframe) regardless of whether the scheduling indicated by the UL grant is a single subframe scheduling or a multi-subframe scheduling.

FIGS. 24 to 27 exemplifies a self-carrier scheduling, but the present invention may be applied similarly to the case where the UL grant indicating cat-4 LBT/cat-2 LBT is cross-carrier scheduled from PCell using licensed band or SCell or is cross-carrier scheduled from LAA SCell using unlicensed band. Accordingly, cat-4 LBT or cat-2 LBT may be indicated to the user equipment through self-carrier scheduling, or cat-4 LBT or cat-2 LBT may be indicated to the user equipment through cross-carrier scheduling. The UL scheduling method is set to one of self-carrier scheduling or cross-carrier scheduling for each carrier, and the present invention may be applied to a case where different scheduling methods are applied to each carrier.

Although an LBT gab for performing the LBT between consecutive subframes is not specified and described in FIGS. 25 to 27, the present invention can be applied to both cases that LBT gaps are present or not present between subframes.

Embodiment 2: CWS Adjustment for Uplink Multi-Carrier Transmission

As a channel access method for downlink multi-carrier transmission when a plurality of LAA Scell are configured, the type-A and the type-B explained in the first embodiment are present.

Type-A has two schemes as a CWS adjustment method. The first scheme (i.e., type A1) manages CWS in each carrier and extracts a BO counter independently for each carrier according to the scheme used in single carrier channel access. The second scheme (i.e., type A2) manages CWS in each carrier in the same manner as used for the single carrier channel access, but sets a common BO counter for multi-carrier transmission. The BO counter selected from the largest CWS (i.e., the maximum CWp) among the CWS of each carrier is set as the common BO counter.

Type-B also has two schemes as a CWS adjustment method. In the first scheme (i.e., type B1), a carrier set (hereinafter, referred to as a set C) for multi-carrier transmission has a single CWS (hereinafter, referred to as a CWS set C). Based on the HARQ-ACK feedback corresponding to the PDSCH transmission in the reference subframe transmitted in all the carriers of the set C, the CWS set C is increased if the HARQ-ACK values determined as NACK are at least 80% or more, and otherwise it is reset to the minimum value. The second scheme (i.e., type B2) manages CWS in each carrier according to the scheme used in the single carrier channel access, but the BO counter for the carrier ($c\_j$) performing cat-4 LBT for multi-carrier transmission using the multi-carrier type B scheme is set to a BO counter selected from the largest CWS (i.e., maximum CWp) among the CWS of each carrier. Cat-2 LBT (i.e., Tmc=25 us) occurs in the carrier ($c\_i$) ($i \neq j$) other than the carrier ($c\_j$) in the type-B method, but the DL transmission always regards cat-4 as the basic LBT. Therefore, even if cat-2 LBT is performed on the carrier ($c\_i$) in the case of managing the CWS in each carrier according to the type B2, the result of the DL transmission in the carrier is reflected in the corresponding CWS.

Meanwhile, unlike the conventional method, the following method can be considered as a CWS adjustment method in the downlink multi-carrier type-B transmission method. The base station performs cat-2 LBT (i.e., Tmc=25 us) in a carrier ($c\_i$) ($i \neq j$) other than the carrier ($c\_j$) set to perform cat-4 LBT. In this case, even if the base station always regards cat-4 as the basic LBT in the DL transmission, unlike the conventional type B2 scheme, it may not perform the CWS update that increases or resets the CWS according to the transmission from the base station with regard to the carriers not performing the cat-4 LBT. Therefore, when the CWS is managed in each carrier as in the type B2 of the type-B method and the cat-2 LBT is performed in the carrier ($c\_i$), the result of the DL transmission in the carrier can be prevented from being reflected in the corresponding CWS. That is, in case of managing the CWS for each carrier in the type-B method, the result of the DL transmission in the carrier in which cat-2 LBT is performed is not reflected in the CWS of the corresponding carrier. In this case, only the result of the DL transmission in the carrier in which cat-4 LBT is performed may be reflected in the CWS of the corresponding carrier. On the other hand, in case of uplink transmission, the base station informs, through the UL grant, the user equipment of the LBT type to be performed by user equipment when scheduling the PUSCH transmission. The LBT type may be, for example, (i) a Cat-4 LBT (or type 1 channel access), or (ii) a Cat-2 LBT (e.g., LBT based on 25 us CCA, or type 2 channel access) that only performs a sensing of a single interval. The user equipment performs LBT according to the indicated LBT type and transmits the PUSCH. Therefore, according to the LBT type indication of the base station, there may be a case where the LBT type in all carriers in which the user equipment performs uplink transmission (e.g., PUSCH) is not cat-4 LBT. That is, cat-4 LBT may be indicated for some carriers while cat-2 LBT is indicated for other carriers among the carriers that the base intends transmission to be performed by the user equipment. Therefore, in the channel access method for uplink multi-carrier transmission, a CWS adjustment method different from that of the downlink assuming only the cat-4 LBT is needed. Hereinafter, an uplink CWS adjustment method in the base station and the user equipment for UL transmission in case of UL transmission (e.g., PUSCH) on multiple carriers will be described.

Unlike the downlink multi-carrier transmission method, in the uplink transmission in which the user equipment performs transmission, cat-4 LBT or cat-2 LBT may be dynamically indicated to each carrier at a single subframe-level or a multi-subframe level through the UL grant. Therefore, the user equipment may be configured to manage a CWS for each carrier for uplink multi-carrier transmission. The user equipment may manage the CWS for each carrier regardless of whether the cat-4 LBT or the cat-2 LBT is performed for the PUSCH transmission on each carrier according to the LBT type indicated by the UL grant for each carrier. Therefore, the terminal is allowed to have a self-defer time, if necessary, for each carrier for PUSCH transmission on multiple carriers when the base station requests the user equipment to perform simultaneous transmission on multiple carriers or until the time point at which simultaneous transmission can start within the interval allowing the LBT if the simultaneous transmission on multiple carriers is requires at the terminal.

As a method for setting a carrier which is allowed to have a self-defer time, the multi-carrier transmission can be performed with having the self-defer time on all the carriers in which the multi-carrier transmission is intended, regardless of the LBT type (e.g., cat-2 LBT, cat-4). Therefore, when the channel sensing in the carrier performing cat-4 LBT ends after the channel sensing period in the carrier performing cat-2 LBT, a self-defer time may be set for the carrier performing cat-2 LBT so as to enable multi-carrier transmission.

As another method, the self-defer time may be set only in carriers for which cat-4 LBT is indicated, but if it is possible to transmit on all carriers at the time of transmission regardless of the cat-2 LBT/cat-4 LBT setting, the multi-carrier transmission can be performed. Since the LBT interval in the carrier indicated to perform cat-2 LBT is stochastically shorter than the LBT interval in the carrier indicated to perform cat-4 LBT, the multi-carrier transmission can be performed by setting the self-defer time only in the carriers indicated to perform cat-4 LBT.

As a yet another method, the self-defer time may be set only in carriers for which cat-4 LBT is indicated to perform the multi-carrier transmission consisting only of carriers carrying cat-4. Since the LBT interval in the carrier indicated to perform cat-2 LBT is stochastically shorter than the LBT interval in the carrier indicated to perform cat-4 LBT, the multi-carrier transmission can be performed by setting the self-defer time only in the carriers indicated to perform cat-4 LBT. In addition, when the channel of one or more carriers performing the cat-4 LBT is not idle, the multi-carrier transmission may be enabled at the transmission possible time of the carrier for which cat-2 LBT is indicated.

Meanwhile, as a method of adjusting CWS to perform cat-4 LBT in downlink multi-carrier transmission, a common random backoff (BO) counter can be selected from the CWS of the carrier having the largest CWS in the CWS set managed by each carrier to apply the corresponding BO counter to all the carriers in which multi-carrier transmission is intended. However, unlike the downlink in which the cat-4 LBT is always performed, since the cat-2 LBT or the cat-4 LBT can be performed for each carrier in the uplink, the CWS adjustment method for the carriers for which cat-2 LBT is indicated may be further considered.

First, when a method such as type-A2 for downlink multi-carrier transmission is applied to an uplink, an ambiguity may arise that whether the carrier set for selecting the maximum CWS includes a CWS individually managed in a carrier scheduled to perform cat-2 LBT. To solve the problem, the following two methods can be considered. The first method is to select the maximum CWS among CWSs of all carriers scheduled for UL transmission on multiple carriers and extract a common BO counter N therefrom. Since the cat-4 LBT/cat-2 LBT is dynamically set through the UL grant for each carrier and it is configured to manage the CWS for each carrier, even if an LBT type for a specific carrier is indicated as cat-2 LBT, a common backoff counter can be extracted considering the CWSs of all carriers in which the multi-carrier transmission is intended. The second method is to select the maximum CWS among the CWS of the carriers indicated to perform cat-4 LBT among the carriers scheduled for UL transmission on the multiple carriers and extract a common BO counter N therefrom. Even if the CWS is managed in each carrier, only CWSs of the carriers in which cat-4 LBT is performed at the current time may be considered. Accordingly, by excluding the possibility of unnecessarily performing more back-off when the CWS of carriers in which cat-2 LBT is performed is larger than the CWS of carriers in which cat-4 LBT is performed, it is possible to increase the possibility of acquiring the channel when the uplink multi-carrier transmission is needed.

As another method, when a method such as type-B2 for downlink multi-carrier transmission is applied to an uplink, an ambiguity may arise that whether the carrier set for selecting the maximum CWS includes a CWS individually managed in a carrier scheduled to perform cat-2 LBT. The following two methods can be considered. The first method is to select the maximum CWS among CWSs of all carriers scheduled for UL transmission on multiple carriers and extract a common BO counter N of the representative carrier for performing cat-4 LBT therefrom. Since the cat-4 LBT/cat-2 LBT is dynamically set through the UL grant for each carrier and it is configured to manage the CWS for each carrier, even if an LBT type for a specific carrier is indicated as cat-2 LBT, the BO counter of the representative carrier in which cat-4 LBT is performed can be extracted considering the CWSs of all carriers in which the multi-carrier transmission is intended. The second method is to select the maximum CWS among the CWS of the carriers indicated to perform cat-4 LBT among the carriers scheduled for UL transmission on the multiple carriers and extract a common BO counter N of the representative carrier for performing cat-4 LBT therefrom. Even if the CWS is managed in each carrier, only CWSs of the carriers in which cat-4 LBT is performed at the current time may be considered. Accordingly, by excluding the possibility of unnecessarily performing more back-off when the CWS of carriers in which cat-2 LBT is performed is larger than the CWS of carriers in which cat-4 LBT is performed, it is possible to increase the possibility of acquiring the channel when the uplink multi-carrier transmission is needed.

In the case of that the type-B scheme used for the downlink is applied to the uplink multi-carrier transmission (i.e., cat-4 LBT is applied only for the representative carrier, and even if cat-4 LBT or cat-2 LBT is signaled, via the UL grant, to other carriers except the representative carrier among the carriers in which the multi-carrier transmission is intended, the user equipment performs a channel sensing through a T_mc (e.g., 25 us) CCA before the transmission time of the carrier on which the representative carrier has successfully performed channel access), when determining the CWS for the next UL transmission, a solution for to whether the CWS should be adjusted by considering/reflecting the previous UL transmission (e.g., UL transmission in which cat-4 LBT or cat-2 LBT is signaled) on the corresponding carrier. The process of adjusting the CWS can be referred to FIG. 18 and the description thereof.

As a method, when the user equipment performs uplink multi-carrier transmission, regardless of which LBT type is signaled from the base station or which LBT type is performed for each carrier, the user equipment may perform CWS adjustment for the next UL transmission of each carrier by determining ACK, NACK or DTX based on the detection by the base station for the UL transmission of the corresponding carrier. When a single CWS is managed for multiple carriers, CWS adjustment may be performed by determining ACK, NACK or DTX for UL transmission in a reference subframe for all carriers in which UL transmission is performed. A method for the user equipment to determine ACK, NACK or DTX for the corresponding UL transmission and to adjust the CWS may be determined based on the value of the NDI transmitted by the UL grant as described in FIG. 18.

As another method, the user equipment may perform CWS adjustment for the next UL transmission by determining ACK, NACK or DTX based on the detection by the base station for the UL transmission of the corresponding carrier only for the UL transmission of the carrier in which cat-4 LBT is signaled as an LBT type of the user equipment. A method for the user equipment to determine ACK, NACK or DTX for the corresponding UL transmission and to adjust the CWS may be determined based on the value of the NDI transmitted by the UL grant as described in FIG. 18. Since the carrier configured to perform cat-4 LBT is set by the base station with expecting the CWS adjustment of the user equipment, the user equipment may perform CWS adjustment even if it has performed channel sensing of Tmc=25 us by the type-B and has participated in the multi-carrier transmission. Thus, for the UL transmission of each carrier, the user equipment may perform CWS adjustment based on the signaled LBT type regardless of the LBT type actually performed. That is, the user equipment may perform CWS adjustment by determining ACK, NACK or DTX for UL transmission in the reference subframe of the carrier for which cat-4 LBT is signaled. A method for the user equipment to determine ACK, NACK or DTX for the corresponding UL transmission and to adjust the CWS may be determined based on the value of the NDI transmitted by the UL grant as described in FIG. 18.

As a yet another method, the user equipment may perform CWS adjustment for the next UL transmission by determining ACK, NACK or DTX based on the detection by the base station for the UL transmission of the corresponding carrier only for the UL transmission of the carrier in which cat-4 LBT is signaled as an LBT type of the user equipment and in which the cat-4 LBT is performed. A method for the user equipment to determine ACK, NACK or DTX for the corresponding UL transmission and to adjust the CWS may be determined based on the value of the NDI transmitted by the UL grant as described in FIG. 18. Considering that the CWS adjustment does not refer to the carriers in which cat-2 LBT is performed in a single-carrier transmission, it may be difficult to obtain a channel for transmission of the multiple carriers according to the CWS adjustment method compared to user equipments transmitting LAA UL without multi-carrier transmission. Therefore, the CWS adjustment may be configured not to be performed for a UL transmission of a carrier in which cat-4 LBT has not been actually performed even if it has participated in the multi-carrier transmission.

Next, the operation of the user equipment after an LBT of the preceding subframe has failed when a multi-subframe scheduling is performed in a single carrier will be described.

If there is an LBT gap or a CCA gap for performing LBT between consecutive subframes scheduled for multi-subframes, When the LBT type is designated as cat-4 LBT in the UL grant for multi-subframe scheduling, or when the LBT type is designated as cat-4 LBT in the UL grant scheduling each subframe in the multi-subframe, if the LBT of the preceding subframe has failed, it is configured that a new BO counter for transmission to the later UL subframe is obtained, and follow the uplink channel access procedure.

When the LBT type is designated as cat-4 LBT in the UL grant for multi-subframe scheduling, or when the LBT type is designated as cat-4 LBT in the UL grant scheduling each subframe in the multi-subframe, if the LBT of the preceding subframe has failed, it is configured that the preceding BO counter resumes and to follow the uplink channel access procedure.

If there is no LBT gap or CCA gap for performing LBT between consecutive subframes scheduled for multi-subframes, When the LBT type is designated as cat-4 LBT in the UL grant for multi-subframe scheduling, or when the LBT type is designated as cat-4 LBT in the UL grant scheduling each subframe in the multi-subframe, it is configured that BO counter after the failure of the LBT of the preceding subframe resumes and to follow the uplink channel access procedure.

Next, the operation of the user equipment after an LBT of the preceding subframe has failed when a multi-subframe scheduling is performed on multiple carriers will be described. If the multi-subframe scheduling is scheduled to have no gap between subframes in at least one carrier, uplink transmission may not always be possible in other carriers that have failed LBT due to the consecutive transmission in that carrier. In order to solve this problem, when the user equipment is scheduled for multiple carriers and is subjected to multi-subframe scheduling so that there is no gap between subframes for a specific carrier, the user equipment may be configured to give an arbitrary gap within the multi-subframe of the corresponding carrier. Accordingly, the other carrier in which the preceding LBT has failed and the carrier(s) succeeding in the current LBT can simultaneously perform multi-carrier transmission.

Embodiment 3—Channel Access for Uplink Multi-Subframe Transmission

Some subframes of consecutive subframe(s) may be dropped by the user equipment for some reason when the transmission of consecutive subframe(s) on the LAA SCell is scheduled. Here, dropping a subframe means that UL transmission (e.g., PUSCH) is stopped/dropped in a subframe. That is, the UL transmission in the consecutive subframe(s) can be suspended/stopped before completed. For example, if the user equipment is in a power limitation case, the UL transmission may be dropped in some subframes according to power scaling rules. Thereby, unlike intention of the base station, UL transmission may be performed in non-consecutive subframe(s).

Hereinafter, a channel access procedure when a UL transmission in non-consecutive subframe(s) is performed due to dropping of some subframes while transmission of consecutive subframe(s) is scheduled will be described. For the sake of understanding, the present invention exemplifies a power limitation case of a user equipment as a case where a subframe is dropped. However, the present invention can be applied, without limitation, to the channel access procedure in the case where consecutive subframe(s) are scheduled but a UL transmission is performed in non-consecutive subframe(s).

For reference, in accordance with section 5.1.1.1 of 3GPP TS 36.213 v13.2.0, the following rules are used in the power scaling operation of the user equipment in the power limitation scenario of the user equipment: if the secondary cell group (SCG) is not configured and the total transmission power exceeds the power allowable limitation value of the user equipment, the user equipment allocates the transmission power by prioritizing the transmission of the PUCCH or by prioritizing the transmission of the PUSCH including the UCI, and equally distributes the remaining transmission power to the PUSCH transmitted on the remaining scheduled carriers. The transmission power of the user equipment is determined as a subframe-by-subframe.

In the case of the LAA SCell, the base station may allocate consecutive subframes (hereinafter, referred to as UL burst) to the user equipment, and the user equipment performs one of cat-4 LBT and cat-2 LBT according to the LBT type signaled immediately before the transmission of the UL burst, and transmit the corresponding UL burst when the LBT is successful. Here, if the UL burst is scheduled without a gap between subframes, and the LBT succeeds at the start of the UL transmission burst, transmission of the UL transmission burst may be performed without additional LBT. However, when the user equipment is in a power limitation state, a specific subframe of the LAA SCell may be dropped due to the UL transmission of the licensed cell according to the power scaling operation. For this reason, a gap may occur in the UL burst.

Figure 28:
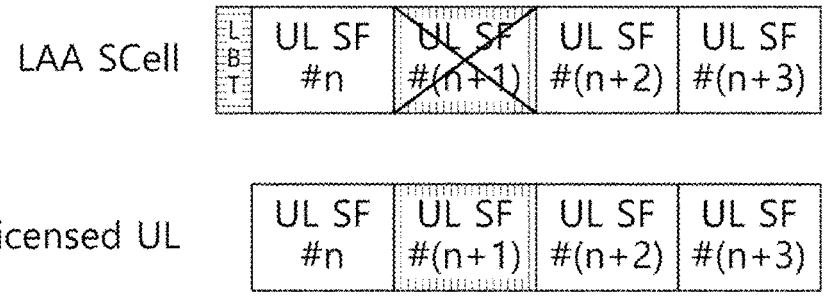
FIGS. 28 to 29 are diagrams for explaining a method of resuming transmission when some transmissions are dropped during multi-subframe transmission.

FIG. 28 illustrates a case where one subframe is dropped on the LAA SCell.

Referring to FIG. 28, four consecutive UL subframes are scheduled on the LAA SCell. However, in the power limitation state of the user equipment, priority is given to the power of the UL SF #(n+1) of the licensed cell, the UL subframe in the UL SF #(n+1) of the LAA SCell may be dropped. In this case, a user equipment may intend to perform data transmission on contiguous UL subframes after the success of the UL LBT on the LAA SCell. However, there may be an ambiguity on whether to perform transmissions on the UL #(n+2) and UL SF #(n+3) without LBT, an ambiguity on which LBT type should be performed, and an ambiguity on which LBT parameters should be used if cat-4 LBT is to be performed. Therefore, the present invention provides a solution for the case as below.

First, a case where the cat-2 LBT is configured to be performed at the start of the UL transmission burst for the UL transmission on the LAA Scell will be described.

If only the 25 us LBT is performed immediately before the SF #(n+2) transmission on the LAA SCell and the LBT is successful (i.e., if the channel is continuously idle or if the channel is continuously idle and the 25 us LBT succeeds), UL data transmission can be performed in UL SF #(n+2) and UL SF #(n+3). If the 25 us LBT fails, the following two methods can be considered.

As a first method, if the 25 us LBT is continuously performed and the LBT succeeds, transmission can be performed in UL SF #(n+3). In this case, if the 25 us LBT succeeds in the UL SF #(n+2), the UL transmission is started after the LBT success time but the CP of the next symbol that is, SF #(n+3) may be extended in order to occupy a portion of the UL SF #(n+2) after the LBT success.

As a second method, in order to transmit UL data in UL SF #(n+3), cat-4 LBT may be performed from UL SF #(n+2). In this case, the cat-4 LBT may be performed by setting the LBT parameter based on the LBT priority class 1 having the highest priority among the priority class.

As another method, the base station may designate an LBT priority class together with an LBT type indication via a UL grant, and the user equipment may perform cat-4 LBT by setting an LBT parameter based on the designated LBT priority class. However, since the UL transmission burst is configured to perform cat-2 LBT when receiving initial signaling from the base station, even if the cat-4 LBT is performed for transmission of the remaining subframes, the corresponding cat-4 LBT may not be reflected in the CWS adjustment. Alternatively, the cat-4 LBT in the SF #(n+2) performed by the user equipment may be applied/reflected in the CWS adjustment when the cat-4 LBT UL scheduling is received after the next 4 ms (e.g., SF #(n+2) is set as a reference subframe).

Next, a case where the cat-4 LBT is configured to be performed at the start of the UL transmission burst for the UL transmission on the LAA Scell will be described.

As an embodiment, if cat-4 LBT is completed before the SF #(n+2) transmission on LAA SCell by setting cat-4 LBT to be performed from SF #(n+1) on LAA SCell, the UL data transmission scheduled in the UL SF #(n+2) and the UL SF #(n+3) may be performed. If the cat-4 LBT is not completed before the SF #(n+2) transmission on the LAA SCell, the cat-4 LBT may continue until the SF #(n+3) transmission on the LAA SCell. The Random backoff counter being used for cat-4 LBT may be continuously used.

As another embodiment, if only the 25 us LBT is performed immediately before the SF #(n+2) transmission on the LAA SCell and the cat-2 LBT is successful (i.e., if the channel is continuously idle or if the channel is continuously idle and the 25 us LBT succeeds), UL data transmission can be performed in UL SF #(n+2) and UL SF #(n+3). Here, if the 25 us LBT fails, the following two methods can be considered.

As a first method, if the 25 us LBT is continuously performed and the LBT succeeds, transmission can be performed in UL SF #(n+3). In this case, if the 25 us LBT succeeds in the UL SF #(n+2), the UL transmission starts after the LBT success time but the CP of the next symbol that is, SF #(n+3) may be extended in order to occupy a portion of the UL SF #(n+2) after the LBT success.

As a second method, in order to transmit UL data in UL SF #(n+3), cat-4 LBT may be performed from UL SF #(n+2). In this case, the cat-4 LBT may be performed by setting the LBT parameter based on the LBT priority class 1 having the highest priority among the priority class.

As another method, the base station may designate an LBT priority class together with an LBT type indication via a UL grant, and the user equipment may perform cat-4 LBT by setting an LBT parameter based on the designated LBT priority class. In this regard, since the UL transmission burst is configured to perform cat-4 LBT when the initial signaling is received from the base station, even if the cat-4 LBT is performed for transmission of the remaining subframes, the corresponding cat-4 LBT may not be reflected in the CWS adjustment. In this regard, since the UL transmission burst is configured to perform cat-4 LBT when receiving initial signaling from the base station, the CWS adjustment may be performed by regarding the transmission start time (e.g., UL SF #n in FIG. 28) of the UL transmission burst as a reference subframe. Also, each UL transmission burst can be regarded as a different UL burst from the viewpoint that a single UL transmission burst is split and different cat-4 LBTs are performed. Accordingly, the cat-4 LBT in the SF #(n+2) or SF #(n+3) performed by the user equipment may be applied/reflected in the CWS adjustment when the cat-4 LBT UL scheduling is received after the next 4 ms (e.g., SF #(n+2) or SF #(n+3) is set as a reference subframe).

Alternatively, the following operation may be considered, regardless of whether it is configured to perform cat-4 LBT or cat-2 LBT at the beginning of the UL transmission burst for UL transmission on the LAA SCell. Specifically, if a specific subframe is not transmitted (i.e., the UL transmission is stopped) in consecutive UL subframe scheduling of a specific LAA SCell (e.g., due to a power limitation case between a licensed carrier and a LAA SCell), then a contiguous 25 us LBT may be performed (from the time point when the UL transmission is stopped) for a transmission of the later UL subframe, and transmit the later UL subframe (e.g., UL SF #(n+2) in FIG. 28) if the channel is idle. In addition, when the channel is not idle at the time of performing the contiguous 25 us LBT (from the time point when the UL transmission is stopped), the user equipment may perform cat-4 LBT, and transmit the later subframe (e.g., UL SF #(n+2) in FIG. 28) if the LBT succeeds. Here, the LBT parameter used in the cat-4 LBT may be configured in consideration of the LBT priority class indicated by the UL grant. Also, the UL grant refers to a UL grant that schedules the UL subframe being transmitted. Depending on the scheduling scheme, the UL grant may be a UL grant scheduling a multi-subframe, or may be a UL grant that individually schedules each subframe in a multi-subframe.

Here, performing the contiguous 25 us LBT is to check if the channel is continuously idle. Considering that the LBT should be performed at the time of UL transmission, the above method can be generalized as follows.

If a specific subframe is not transmitted in the contiguous UL subframe scheduling of the LAA SCell (i.e., the UL transmission is stopped/suspended during a consecutive UL subframe transmission), If the channel is continuously idle starting from the time point when the UL transmission is stopped (until the LBT point for the UL subframe), the user equipment may perform 25 us LBT (i.e., cat-2 LBT) for transmission of the later subframe (i.e., the remaining UL subframe), If the channel is not continuously idle starting from the time point when the UL transmission is stopped (until the LBT point for the UL subframe), the user equipment may perform cat-4 LBT for transmission of the later subframe (i.e., the remaining UL subframe). The cat-4 LBT may be performed considering the LBT priority class indicated in the UL grant.

If the LBT succeeds according to the above procedure, the user equipment can resume transmission of the later UL subframe (i.e., the remaining UL subframe). On the other hand, if the LBT fails, since the channel is not idle, the user equipment may additionally perform cat-4 LBT for transmission of the later UL subframe (e.g., UL SF #(n+3) in FIG. 28).

On the other hand, in the case of multi-carrier transmission with multiple LAA SCells, for UL transmission, (UL multi-carrier (MC) LBT type 1) an independent LBT is performed to transmit the UL subframe for each LAA SCell corresponding to the LAA SCell, and the UL transmission is performed through an LAA SCell carrier that succeeds the LBT, or (UL MC LBT type 2) cat-4 LBT is performed on a specific carrier (hereinafter, referred to as a designated carrier) with regard to subframes in which cat-4 LBT is performed among one or more LAA SCell carriers, and the UL multi-carrier transmission through multiple carriers is performed when the channel is detected to be idle by performing 25 us LBT immediately before the transmission on other carriers for the subframe transmission. One carrier uniformly randomly selected from the carriers scheduled to perform cat-4 LBT is used as the designated carrier.

The UL MC LBT type 2 may be performed within a specific carrier set. For example, if UL grants are received in a carrier set that has the same start time in a subframe and is scheduled with a cat-4 LBT, the user equipment may perform 25 us LBT immediately before transmission on another carrier in a carrier set if the cat-4 LBT in the specified carrier in the carrier set has been successfully completed. The corresponding carrier set may be set in consideration of regulation of each country. For example, in Europe, a part/whole carrier of a corresponding channel bonding may be set as one carrier set considering channelization at 5 GHz. Further, a UL subframe in which cat-2 LBT UL grant is configured may be transmitted by independently performing 25 us LBT without participating in the MC LBT in the corresponding carrier set. In addition, even if the cat-4 LBT of the designated carrier among subframes for which cat-4 LBT is configured fails, the UL transmission of the carrier that has received the UL grant with cat-2 LBT may be performed independently.

In addition, when transmitting through a plurality of LAA SCell carriers, the MCOT which is set in a specific carrier may be shared by a plurality of carriers as follows. Further, the corresponding MCOT may be configured to start from channel occupancy in a carrier performing cat-4 LBT.

A base station that initiates a DL transmission based on a type B multi-carrier LBT that obtains an MCOT may share channel occupancy with a user equipment on all carriers that have completed the type B LBT.

The channel occupancy may be started using DL transmission after the carrier performing cat-4 LBT completes the cat-4 LBT, On the other hand, when it is configured to perform cat-4 LBT as the LBT type at the start time of the UL transmission burst for UL transmission on the LAA SCell, the following two methods may be considered.

As a method, if cat-4 LBT is completed before the SF #(n+2) transmission on LAA SCell by setting cat-4 LBT to be performed from SF #(n+1) on LAA SCell, the UL data transmission scheduled in the UL SF #(n+2) and the UL SF #(n+3) may be performed. If the cat-4 LBT is not completed before the SF #(n+2) transmission on the LAA SCell, the cat-4 LBT may be performed until the SF #(n+3) transmission on the LAA SCell.

As another method, if only the 25 us LBT is performed immediately before the SF #(n+2) transmission on the LAA SCell and the cat-2 LBT is successful, UL data transmission can be performed in UL SF #(n+2) and UL SF #(n+3). Here, if the 25 us LBT fails, the following two methods can be considered.

As a first method, if the 25 us LBT is continuously performed and the LBT succeeds, transmission can be performed in UL SF #(n+3). In this case, if the 25 us LBT succeeds in the UL SF #(n+2), the UL transmission is configured to start after the LBT success time but the CP of the next symbol that is, SF #(n+3) may be extended in order to occupy a portion of the UL SF #(n+2) after the LBT success.

Figure 29:
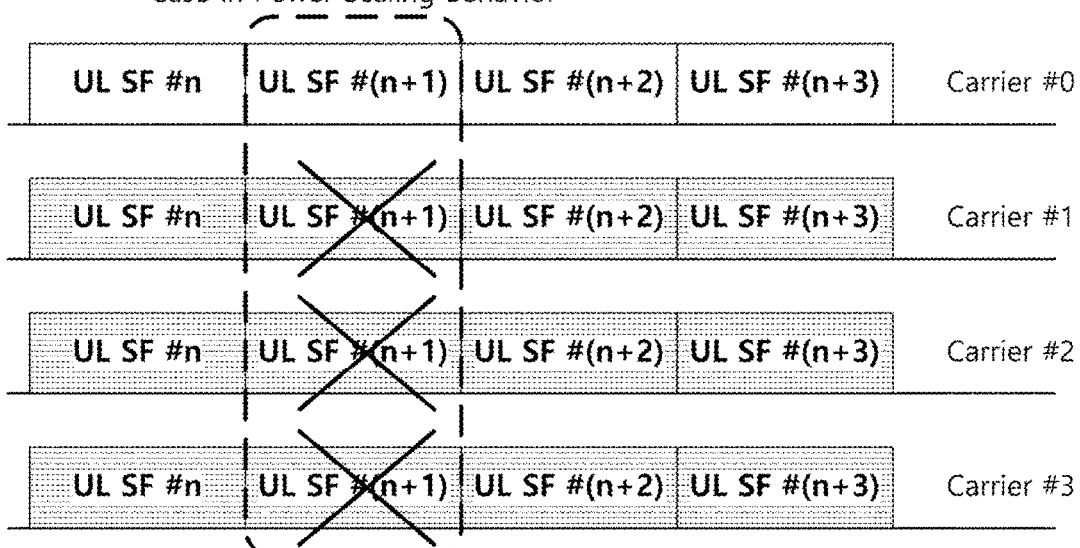

In a process of (consecutive) UL subframe transmissions in LAA SCell carriers to be transmitted by multiple carriers, it may be impossible to transmit a specific subframe along with implementing a power scaling operation in a power limitation state for transmission of a licensed carrier. When a transmission of a subframe (e.g., UL SF #(n+1)) of a plurality of LAA SCell carriers becomes impossible due to transmission of the licensed carrier as shown in FIG. 29, it is necessary to perform additional LBT as described above for a transmission of the later subframe (e.g., UL SF #(n+2)) of the LAA SCell carrier. However, there are a variety of LBT procedures for the multi-carrier transmission (e.g., UL MC LBT type 1 or UL MC LBT type 2), and the LBT procedure for UL subframe transmission should be determined after the subframe in which transmission is dropped according to each MC LBT procedure.

In the case of performing independent UL LBT (e.g., UL MC LBT type 1) for each LAA SCell carrier, the later UL subframe transmission may be performed through an additional LBT in a UL subframe in which transmission is dropped as follows.

As in the UL MC LBT type 1, an LAA SCell LBT (e.g., cat-4 or 25 us LBT) may be implemented independently for each carrier. In this case, if the UL transmission is not performed in the UL SF #(n+1) for each LAA SCell carrier, the 25 us LBT may be performed for the UL SF #(n+2) transmission, and the UL transmission may be performed in a carrier in which the channel is idle. In a carrier in which the channel is not idle, an additional cat-4 LBT may be performed (in this case, consider the LBT priority class defined in the UL grant or select the priority class described above), and the UL transmission is possible in the later UL subframe if the channel is idle.

Even if the LAA SCell LBT is implemented independently for each carrier as in the UL MC LBT type 1, if a subframe to be dropped occurs as in the UL SF #(n+1), 25 us LBT may be performed independently for each carrier. In this regard, if a carrier in which the channel is not idle occurs, a specific carrier may be selected and cat-4 LBT may be performed on the selected carrier. Further, only 25 us LBT may be performed on other carriers (including the remaining carrier in which the channel is not idle), and whether to perform the later UL subframe transmission may be determined for each carrier.

In the subframe configured to perform 25 us LBT through UL grant according to the above described process, by performing only the 25 us LBT without the cat-4 LBT procedure, the UL transmission may be performed in the later subframe (e.g., UL SF #(n+2)) after the subframe in which the transmission is dropped. Further, when the cat-4 LBT is only performed on a specific carrier and the 25 us LBT is performed on other carriers, it is also possible to participate in the simultaneous transmission on the subframe for which 25 us LBT is configured through the UL grant.

In the case of a UL multi-carrier transmission scheme, such as UL MC LBT type 2, where cat-4 LBT is performed based on a specific designated carrier in an LAA SCell and 25 us LBT is performed on other carriers in which cat-4 LBT UL grant is received for subframe transmission, the following method can be considered as an additional LBT scheme for UL subframe transmission after the UL subframe (e.g., UL SF #(n+1)) in which transmission is dropped.

In the case of the UL subframe in which cat-4 LBT UL grant is received as in the UL MC LBT type 2, if a UL subframe in which a transmission is dropped occurs before completed occurs, 25 us LBT is performed for each carrier for the later UL subframe transmission and the later UL subframe transmission is possible in the carrier in which the channel is idle. For carriers in which the channel is not idle, an additional cat-4 LBT is performed, and UL subframe transmission is possible if the channel is idle.

In the case of the UL subframe in which cat-4 LBT UL grant is received as in the UL MC LBT type 2, if a UL subframe in which a transmission is dropped occurs before completed occurs, a designated carrier may be additionally set (or the previous defined designated carrier may be reused) for the later UL subframe transmission. Then, an LBT similar to UL MC LBT type 2 is performed by performing 25 us LBT on other carriers and cat-4 LBT on the designated carrier, and then whether to perform the transmission may be determined for each carrier in the later UL subframe after the UL subframe in which the transmission is dropped. In this regard, 25 us LBT may be performed before setting the designated carrier for the cat-4 LBT, and adding the designated carrier may be performed on a carrier in which the channel is not idle at that time.

In the case of the UL subframe in which cat-4 LBT UL grant is received as in the UL MC LBT type 2, if a UL subframe in which a transmission is dropped occurs before completed occurs, only 25 us LBT may be performed for the later UL subframe transmission. That is, it is also possible to transmit the later UL subframe only on the carrier in which the channel is idle for 25 us, and perform the transmission only checking 25 us immediately before the UL subframe (e.g., UL SF #(n+2)) transmission which is immediately followed.

When performing the additional cat-4 LBT or 25 us LBT as described above, it can be performed on the carrier for which cat-4 LBT is assigned through UL grant. Meanwhile, in case of UL subframe for which 25 us LBT is configured through UL grant, if additional LBT is performed due to transmission drop, the later UL subframe transmission may be performed considering the success of independent 25 us LBT. However, in order to perform the simultaneous MC transmission by the user equipment, an operation similar with that in the subframe in which cat-4 LBT UL grant is configured by participating in an additional cat-4 LBT or 25 us LBT.

For the UL subframe transmission after the subframe in which a transmission is dropped, in case of the carrier transmission in which 25 us LBT (including cat-4 LBT) succeeded for the additional LBT scheme proposed above, it is possible to transmit a signal for channel reservation by expanding the CP by copying the signal transmitted from the OFDM symbol with the CP extension.

Figure 30:
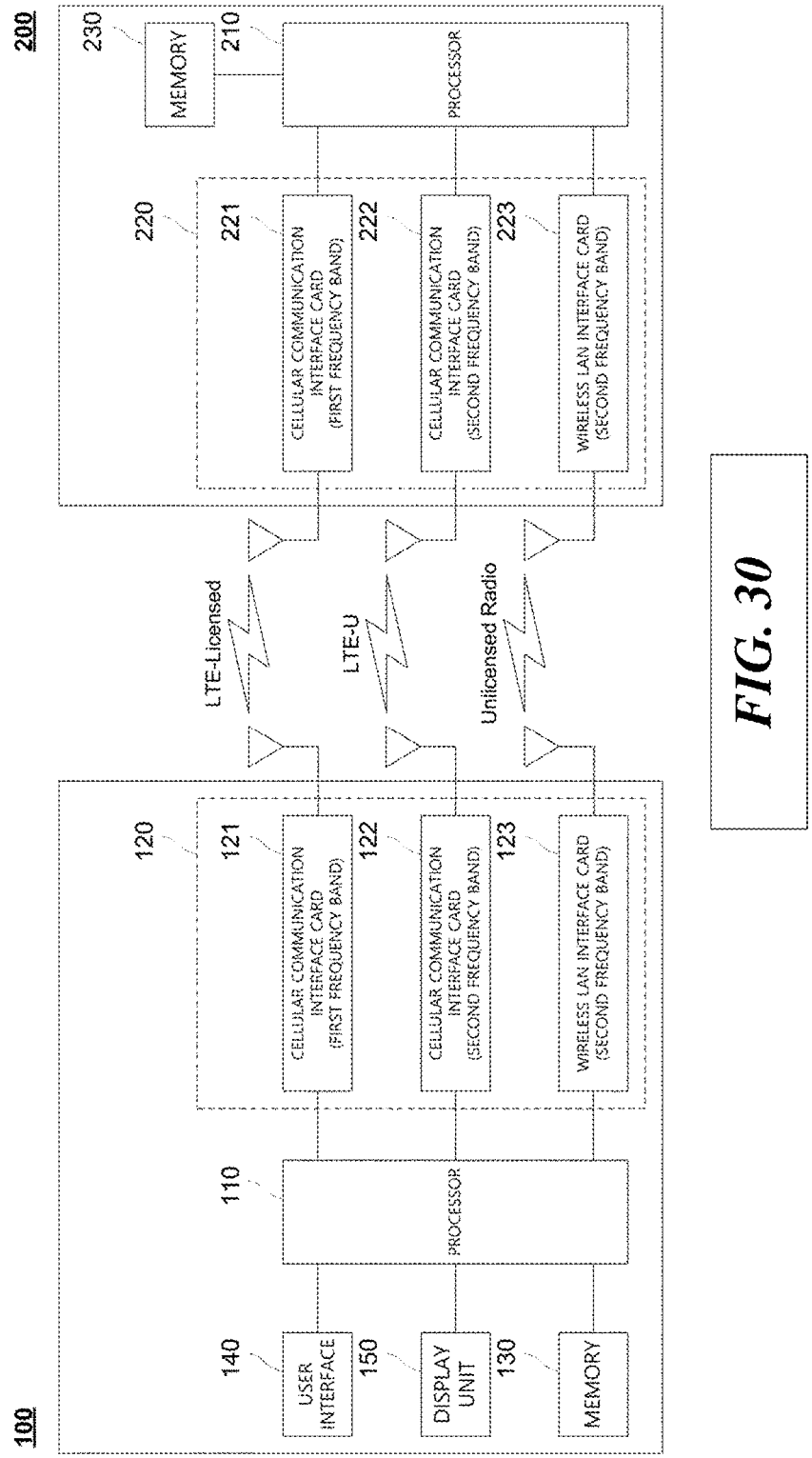
FIG. 30 illustrates configurations of a user equipment and a base station according to an exemplary embodiment of the present invention.

FIG. 30 illustrates configurations of a user equipment and a base station according to an exemplary embodiment of the present invention. In the present invention, the user equipment may be implemented by various types of wireless communication devices or computing devices of which portability and mobility are guaranteed. The user equipment (UE) may be referred to as terminal, a station (STA), a mobile subscriber (MS), and the like. In the present invention, the base station may control and take charge of cells (e.g., a macro cell, a femto cell, a pico cell, and the like) corresponding to service areas and perform functions including signal transmission, channel designation, channel monitoring, self diagnosis, relay, and the like. The base station may be referred to as an evolved NodeB (eNB), an access point (AP), and the like.

Referring to FIG. 30, the user equipment 100 may include a processor 110, a communication module 120, a memory 130, a user interface unit 140, and a display unit 150.

The processor 110 may execute various commands or programs according to the present invention and process data in the user equipment 100. Further, the processor 100 may control all operations of the respective units of the user equipment 100 and control data transmission/reception among the units. For example, the processor 110 may perform DL/UL transmission/reception in an LTE-U cell in an LAA environment. In detail, the processor 110 may perform aforementioned various operations, for example, DL/UL transmission/reception, verification of an HARQ-ACK feedback set, CWS adjustment, and the like.

The communication module 120 may be an integrated module that performs mobile communication using a mobile communication network and wireless LAN access using a wireless LAN. To this end, the communication module 120 may include a plurality of network interface cards such as cellular communication interface cards 121 and 122 and a wireless LAN interface card 123 in an internal or external type. In FIG. 30, the communication module 120 is illustrated as the integrated module, but the respective network interface cards may be independently disposed according to a circuit configuration or a purpose unlike FIG. 30.

The cellular communication interface card 121 transmits/receives a radio signal to/from at least one of a base station 200, an external device, and a server by using the mobile communication network and provides a cellular communication service at a first frequency band based on a command of the processor 110. The cellular communication interface card 121 may include at least one NIC module using an LTE-licensed frequency band. The cellular communication interface card 122 transmits/receives the radio signal to/from at least one of the base station 200, the external device, and the server by using the mobile communication network and provides the cellular communication service at a second frequency band based on the command of the processor 110. The cellular communication interface card 122 may include at least one NIC module using an LTE-unlicensed frequency band. For example, the LTE-unlicensed frequency band may be a band of 2.4 GHz or 5 GHz.

The wireless LAN interface card 123 transmits/receives the radio signal to/from at least one of the base station 200, the external device, and the server through wireless LAN access and provides a wireless LAN service at the second frequency band based on the command of the processor 110. The wireless LAN interface card 123 may include at least one NIC module using a wireless LAN frequency band. For example, the wireless LAN frequency band may be an unlicensed radio band such as the band of 2.4 GHz or 5 GHz.

The memory 130 stores a control program used in the user equipment 100 and various resulting data. The control program may include a program required for the user equipment 100 to perform wireless communication with at least one of the base station 200, the external device, and the server. The user interface 140 includes various types of input/output means provided in the user equipment 100. The display unit 150 outputs various images on a display screen.

Further, the base station 200 according to the exemplary embodiment of the present invention may include a processor 210, a communication module 220, and a memory 230.

The processor 210 may execute various commands or programs according to the present invention and process data in the base station 200. Further, the processor 210 may control all operations of the respective units of the base station 200 and control data transmission/reception among the units. For example, the processor 210 may perform DL/UL transmission/reception based on LBT in an LAA environment. In detail, the processor 210 may perform aforementioned various operations, for example, DL/UL transmission/reception, verification of an HARQ-ACK feedback set, CWS adjustment, and the like.

The communication module 220 may be an integrated module that performs the mobile communication using the mobile communication network and the wireless LAN access using the wireless LAN like the communication module 120 of the user equipment 100. To this end, the communication module 120 may include a plurality of network interface cards such as cellular communication interface cards 221 and 222 and a wireless LAN interface card 223 in the internal or external type. In FIG. 25, the communication module 220 is illustrated as the integrated module, but the respective network interface cards may be independently disposed according to the circuit configuration or the purpose unlike FIG. 25.

The cellular communication interface card 221 transmits/receives the radio signal to/from at least one of the user equipment 100, the external device, and the server by using the mobile communication network and provides the cellular communication service at the first frequency band based on a command of the processor 210. The cellular communication interface card 221 may include at least one NIC module using the LTE-licensed frequency band. The cellular communication interface card 222 transmits/receives the radio signal to/from at least one of the user equipment 100, the external device, and the server by using the mobile communication network and provides the cellular communication service at the second frequency band based on the command of the processor 210. The cellular communication interface card 222 may include at least one NIC module using the LTE-unlicensed frequency band. The LTE-unlicensed frequency band may be the band of 2.4 GHz or 5 GHz.

The wireless LAN interface card 223 transmits/receives the radio signal to/from at least one of the user equipment 100, the external device, and the server through the wireless LAN access and provides the wireless LAN service at the second frequency band based on the command of the processor 210. The wireless LAN interface card 223 may include at least one NIC module using the wireless LAN frequency band. For example, the wireless LAN frequency band may be the unlicensed radio band such as the band of 2.4 GHz or 5 GHz.

In FIG. 25, blocks of the user equipment and the base station logically divide and illustrate elements of the device. The elements of the device may be mounted as one chip or a plurality of chips according to design of the device. Further, some components of the user equipment 100, that is to say, the user interface 140 and the display unit 150 may be selectively provided in the user equipment 100. Further, some components of the base station 200, that is to say, the wireless LAN interface 223, and the like may be selectively provided in the base station 200. The user interface 140 and the display unit 150 may be additionally provided in the base station 200 as necessary.

The method and the system of the present invention are described in association with the specific embodiments, but some or all of the components and operations of the present invention may be implemented by using a computer system having a universal hardware architecture.

The description of the present invention is used for illustration and those skilled in the art will understand that the present invention can be easily modified to other detailed forms without changing the technical spirit or an essential feature thereof. Therefore, the aforementioned exemplary embodiments are all illustrative in all aspects and are not limited. For example, each component described as a single type may be implemented to be distributed and similarly, components described to be distributed may also be implemented in a combined form.

The scope of the present invention is represented by the claims to be described below rather than the detailed description, and it is to be interpreted that the meaning and scope of the claims and all the changes or modified forms derived from the equivalents thereof come within the scope of the present invention.

INDUSTRIAL APPLICABILITY

The present invention is usable in various communication devices (e.g., a station or access point using unlicensed band communication, a station or a base station using cellular communication, or the like) used in a wireless communication system.

The invention claimed is:

1. A method for performing transmission in an unlicensed cell by a user equipment in a wireless communication system, the method comprising:
   receiving uplink scheduling information;
   when the user equipment has stopped, during an uplink transmission being performed according to the uplink scheduling information, the uplink transmission and a channel sensed by the user equipment is not continuously idle after the uplink transmission has been stopped, performing a first type channel access to resume the uplink transmission; and
   when the user equipment has stopped, during the uplink transmission being performed according to the uplink scheduling information, the uplink transmission and the channel sensed by the user equipment is continuously idle after the uplink transmission has been stopped, performing a second type channel access to resume the uplink transmission,
   wherein the first type channel access comprises performing a random backoff using a variable size contention window (CW) after a first channel sensing, and the second type channel access only comprises performing a second channel sensing for at least a sensing interval without the random backoff, wherein the sensing interval is equal to or longer than 16 us.

2. The method according to claim 1, wherein the uplink transmission comprises a transmission on a plurality of subframes, and wherein the user equipment stops the uplink transmission in a subframe other than a last subframe of the plurality of subframes.

3. The method according to claim 1, wherein the uplink transmission comprises a transmission on a plurality of subframes, wherein the user equipment stops the uplink transmission in a first subframe which is a subframe other than a last subframe of the plurality of subframes and resume the uplink transmission in a second subframe, wherein the second subframe is later than the first subframe.

4. The method according to claim 1, wherein the second type channel access comprises performing the second channel sensing for a duration of 25 us without the random backoff.

5. A user equipment used in a wireless communication system, the user equipment comprising:

a wireless communication module; and a processor, wherein the processor is configured to:

receive uplink scheduling information, when the user equipment has stopped, during an uplink transmission being performed according to the uplink scheduling information in an unlicensed cell, the uplink transmission and a channel sensed by the user equipment is not continuously idle after the uplink transmission has been stopped, perform a first type channel access to resume the uplink transmission, and when the user equipment has stopped, during the uplink transmission being performed according to the uplink scheduling information in the unlicensed cell, the uplink transmission and the channel sensed by the user equipment is continuously idle after the uplink transmission has been stopped, perform a second type channel access to resume the uplink transmission, wherein the first type channel access comprises performing a random backoff using a variable size contention window (CW) after a first channel sensing, and the second type channel access only comprises performing a second channel sensing for at least a sensing interval without the random backoff, wherein the sensing interval is equal to or longer than 16 us.

6. The user equipment according to claim 5, wherein the uplink transmission comprises a transmission on a plurality of subframes, and wherein the user equipment stops the uplink transmission in a subframe other than a last subframe of the plurality of subframes.

7. The user equipment according to claim 5, wherein the uplink transmission comprises a transmission on a plurality of subframes, wherein the user equipment stops the uplink transmission in a first subframe which is a subframe other than a last subframe of the plurality of subframes and resume the uplink transmission in a second subframe, wherein the second subframe is later than the first subframe.

8. The user equipment according to claim 5, wherein the second type channel access comprises performing the second channel sensing for a duration of 25 us without the random backoff.

9. A wireless communication system comprising a user equipment, wherein the user equipment is configured to:

receive uplink scheduling information, when the user equipment has stopped, during an uplink transmission being performed according to the uplink scheduling information in an unlicensed, the uplink transmission and a channel sensed by the user equipment is not continuously idle after the uplink transmission has been stopped, perform a first type channel access to resume the uplink transmission, and when the user equipment has stopped, during the uplink transmission being performed according to the uplink scheduling information in the unlicensed, the uplink transmission and the channel sensed by the user equipment is continuously idle after the uplink transmission has been stopped, perform a second type channel access to resume the uplink transmission, wherein the first type channel access comprises performing a random backoff using a variable size contention window (CW) after a first channel sensing, and the second type channel access only comprises performing a second channel sensing for at least a sensing interval without the random backoff, wherein the sensing interval is equal to or longer than 16 us.

* * * * *